US006292792B1

(12) United States Patent
Baffes et al.

(10) Patent No.: US 6,292,792 B1
(45) Date of Patent: Sep. 18, 2001

(54) SYSTEM AND METHOD FOR DYNAMIC KNOWLEDGE GENERATION AND DISTRIBUTION

(75) Inventors: Paul T. Baffes; Siddarth Subramanian, both of Austin, TX (US); Shane V. Nugent, Barrington, IL (US)

(73) Assignee: Intelligent Learning Systems, Inc., Austin, TX (US)

( * ) Notice: Subject to any disclaimer, the term of this patent is extended or adjusted under 35 U.S.C. 154(b) by 0 days.

(21) Appl. No.: 09/277,861

(22) Filed: Mar. 26, 1999

(51) Int. Cl.[7] .................................................... G06F 15/18
(52) U.S. Cl. ............................................................ 706/45
(58) Field of Search ........................ 706/45, 46; 434/350; 707/513; 345/333–339, 356

(56) References Cited

U.S. PATENT DOCUMENTS

| | | | |
|---|---|---|---|
| 5,311,422 | 5/1994 | Loftin et al. | 364/401 |
| 5,727,950 | 3/1998 | Cook et al. | 434/350 |
| 5,761,683 | 6/1998 | Logan et al. | 707/513 |
| 5,778,368 | 7/1998 | Hogan et al. | 707/10 |
| 6,032,141 | * 2/2000 | O'Connor et al. | 706/45 |
| 6,134,539 | * 10/2000 | O'Connor et al. | 706/45 |
| 6,184,885 | * 2/2001 | DeStefano | 345/356 |

OTHER PUBLICATIONS

Microsoft® Corp.: "Getting Results with Microsoft® Office 97", 1996, pp. 452–469, 680.

ForeFront, Inc.: "ForeHelp User's Manual, Help–Authorizing System For Microsoft Windows", 1994, Version 1.0, pp. 31, 111, 232.

Artificial Intelligence and Tutoring Systems, by Etienne Wenger, Morgan Kaufmann Publishers, Inc., 1987.

Automatic Student Modeling and Bug Library Construction Using Theory Refinement, by Paul Thomas Baffes, 1994.

Extending Domain Theories: Two Case Studies in Student Modeling, by D. Sleeman, Haym Hirsh, Ian Ellery, In–Yung Kim, Kluwer Academic Publishers, 1990.

* cited by examiner

Primary Examiner—Kakali Chaki
(74) Attorney, Agent, or Firm—Gray Cary Ware and Freidenrich

(57) ABSTRACT

A system and method that includes the use of a knowledge delivery computer program stored in computer-readable form on a tangible storage medium for delivering concepts from a configuration data base to a user. An author can create the configuration data base using the knowledge delivery computer program so that the configuration includes a plurality of concepts and, optionally, a plurality of problems associated with the concepts. As the author creates the concepts within the configuration, the knowledge delivery software allows the author to create a taxonomy that defines the relationships between the concepts. The knowledge delivery software can then automatically generate a pedagogy for the configuration based on the configuration taxonomy that defines how the concepts will be delivered to the user. The knowledge delivery software can facilitate the delivery of the content within the configuration to a user according to the pedagogy.

80 Claims, 35 Drawing Sheets

Supported topics
Concept Four
Concept Six

Sub topics
Concept Two

III. Concept Three
198

Asset allocation can be as simple or as complex as you want to make it. Either way, the sole aim of the asset allocation process is to maximize returns while minimizing risk. It is accomplished through diversification, which is nothing more than spreading your money among different kinds of investments. Deciding how much of your assets to put in each investment category is the allocation process. And lest you not take this process seriously, you should know that most money managers consider asset allocation far more important in reaping eventual rewards than the selection of individual stocks and bonds. If the time available to devote to your investments is limited, then asset allocation is where you should devote it. Someone else can pick the individual stocks and bonds that go into your portfolio.

The process can be amazingly simple as long as you understand the goal. Studies have shown that five randomly selected stocks can significantly reduce the risks that would be inherent in owning a single stock. As long as they were randomly selected, those five stocks would tend to exhibit different growth rates, be in different industries, respond differently to changing variables such as interest rates, and be treated differently by the investment community as a whole. When one

*FIG. 27*

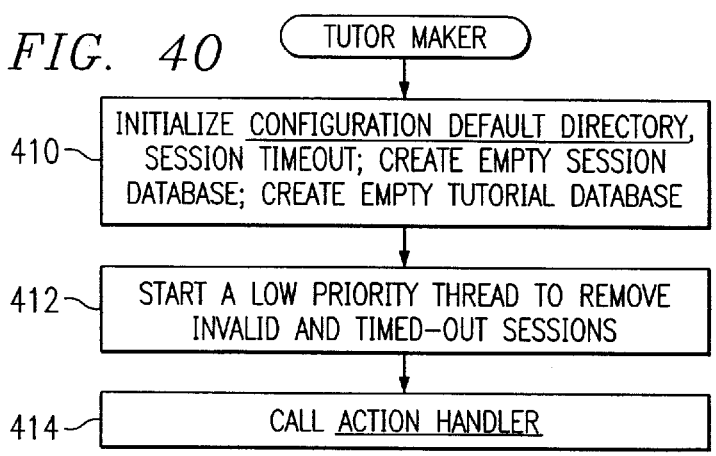
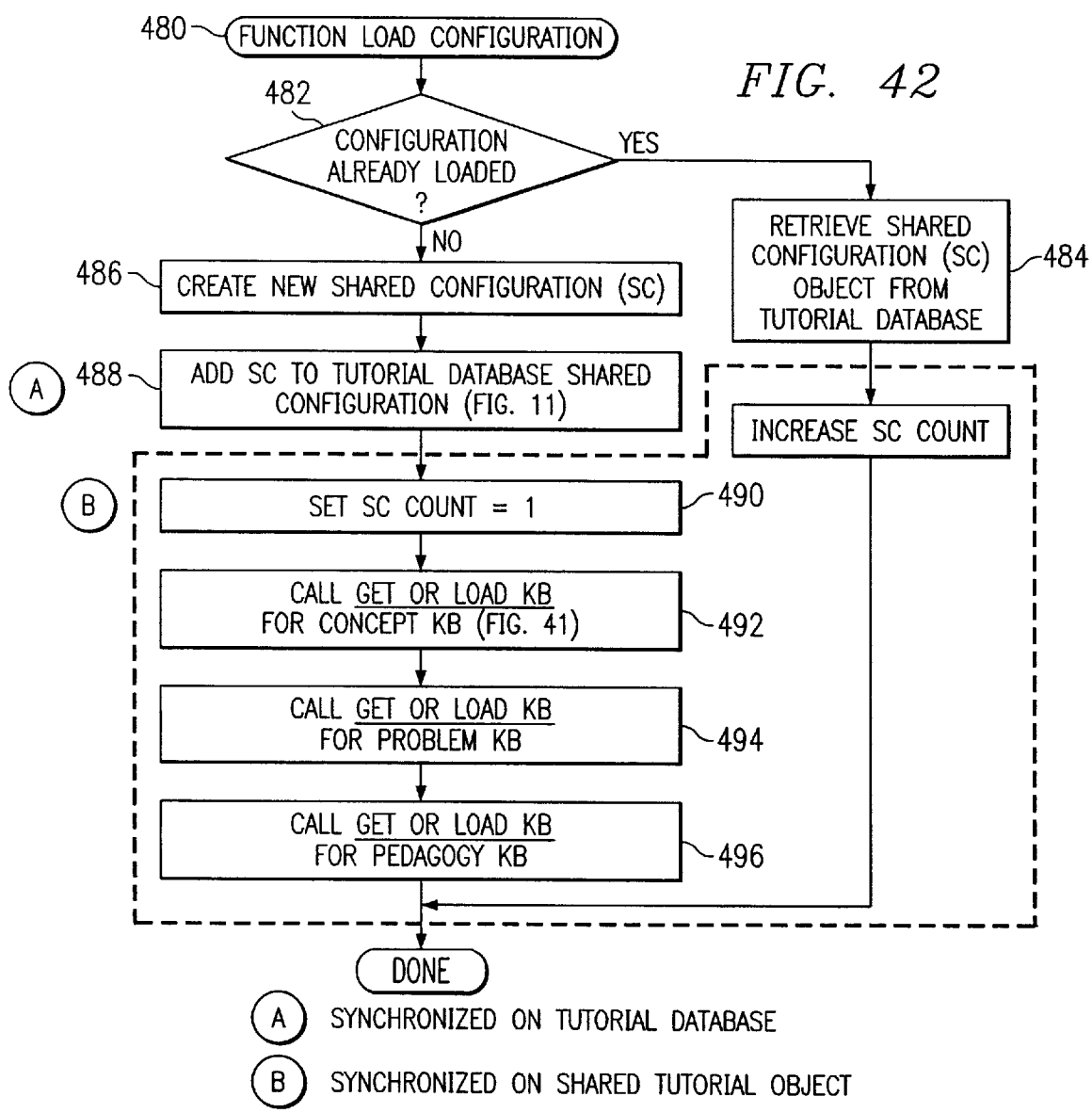

SYSTEM AND METHOD FOR DYNAMIC KNOWLEDGE GENERATION AND DISTRIBUTION

GOVERNMENT LICENSE RIGHTS

The United States government has a paid-up license in this invention as provided for in FAAR 52.227-11 subsections B and C.

TECHNICAL FIELD OF THE INVENTION

The present invention relates generally to knowledge creation and distribution systems and methods, and more particularly, a system and method using software programming to create a knowledge base, organize the knowledge base or some subset thereof, and distribute the knowledge in various formats, including a tutorial.

BACKGROUND OF THE INVENTION

Organizations and companies can amass tremendous amounts of information. However, transmitting this information in a useable format, including the right subset of the information and in the proper manner, to employees or individuals in the organization is often very difficult. In order to aid in this process, numerous computer-based training, tutoring and information delivery systems have been propagated to attempt to transfer data or information to users with no external input from a human (other than the user).

These training systems generally fall under the category of "computer-based training" (CBT), which includes "intelligent computer-based training" (ICBT), "intelligent computer-aided training" (ICAT) and "intelligent tutoring" (ITS) systems. These types of training systems share the objective of presenting instructional material to a human recipient (called a "user") using a computer program with little or no additional human intervention. These types of computer-based tutorial systems have been developed to reduce the cost associated with traditional classroom training (including travel costs, salaries for instructors, and excessive lost productivity during training).

In these computer-based training systems, the computer program must initially be provided with a database of the basic information from which it can compose the instructional material (e.g., text, graphics, charts, video clips, audio clips, etc.) that is provided or built by an "author." There are two distinct concepts surrounding the delivery of information using these tutorial systems that can be categorized as follows: (1) the content detailing the concepts to be conveyed to the user and (2) the manner in which the content is to be conveyed. For purposes of this disclosure, these two concepts are termed the "content" and "pedagogy" respectively.

Traditional CBT approaches generally include "authoring tools" that allow authors to develop and deliver on-line instruction programs. These prior art CBT systems focus on integrating numerous media formats into seamless, highly scripted presentations. These CBT authoring systems require the author to completely create and specify the pedagogy. Also the content and the pedagogy are highly interconnected within the database. Furthermore, these CBT systems have only been used to deliver knowledge to a student in a tutorial paradigm.

An extension of the tutorial systems can be generally categorized as a user-model tutorial. These user-model prior art tutorial systems attempt to develop models of the user's state of knowledge prior to the tutorial. The emphasis of these approaches, including the overlay model, the bug library model, and the dynamic model computation, is on developing a student model and then using this model to determine choices in a predetermined pedagogy. However, these user-model approaches do not reduce any of the problems associated with creating the predetermined pedagogy by the author.

Another example of a computer aided training system is contained in U.S. Pat. No. 5,311,422, entitled "General Purpose Architecture for Intelligent Computer-Aided Training," which discloses a tool for building on-line training programs, including templates for content, pedagogy, and user model (i.e., model of the user's knowledge) that apply to a wide variety of domains. The tool can execute training programs using these general templates and cooperating expert system (rule-based) programs. However, these rule-based programs must be individually written for each new training application and therefore require a person skilled in the art of rule-based programming; a rare expertise when compared to traditional programming skills for languages such as C++ and JAVA. Furthermore, this patent still requires the author to create a fully-specified pedagogy (i.e., the pedagogy cannot be created automatically). Additionally, this prior art patent only discloses the delivery of knowledge to users in a tutorial paradigm (i.e., not in a help system, customer service, what-if scenario, etc.)

Another prior art training approach is virtual classroom training (VCT) which attempts to combine elements of classroom training with elements of CBT using video conference and other technologies. Typically, students are linked with an instructor in a virtual classroom using telecommunications technology and computer applications. While VCT offers some of the advantages of interaction among students and an instructor, it still has the drawback of requiring a human instructor. Additionally, these prior art VCT do not automatically generate pedagogies for the simple reason that the instructor determines how the material will be delivered. Furthermore, the initial implementation costs for VCT are extremely high and the VCT courses are not self-paced.

In all of the above-described prior art systems, the author must create and/or input a pedagogy for delivering the knowledge to the user. Therefore, during the building of the database, the author must also create the pedagogy (i.e., the manner in which the user will be delivered information from the database). In other words, the author must specify pedagogical details such as when content is to be displayed, how often it is to be displayed, whether it is optional or must be mastered prior to moving forward, etc. Furthermore, more flexible pedagogies are more desirable as they can address a greater variety of user backgrounds and skill levels, and can provide a given user with a greater variety of delivery interactions. In fact, some of these prior art tutoring systems incorporate very elaborate pedagogical specifications, including branching logic that can be based upon student inputs. However, another limitation of the prior art tutoring systems is that the greater the flexibility in the pedagogy, the greater the burden on the author who must input all the pedagogical details. This places a higher burden on either the author, the programmer creating the program, or both.

SUMMARY OF THE INVENTION

The present invention provides a dynamic knowledge creation and delivery system and method that substantially eliminates or reduces disadvantages and problems associated with previously developed computer-based information delivery systems and methods.

More specifically, the present invention provides a system for that includes a knowledge delivery computer program stored in computer-readable form on a tangible storage medium for delivering concepts from a configuration data base to a user. An author can create the configuration data base using the knowledge delivery computer program so that the configuration includes a plurality of concepts and, optionally, a plurality of problems associated with the concepts. As the author creates the configuration, the knowledge delivery software allows the author to create a configuration taxonomy to define the relationships between the concepts. The knowledge delivery software can then automatically generate a pedagogy for the configuration based on the configuration taxonomy that defines how the concepts will be delivered to a user. The author may optionally create all or part of the pedagogy manually. The knowledge delivery software can also facilitate the delivery of the content within the configuration to a user according to the pedagogy. A user can access the configuration using the knowledge delivery software over the internet using a user interface stored on the client computer that allows the a user to send requests and receive responses over the internet.

The present invention provides an important technical advantage by separating the content to be delivered from the pedagogy or manner of delivery. Therefore, the present invention does not require any pedagogical input from the author creating the content knowledge database.

The present invention provides another technical advantage by automatically creating the pedagogy for delivering knowledge to a user. The automatic generation of the pedagogy is based on the content of the knowledge base and the taxonomy of, or relationships between, those concepts.

The present invention provides still another technical advantage by automatically generating different pedagogies from a single concept knowledge base.

The present invention provides yet another technical advantage by allowing the delivery of content from the knowledge data base in a variety of different formats using a variety of different delivery mechanisms (including the internet).

The present invention provides another technical advantage by allowing the author of the knowledge base to optionally override the automatic pedagogy mechanism to create a pedagogy that the author specifies.

The present invention provides a technical advantage because it can deliver knowledge to a user using a general architecture that is adaptable for a variety of instructional fields in addition to the traditional tutorial paradigm (e.g., in a help system environment, a customer service scenario, a what-if scenario, etc.).

The present invention provides still another technical advantage by being adaptable to create multiple concept knowledge bases, to create multiple configurations, and to provide knowledge delivery to multiple users at a time from any of multiple configurations.

The present invention provides another technical advantage by allowing for the creation and integration of a user model for every user/configuration pair that includes a history of all the elements of the given configuration presented by the invention to the user, as well as a record of the user's response to each element.

The present invention provides another technical advantage in that it does not require either the author or the user to have an understanding of neural network programming, artificial intelligence programming, or even more common programming languages such as C++ or JAVA. The present invention utilizes browser extension technology to allow both the author and the user to "point and click" to execute functionality.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein:

FIGS. 15–27 show embodiments of various windows that can be used to impliment the knowledge delivery program of the present invention;

FIG. 40 is a flow diagram illustrating the operation of the tutor maker according to the present invention;

FIG. 42 is a flow diagram illustrating the operation of the load configuration function of the present invention;

DETAILED DESCRIPTION OF THE INVENTION

Preferred embodiments of the present invention are illustrated in the FIGUREs, like numerals being used to refer to like and corresponding parts of the various drawings.

The present invention includes software programming to deliver knowledge to users. The knowledge delivery can occur using a variety of mechanisms including a CD-ROM on a stand-alone computer, or over an intranet or the internet. The description of the present invention will presume a client-server architecture and delivery over the internet, though any other computer-based delivery mechanism can be employed. The dynamic knowledge delivery program 100 of the present invention includes two components (each of which can be a stand alone software program): (1) software to produce a configuration and (2) the software to deliver knowledge from the configuration to the user.

For purposes of the present invention, a distinction will be drawn to two categories of information within the configuration: the "content" and the "pedagogy." The content represents the concepts to be conveyed to the user (i.e., what information will be provided the user during instruction). The pedagogy is the manner in which the information is to be displayed to the user (i.e., how the instruction will be performed). The dynamic knowledge delivery program 100 includes an automated pedagogy generator that automatically determines, based on taxonomy input by the author during the building of the configuration, how the knowledge should be delivered to the user without additional input from the author. In this way, the present invention completely separates content from pedagogy. Thus, the author does not have to develop both the content and the manner of delivery, but rather must just develop the content and the relationships among the concepts that make up the content. The manner of delivery, or the pedagogy, can then be automatically generated by the present invention. Another distinction can be drawn between categories of information contained with the "content" portion of the configuration 10: the "descriptive content" and the "referential content". The descriptive content is the actual text, video, sound, etc. that describes a component of the configuration. For example, the description of a particular concept might include a drawing or figure and accompanying text. Also, a description of a test question might consist of the text for the statement of the question, the text for each multiple choice answer, and the text to explain the correct answer to the question. The referential content is the linkage (e.g., pointers) to the description content plus any relational linkages among elements of the referential content. Thus, a concept would refer to the descriptive content for that concept, and it would refer to any examples or test questions related to that concept. The taxonomy mentioned previously is part of the referential content of a configuration 10.

Figure 1:
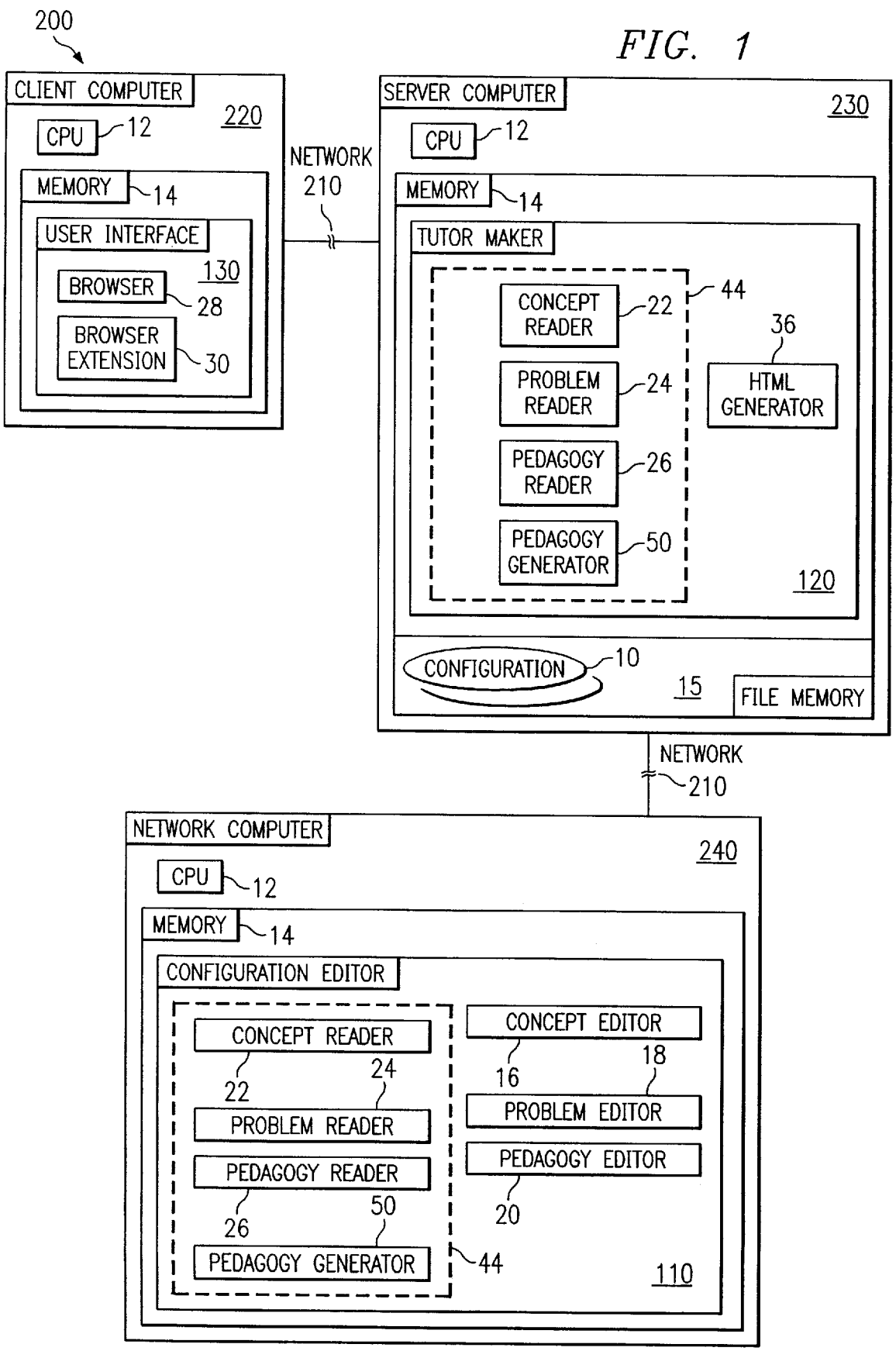
FIG. 1 is a diagramatical representation of a client-server architecture incorporating one embodiment of the knowledge delivery program of the present invention.

The present invention includes dynamic knowledge delivery computer program 100 executed within a computer system 200, such as that shown in FIG. 1. Computer system 200 is a client/server architecture that includes the internet, and includes client computer 220, server computer 230, and network computer 240. Client computer 220 connects to server computer 230 over network 210, while network computer 240 connects to server computer 230 over network 210. It should be understood that network 210 can be the same network or a different network in practice (e.g., the network connecting client computer 220 to server computer 230 could be the internet, while the network connecting the network computer 240 to the server computer 230 could be a company intranet). It should be further understood that a variety of other computer systems could be employed, including a single computer executing all of the client, server and network side functions of FIG. 1.

Each computer in FIG. 1 includes a central processing unit (CPU) or processor 12 and a storage device or memory 14. Dynamic knowledge delivery computer program 100 includes the configuration editor program 110, the tutor maker program 120, and the user interface 130, each of which can reside in memory 14 (for example, random access memory or RAM) within the server computer, the network computer, and the client computer, respectively. As shown, configuration 10 can reside in file memory 15 (e.g., hard drive, floppy disk, etc.) that resides on or is accessible by server computer 230. The dynamic knowledge delivery computer program 100 includes instructions that, when executed, cause the CPUs 12 to perform the functions described herein. In another embodiment each of the three programs could reside on a single computer that an author could access to create the configuration 10 and a user could then access in order to deliver knowledge from the configuration 10. In yet another embodiment, dynamic knowledge delivery computer program 100 is stored in a computer readable medium of a removable computer disk, such as a floppy disk or compact disk.

For purposes of the present invention, the configuration building software is referred to herein as the configuration editor 110, while the knowledge delivery software is referred to as the tutor maker 120. An internet architecture such as that shown in FIG. 1 will also include a user interface 130, which is shown to include a browser 28 and a browser extension 30. Configuration editor 110 can include five sub-programs: the concept editor 16, problem editor 18, pedagogy editor 20, tutor manager 44, and pedagogy generator 50, each of which will be described in more detail. It should be noted that the pedagogy generator 50 can optionally be located within the tutor maker 120, however locating the pedagogy generator 50 within the configuration editor 110 allows an author to make pedagogical input as an alternative to the automated pedagogy generation of the pedagogy generator 50. Tutor maker 120 can include three sub-programs, tutor manager 44, pedagogy generator 50, and HTML generator 36. In both configuration editor 110 and tutor maker 120, a tutor manager 44 contains the concept reader 22, the problem reader 24, and the pedagogy reader 26. FIG. 1 also shows configuration 10 loaded within file memory 16 on server computer 230.

Figure 2:
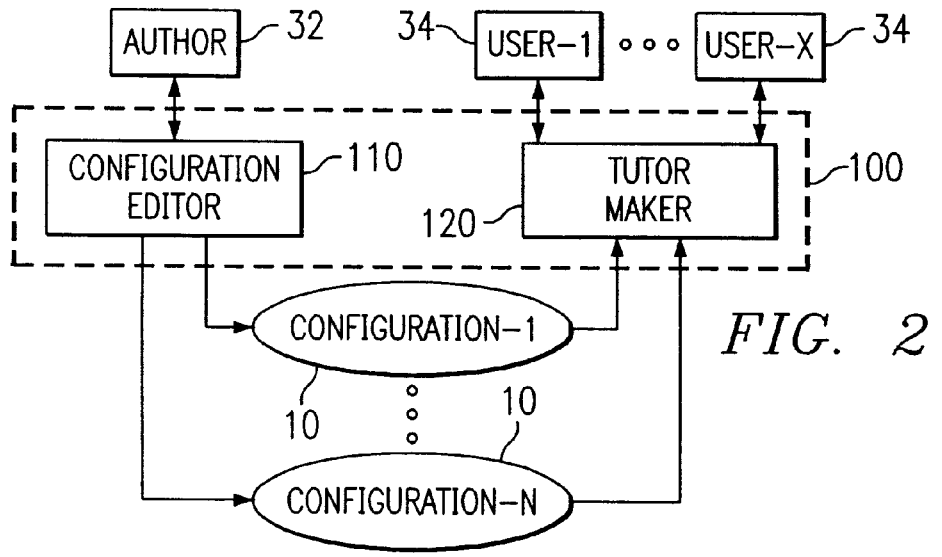
FIG. 2 shows the interaction between an author and the configuration editor and a number of users and the tutor maker.

As illustrated in FIG. 2, the interactions between the dynamic knowledge delivery program 100 and human beings occur in two phases: the first phase between an "author" 32 and the program 100 to develop the configuration 10, and the second phase between a "user" 34 and the program 100 to deliver content from the configuration 10. The configuration editor 110 allows the author 32 to develop configurations 10 from which content will be extracted for delivery to user(s) 34. The tutor maker 120 allows a user 34 (or multiple users 34 simultaneously) to have content delivered to them according to the pedagogy that can be automatically generated by pedagogy generator 50. FIG. 2 shows that any number of data configurations 10 can be built author(s) 32 from the configuration editor 110 and/or accessed by user(s) 34 from the tutor maker 120. Each configuration can be completely independent from every other configuration. FIG. 2 also illustrates that any X number of users 34 can access any N number of configurations 10 where X does not necessarily equal N. Thus, two or more students 34 can access the same configuration 10 simultaneously using concurrent programming techniques.

Configuration 10 is the underlying data structure that consists of a concept knowledge base, and optionally a pedagogy knowledge base and a problem knowledge base. Different configurations 10 may be constructed by mixing together different concept knowledge bases, problem knowledge bases, and pedagogy knowledge bases (e.g., the same concept knowledge base can be used in multiple different configurations and multiple different tutorials). The knowledge bases are the data bases of information or "concepts" from which certain of the concepts are chosen and delivered to user(s) 34. The term "knowledge base" is used to differentiate this data base from typical informational databases because the knowledge base incorporates a taxonomy or dependency of relationships among the concepts.

For example, a broad concept that could be included within a knowledge base could be a computer. The concept of a computer also includes sub-assembly concepts such as a keyboard, a processor, a display screen, a memory, and component concepts such as transistors, resistors, and microchips. The computer can also include concepts such as software programs and architectures such as an intranet or internet. Further concepts can include how the computer actually works using the various sub-assemblies, software and architectures. Depending on the user, different concepts from the knowledge base can be delivered using the dynamic knowledge delivery program 100 of the present invention. For a sales person, concepts such as the operation of a microprocessor to execute a program might represent too much detail, however, that might be exactly the level of detail required for an electronic technician building the computer. Thus, the dynamic knowledge delivery program 100 allows author 32 to build knowledge bases in such a manner as to allow different format and content delivery to different users 34.

One of the unique aspects of the dynamic knowledge delivery software program 100 is that it allows the author 32 to enter into the configuration 10 not only the concepts the author 32 wants to teach or transmit to the user(s) 34, but also the taxonomy of the concepts or the relationship among those concepts. The dynamic knowledge delivery software program 100 then leverages that taxonomy with software programming to automatically build a pedagogy based on the taxonomy.

Figure 3:
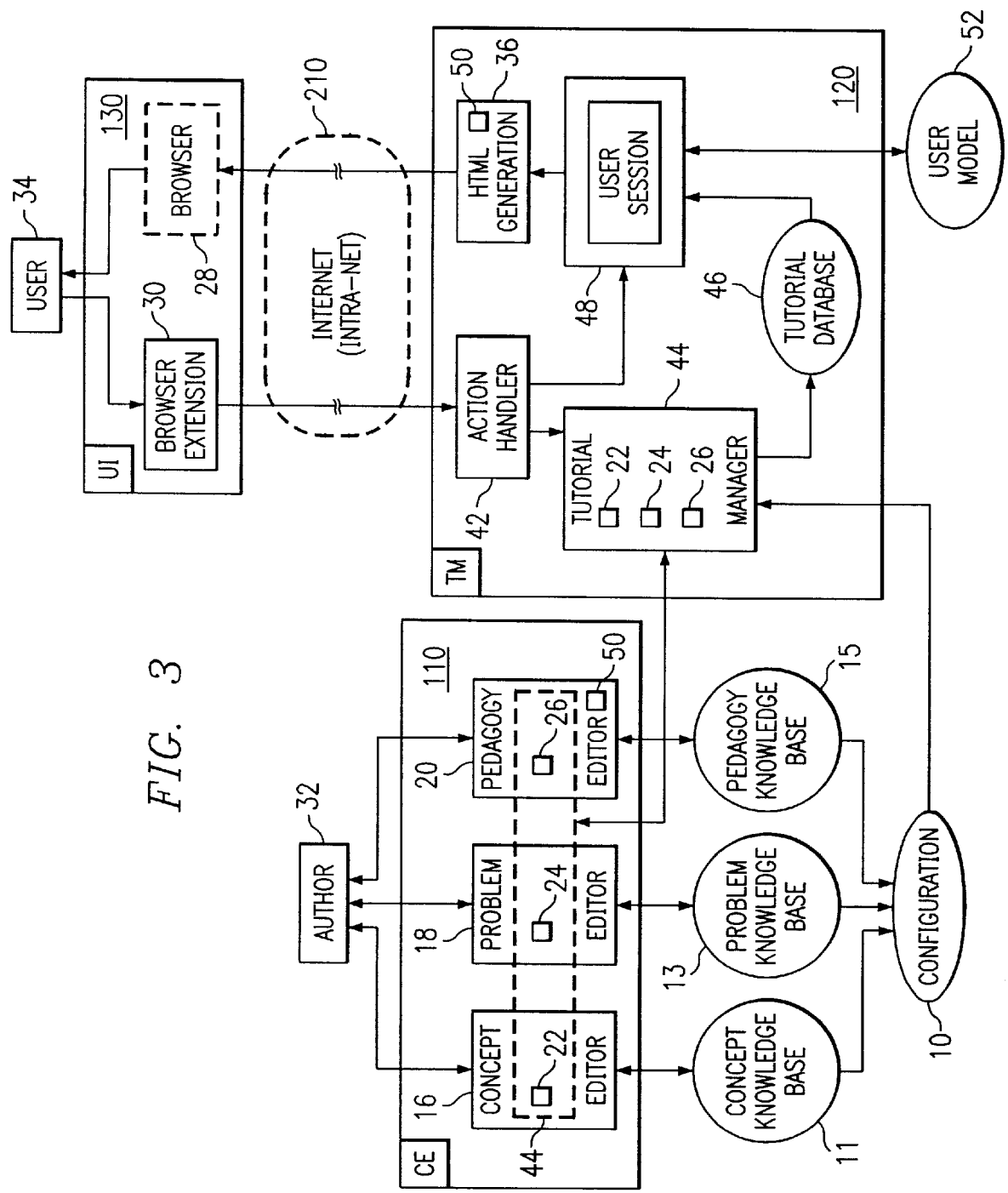
FIG. 3 illustrates in more detail the subprogram of the configuration editor and tutor maker of FIG. 2.

FIG. 3 shows a more detailed block diagram of the system shown in FIG. 1. As shown in FIG. 3, the author 32 accesses the configuration editor 110 that includes concept editor 16, which is used by the author 32 to make the concept knowledge base 11, problem editor 18, which can be used to make the problem knowledge base 13, and pedagogy editor 20, which can be used to make the pedagogy knowledge base 15, and these three knowledge bases comprise configuration 10. The tutorial manager 41 within configuration editor 110 is connected to tutorial manager 44 contained within tutor maker 120 (each of which contains the concept reader 22 (shown as part of concept editor 16), problem reader 24 (shown as part of problem editor 18), and pedagogy reader 26 (shown as part of pedagogy editor 26)). As shown in FIG. 3, tutor maker 120 includes four sub-programs which are the action handler 42, HTML generator 36, tutorial manager 44, and user session 48. Tutor maker 120 also includes tutorial database 46 and can optionally access user model 52 which is a data base modeling the user 34. The user 34 accesses tutor maker 120 over network 210 using the user interface 130 which includes, for an internet application, a browser extension 30 and standard browser 28 (such as internet Explorer, Netscape Navigator or Netscape Communicator).

Configuration editor 110 facilitates the building of configuration(s) 10. As shown in FIG. 3, configuration 10 includes a concept knowledge base 11 component, a problem knowledge base 13 component, and a pedagogy knowledge base 15 component. The concept knowledge base 11 is the portion of configuration 10 that includes the concepts to be delivered to a user 34. The concept editor 16 of configuration editor 110 is the subprogram utilized by the author 32 to input concepts into a concept knowledge base 11 and to create the hierarchy of relationships among concepts known as the taxonomy. Thus, as an author creates a knowledge base 11, the taxonomy is created as well (i.e., as the author 34 designates the relationships among the concepts). The combination of the taxonomy and automated pedagogy generation provide an extremely flexible knowledge delivery system that does not require pre-scripting the way the information will be delivered. The descriptive content for the concepts can be created using any number of data formats (e.g., text, tables, audio, and video of all types) so long as it can be converted into a format readable by the dynamic knowledge delivery program 100. For example, an internet client-server architecture as shown in FIG. 1 currently requires the descriptive content developed by the author 34 using the concept editor 16 to be compatible with or convertible to HTML. This allows the delivery of the content to users 34 over the internet. As the author completes the inclusion of data into the concept using the concept editor 16, a pointer is created that will point to all of the data associated with the concept.

Furthermore, each concept is incorporated into a structure of relationships, or taxonomy, based on each concept's relationship to previously created concepts (i.e., the "referential content"). For example, suppose the concept to be learned by the user is asset allocation. The base concept would be asset allocation which would include a number of concepts that need to be taught in order to understand asset allocation. Assume that at least the concepts "time-risk tradeoff", "stocks", "bonds", "investment pools", "investment goals", "dollar cost averaging", "value averaging" and "risk tolerance" must be delivered to the user to understand asset allocation. The author 32 will use the concept editor 16 to create descriptive content for each of these concepts by placing information (again, text, video and audio) within each concept. In an internet client-server environment, each concept would have HTML pages associated with it that contained the content. Further assume that the author 32 thinks that in order to understand "time-risk tradeoff", a person must first understand "investment goals", "risk tolerance", "dollar cost averaging" and "value averaging". Therefore, the taxonomy for the concept of "time-risk tradeoff" is that this concept depends on the "sub" concepts of "investment goals", "risk tolerance", "dollar cost averaging" and "value averaging". Each concept, as it is created by the author 32, would receive a similar taxonomical indicator among the existing concepts. Further assume that "dollar cost averaging" is a leaf concept, or a concept that does not require any further explanation. Thus, no concepts will be designated as supporting concepts for the concept of dollar cost averaging in the taxonomy for asset allocation. However, if so desired by the author, dollar cost averaging could further depend on the concepts of "currency" and "time".

The author may use problem editor 18 to build a problem knowledge base 13 and the pedagogy editor 20 to create a pedagogy knowledge base 15. It should be noted that the both the problem knowledge base 13 and the pedagogy knowledge base 15 are optional. The pedagogy editor 20 allows the author 32 to create some or all of the pedagogy (i.e., manner of delivery of content) based on the author's experience. However, this is entirely optional as the pedagogy generator 50 will automatically create a pedagogy based on the taxonomy of concepts input by the author 32. For example, if the author 32 has a goal to teach asset allocation, the pedagogy generator 50 can automatically generate a tutorial for asset allocation based on the taxonomy. The pedagogy editor 20 allows the author 32 to create the pedagogy independently of the pedagogy generator 50 or to modify the a pedagogy that was automatically generated.

The author 32 may also create a problem knowledge base 13 using problem editor 18. A problem knowledge base 13 would include examples and questions (collectively called "problems") relating to the concepts in a concept knowledge base 11. As with the concept knowledge base, the problem knowledge base was both descriptive and referential content (wherein descriptive is the HTML for problems and referential content is the links to concepts. For example, the author 32 could have concepts in a tutorial delivered with examples as the tutorial is delivered. In a tutorial setting, an author 32 may want to test the user 34 (e.g., use of the program 100 to re-certify engineers). Thus, the author 32 could build a problem knowledge base 13 of questions using problem editor 18. In an alternative embodiment, the problem knowledge base 13 could include a simulator program that automatically generates the descriptive content for questions and/or examples related to the concepts based on the concepts input by the author 32. An example of such a program that could automatically generate problems is disclosed in *Automatic Student Modeling and Bug Library Construction Using Theory Refinement,* Baffes, Paul, (December 1994), which is incorporated by reference herein in its entirety.

Each of the concept editor 16, problem editor 18 and pedagogy editor 20 can be used to later modify existing configuration 10 by adding, deleting or modifying concepts, problems, or the pedagogy. The existing concepts, problems, and pedagogy within the concept knowledge base 11, problem knowledge base 13 and pedagogy knowledge base 15 can be accessed by the author 32 using the concept reader 22, problem reader 24, and pedagogy reader 26, respectively. In the preferred embodiment, the referential content for each concept, problem, and pedagogical step within the respective knowledge bases will be software objects that are linked to other software objects. Programming the concepts, problems and pedagogical steps as objects in an object-oriented environment can simplify usage by multiple users.

For a client-server architecture incorporating a browser 28 within the user interface 130, the descriptive content each of the concept, problem, and pedagogy knowledge bases would be written in or converted to HTML pages. For example, each concept in a taxonomy will have one or more different content HTML files associated with it, and optionally there may be problem, example and/or question HTML pages and pedagogy HTML pages associated with each concept.

In one embodiment, each configuration 10 and all of the descriptive content files associated with the concept knowledge base 11, problem knowledge base 13 and pedagogy knowledge base 15 that comprise the configuration 10 are built under a single file directory to simplify bundling the configuration 10 and moving it (e.g., to place it on a disk). This single directory also facilitates delivery of the content of the configuration 10 over the internet because one can easily relocate the top-level directory from the network computer 240 to the server computer 230. Once the referential content for the concept knowledge base, problem knowledge base, and pedagogy knowledge base of a configuration is loaded into RAM memory on the server computer by the tutorial manager, the descriptive content files for the configuration can be readily accessed.

Tutor maker 120 facilitates the delivery of content from the configuration 10 to the user 34. The action handler program 42 will receive a request from a user 34 via browser extension 30 (e.g., log in) and will either process the request through the tutorial manager program 44 or the user session 48. A user 34 will log in and request a particular topic (i.e., configuration 10). The tutorial manager 44 will track whether the referential content of the requested configuration 10 has already been loaded from file memory 15 into RAM memory 14 by another user 34, and if so, will not reload the topic, but will process the request from the loaded version of the configuration. The tutorial manager 44 tracks all of the pieces of configuration 10 to ensure that the tutorial manager program 44 only loads the referential content of a particular knowledge base, problem base, or pedagogy base one time. In this way, the time delay due to file access is minimized. Thus, a previously loaded concept knowledge base 11 in use by another user 34 need not be reloaded when a new request for the same concept knowledge base 11 is received at the tutorial manager 44. Thus, the tutorial manager 44 reads the configuration 10 resident in file memory 15 in the server computer 230 and loads into RAM memory 14 the referential content of at least the concept knowledge base 11 of configuration 10 which is then used for all users 34 accessing this particular concept knowledge base 11. All loaded files in the tutorial manager 44 are maintained in the tutorial database 46, which is essentially a collection of pointers pointing to the HTML pages of the configuration. Thus, if multiple users 34 are viewing the same configuration 10, the users are accessing the configuration 10 at the tutorial data base 46, rather than directly accessing configuration 10. The tutorial database 46 is the resident set of all configurations 10 currently being viewed by users 34.

The user session 48 establishes a thread for each user 34. In one embodiment, the tutor maker 120 is a single program that runs on the network that can service any number of different users 34 simultaneously. In order to keep track of the different users 34, the tutor maker 120 uses parallel the standard computer science concept known as "threads". A thread is the software abstraction for running a separate process which allows multiple processes to be running literally simultaneously either on a true parallel computing machine or a standard computing platform which simulates parallel processing (most modern operating systems have such simulation). A thread is created for each user 34 that logs into the tutor maker 120. This creation of a separate thread for each user 34 allows for synchronizing actions among multiple users. The user session 48 allows synchronizing of threads to prevent loss of commands or erroneous handling of commands the user 34 inputs.

Also shown in FIG. 3 is an optional user model 52 data base that can be accessed by the user session 48. The user model 52 is built by the user session 48 and is a historical data base of a user's interactions with the tutor maker 120. The user model 52 could also incorporate much more complex user modeling techniques that have been developed to more precisely deliver content to the user 34.

Each action from the user 34 goes to either the tutorial manager 44 or to the user session 48 if a user session has already been established. If a user session has not been established, the tutorial manager 44 either loads the configuration 10 requested by user, or if it is already loaded, accesses it in the tutorial database 46. A new user session is then established and associated with the loaded or retrieval configuration, and the tutorial manager records this new association with the configuration in the tutorial database. Responses from user session 48 (based on requests from the user 34) will be put through the HTML generator 36 to place the response in HTML format for transmission back through the internet to the browser 28 where the user 34 receives the response. At every exchange, the user 34 makes a request and the tutor maker 120 responds with the HTML. The HTML generator 36 can be a separate program or file in order to ease the incorporation of changes in HTML versions.

FIG. 3 shows automatic pedagogy generator 50 resident in the pedagogy editor 20 within configuration editor 110 and resident in the HTML generator 36 within the tutor maker 120. However, if the pedagogy generator 50 only resides in the tutor maker 120, the author 32 will have no access to it. Putting pedagogy generator 50 in configuration editor 110 allows the pedagogy to be automatically generated by pedagogy generator 50 and additionally modified, if so desired, by the author 32.

The tutor maker 120 allows the presentation or delivery of content in different formats as chosen by the user 34. Initially, the user will log in and the tutor maker 120 will provide the user a list of topics (i.e., configurations 10). Upon choosing a topic, the user 34 is given a set of options on presentation style (e.g., standard tutorial, a question and answer session, a review, a surf/search session, etc.) In one embodiment, a custom tutorial could be presented by the tutor maker 120 based on the user's answers to a test covering the topic of choice.

The tutor maker 120 allows a user 34 to have content from the configuration 10 delivered based on the pedagogy created by author 32. The concepts can include hyperlinks to allow a user 34 to see particular content even when the pedagogy would not automatically deliver that particular content to the user 34. In addition, a user 34 could ask for examples on demand. The tutor maker 120 can track which examples a user 34 has seen and only show new examples, or recycle the examples based on the oldest viewed one. The user 34 can also request a test, whereupon the tutorial manager 44 will extract one or more test questions from the problem knowledge base 13. The tutor maker 120 can score the test immediately and provide feedback on incorrect answers by calling content related to the question from the concept knowledge base 11 or the problem knowledge base 13. Furthermore, if the user incorrectly answers a question, the tutor maker 120 can generate the related concepts and a taxonomy for that particular question. Thus, the tutor maker 120 can either progress through the topic using the standard pedagogy generated by pedagogy generator 50 or created by the author 32, or alternatively can be directed by the user 34 through the topic in an entirely user-driven manner.

Figure 4:
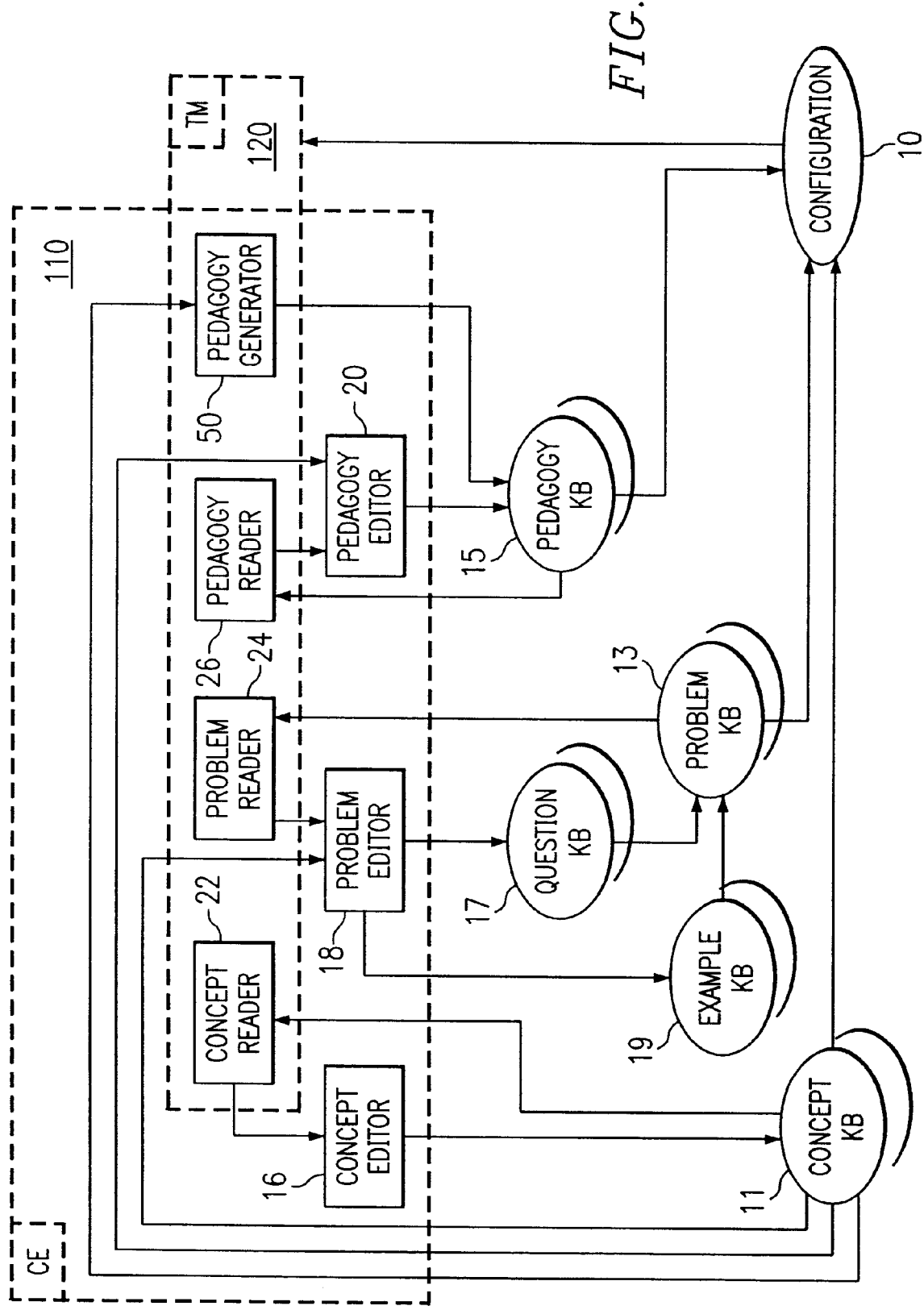
FIG. 4 illustrates in more detail the configuration editor of the FIG. 2 embodiment.

FIG. 4 is a diagram illustrating the overlap of the configuration editor 110 and the tutor maker 120. As indicated earlier, both the configuration editor 110 on the network computer 240 and the tutor maker 120 on the server computer 230 contain a concept reader 22, a problem reader 24 and a pedagogy reader 26 (note also that the pedagogy generator 50 can also be part of both programs, as explained previously). This allows both the configuration editor 110 and the tutor maker 120 to load a configuration 10 using the readers. In other words, in order for an author 32 to modify an existing configuration 10, the author 32 must also read it via the concept reader 22; likewise, if the configuration 10 will be presented to the user 34, it must also be read. To illustrate, assume an author 32 must edit the problem knowledge base by adding a question and modifying an example. Using the configuration editor 110, the author 52 would invoke the problem reader 24 to read the referential content for the desired problem knowledge base 13. The author 32 could then use the problem editor 18 either to modify description content for the desired example or to modify the referential content for that example (e.g., associate the example with a different concept). When the user 34 then accesses the content for this example, it is accomplished via a call to the tutor maker 120 which invokes the action handler 42 which invokes the tutorial manager 44 which will use the problem reader 24 to load the referential content for the problem knowledge base through which the descriptive content for the example is retrieved and sent back to the user. Again note that if the user has already established a user session 48 via a previous input, then the user session itself has a reference to the referential content for the problem knowledge base to gain access to the descriptive content for the example.

The remainder of FIG. 4 shows the data (i.e., content) contained in the various knowledge bases. The configuration 10 comprises a concept knowledge base 11, a problem knowledge base 13 (made up of question knowledge base 17 and example knowledge base 19) and a pedagogy knowledge base 15. The author uses the concept editor 16 to create/edit the concept knowledge base 11, the problem editor 18 to create/edit the problem knowledge base 13 and the pedagogy editor 20 to create/edit a pedagogy in pedagogy knowledge base 15. To better illustrate the configurations 10, presume that an author 32 has created one concept knowledge base 11, 25 different problem knowledge bases 13, and three different pedagogies in pedagogy knowledge base 15 (e.g., a pedagogy for beginning, intermediate and advance users). Each triplet of the concept knowledge base, one problem knowledge base and one pedagogy would constitute a single configuration 10.

Figure 5:
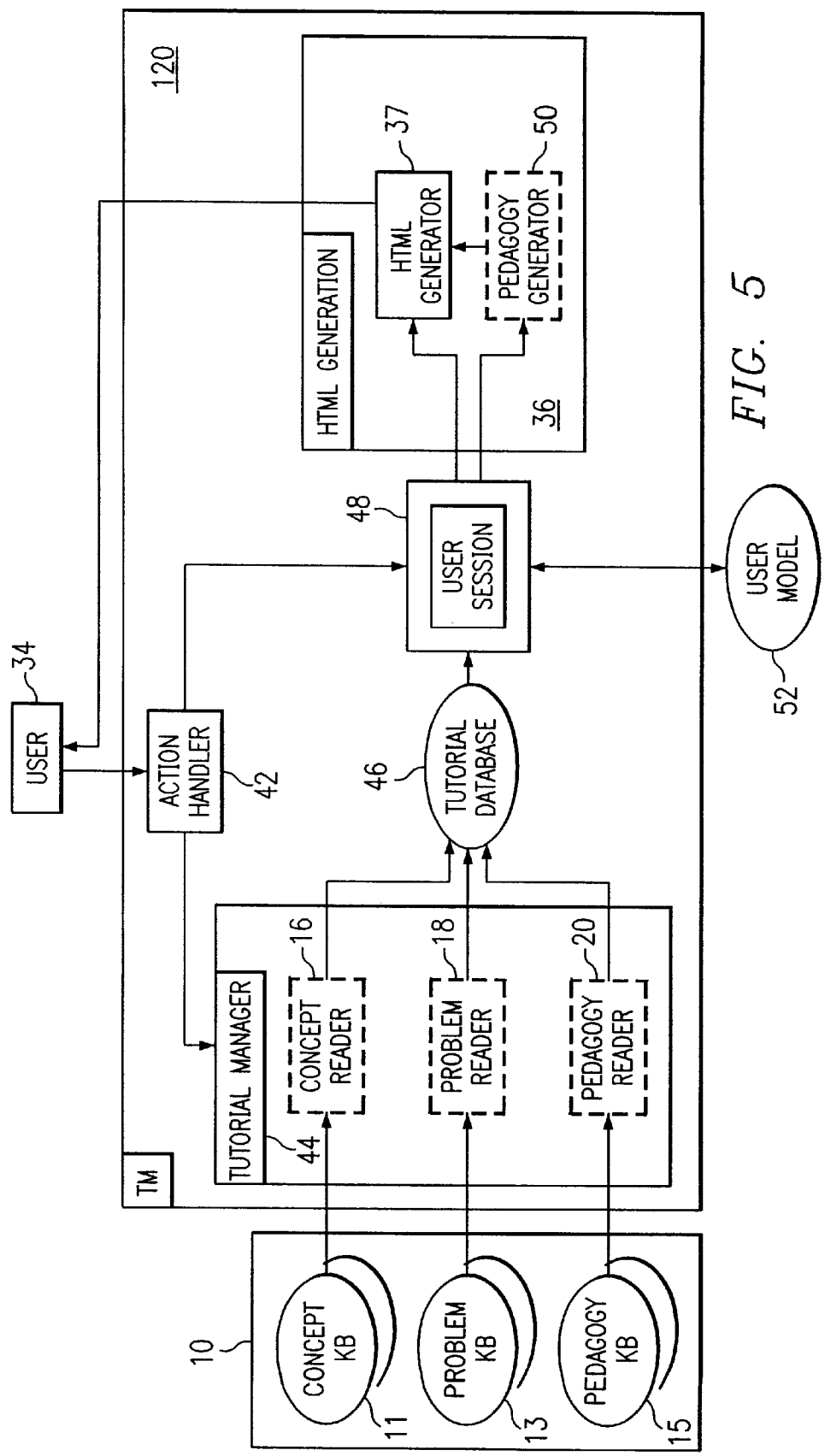
FIG. 5 illustrates in more detail the tutor maker of the FIG. 2 embodiment.

FIG. 5 is a diagram detailing the tutor maker 120 of FIG. 3. As shown, when the tutorial manager 44 builds a representation of configuration 10 as tutorial database 46, concept reader 16 accesses the appropriate concept knowledge base 11, problem reader 16 accesses the appropriate problem knowledge base 13 and pedagogy reader 15 accesses pedagogy knowledge base 15. FIG. 5 further illustrates the various pedagogy options open to user 34. If user 34 simply follows the existing pedagogy created by the configuration editor 120, the user session 48 returns responses to the user through the standard HTML generator 37 as shown in path labeled (a) within HTML generator 36. In contrast, if user 34 decides to deviate from the existing pedagogy, the user session 48 returns responses to the user through the pedagogy generator 50, then standard HTML generator 37 as shown in path labeled (b) within HTML generator 36. Finally, the user 34 may opt to manually traverse the content of a configuration in which case the pedagogy generator is also bypassed via path (a).

Figure 6:
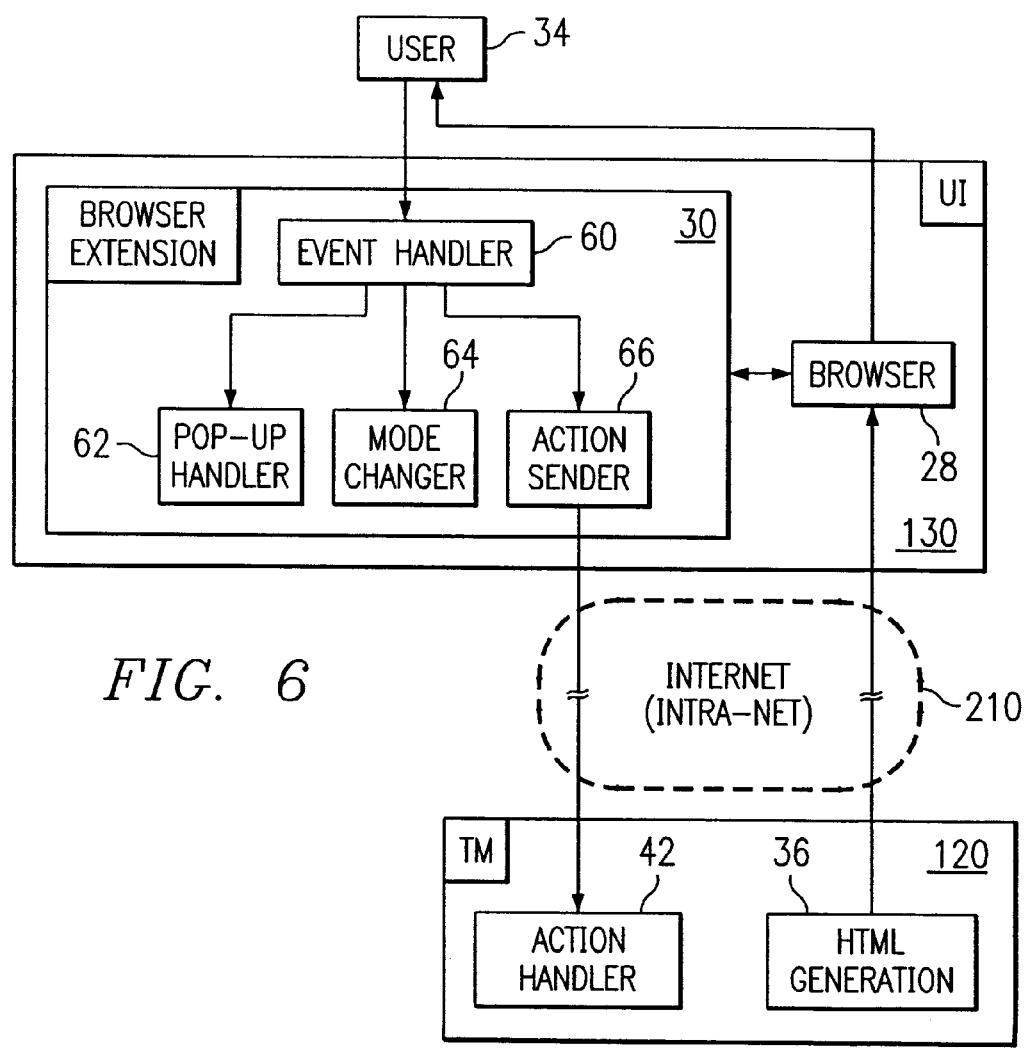
FIG. 6 shows one embodiment of the user interface according to the present invention.

FIG. 6 is a diagram illustrating the interaction between the user 34 and the tutor maker 120 via user interface 130. User interface 130 comprises a browser 28 and a browser extension 30 as shown in FIG. 6. Browser 28 can be any internet browser, such as Microsoft internet Explorer or Netscape Navigator or Communicator. It should be understood that different user interfaces 130 could be developed that do not require the use of an internet browser. However, for delivery of content to a user 34 over the internet, the use of a browser 28 within user interface 130 is the preferred embodiment. The user interface 130 extends the browser 28 with browser extension program 30 that includes an event handler 60. An event handler 60 is a well understood computer science mechanism for allowing a user 34 to generate an event to be acted upon by another program (in this case the tutor maker 120). The particular event handler 60 shown in FIG. 6 includes a pop-up handler sub-program 62, a mode change sub-program 64 and an action sender sub-program 66. As user 34 makes a request, that request goes to the event handler 60. The three sub-programs receive the input commands from the event handler 60 and if either a mode change or a window pop-up is required for that command, the pop-up window 62 or mode changer 64 respond accordingly. The action sender 66 will transmit the command through the network 210 to the action handler 42 of the tutor maker 120. An event can either generate an action that is sent to the tutor maker 120 by action sender 66 or the event can build directly into the browser (e.g., close a window type event).

The browser extension 30 can be built to be compatible with both currently dominant internet browsers, Microsoft internet Explorer and Netscape Navigator or Communicator, by writing the browser extension 30 in javascript, jscript, or any other compatible browser scripting language. However, it should be understood that the user interface 130 could be run with any browser by, for example, including a step for detecting which browser 28 was running on the user's machine and sending a compatible browser extension 30 for that particular browser 28. During the operation of one embodiment of the dynamic knowledge delivery program 100 of the present invention, each time the user 34 inputs a command, the browser extension 30 is loaded (i.e., the particular Java script file that is the browser extension 30). The browser extension 30 includes a set of functions that sit within browser 28. Thus, whenever the user 34 inputs a command, for example clicks on a hyperlink, the browser extension 30 is called and every HTML Web page that is generated by the tutor maker 120 and sent back to the browser 28 includes a reference to the browser extension 30. For example, the top line of the generated HTML page can included a reference to the browser extension 30, and when the browser 30 receives the HTML page from the tutor maker 120, the browser 28 now knows how to interpret the HTML page and reads it.

The dynamic knowledge delivery program 100 of the present invention can be programmed using C++, JAVA, or any other commonly utilized computer programming language. In the preferred embodiment for use over the internet, the programming language is JAVA to facilitate the delivery of content to a user over the internet. Another novel feature of the present invention includes, in an internet environment, the ability to access the tutor maker 120 using browser extension 30 and retrieve responses through browser 28 without actually calling different URL Web pages. This is accomplished using "script call" where the call actually sends the request for a URL over the internet to a servlet program that takes the request, generates a response in HTML format and sends the HTML page to the user's existing URL. Thus, the tutor maker 120 need not have every potential HTML file that could be a response to a user request existing as a Web page with an associated URL, but rather each HTML page response is generated upon each request and sent back to the user via the browser 28. For example, when the user 34 logs in, a call goes to the tutor maker program 120 to generate and send back a particular HTML page that is a form that can include a login box, a password box, and a submit button. Similarly, user 34 can call the tutor maker 120 on the server computer 230 to generate all of the HTML page responses upon request.

This novel architecture also allows for delivery of a configuration 10 to a particular user 34 in a unique manner compared to typical internet applications. Assume a particular user 34 logs in and is having a particular tutorial delivered. Further assume the user leaves the computer, but remains logged on at a certain point in the tutorial. The user 34 now goes to another computer and links to the internet using a different browser 28 (e.g., uses Netscape Navigator on the second computer while the first was using Microsoft Explorer). The user 34 again logs into the tutor maker 120 on server computer 230 to view the same tutorial. The tutor maker 120 according to the present invention can determine that this user 34 is already viewing this tutorial in a different place on the internet and can send a message asking the user whether the user wants to log off the original computer and view the tutorial from the present location. If the user 34 responds in the affirmative, the tutor maker 120 will log off the first location and bring up the tutorial in precisely the place the user left off earlier. Thus, the dynamic knowledge delivery program 100 of the present invention is internet aware in that it can (1) allow multiple users to simultaneously view the same or different configurations and (2) can move the same user from a first location to a second location while maintaining the history on a particular tutorial (without the user having to save the tutorial on a disk and take it to the new physical location). This particular novel programming feature can be used in a variety of information delivery processes over the internet. For example, in an e-commerce application, a shopper could be half way through a transaction and need to change locations. The shopper could leave the first computer with the transaction half completed, log on to the same site at a different computer and continue the transaction at the same place. Essentially, this programming feature will work for any internet function that requires a user to log on.

Figure 7:
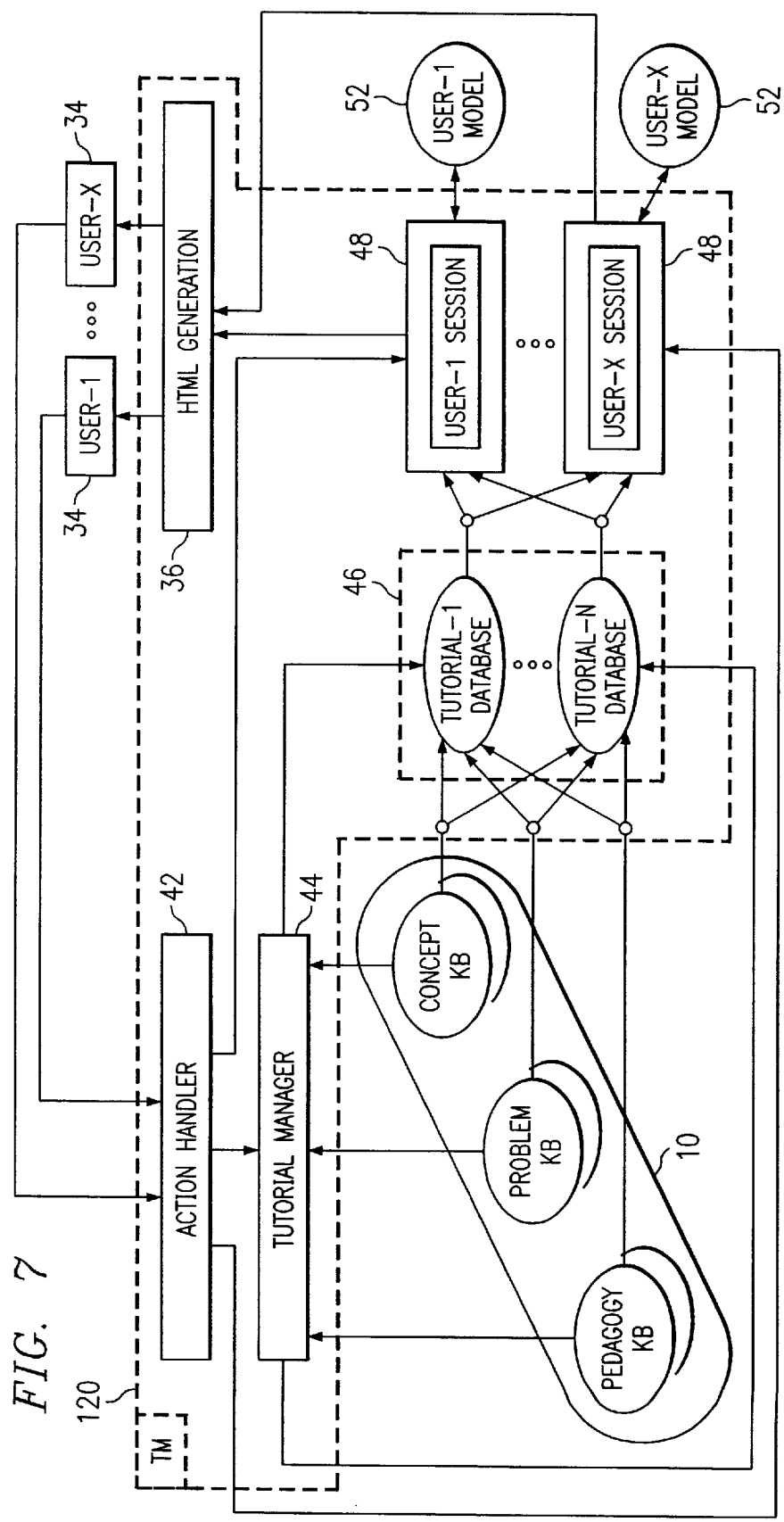
FIG. 7 illustrates in greater detail the interaction between the user and the tutor maker.

FIG. 7 is a partial detailed diagram of the tutor maker 120 of FIG. 3 to illustrate the ability of the present invention to manage multiple users 34 viewing multiple configurations 10. In FIG. 7, "x" users 34 have opened user sessions 48 and have accessed "n" configurations 10. Tutorial manager 44 has therefore labeled "n" configurations 10 into the tutorial data base 46 (i.e., by reading in the three knowledge bases of each configuration 10). Thus, x users 34 are accessing the n tutorial data bases 46. For example, assume ten total users and that user number 5, user number 7 and user number 10 are accessing the same concept knowledge base 11. Therefore, tutorial database numbers 5, 7 and 10 share the same concept knowledge base. However, only one instance of that particular concept knowledge base would be loaded in memory within tutorial data base 46. Let's further assume that user numbers 5 and 7 are also accessing the same problem knowledge base, but user number 10 is accessing a different problem knowledge base. An instance of each of these separate problem knowledge bases would then be loaded in tutorial data base 46. Thus, for users 5, 7 and 10, we have three user sessions 48, two tutorial databases 46 each sharing one instance of the concept knowledge base.

FIGS. 8–14 illustrate exemplary abstract views of the data structures for some of the components of the dynamic knowledge delivery program 100. It should be understood that the elements could include different data structures than those exemplary data structures shown. FIGS. 8–14 show the abstract views of objects developed using object-oriented programming.

Figure 8:
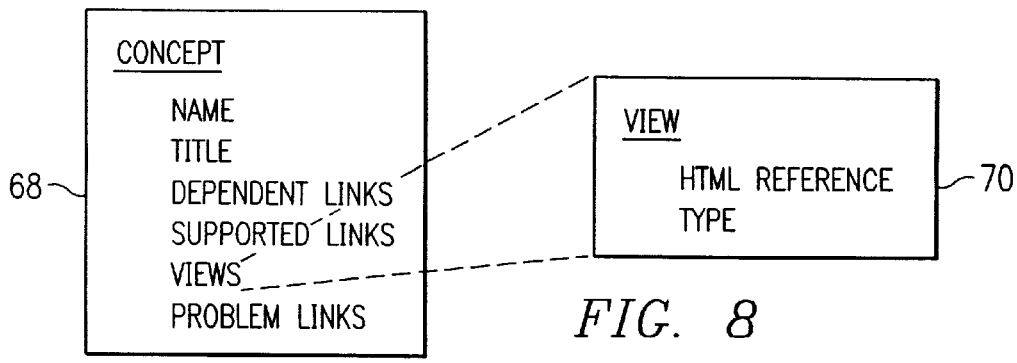
FIGS. 8–14 are schematic representations of the data structures for programming elements of the present invention for an object oriented embodiment.

FIG. 8 shows a concept knowledge base data structure 68, which is the referential component of a concept class. The concept knowledge base is the set of concepts created by the author that will be delivered to the user. The set of concepts can be stored in a variety of standard computer science mechanisms (e.g., lists, hash tables). The concept knowledge base data structure 68 shown in FIG. 8 includes a name, a title, dependent links, supported links, views and problems links. The name is the name the author assigns the concept and the title is the way the concept appears when shown to the user (which can be different from the name). The dependent links are the references to additional concepts that this concept breaks down into, while the supported links are references to the additional concepts that this concept supports. The dependent and supported concept links represent the taxonomy created by the author when inputting the concepts. The problem links are the set of examples or questions associated with this concept, and are used to link the concept to all of its associated problems in the problem knowledge base. The views would contain references to the descriptive content associated with the concept that may be presented to the user. This descriptive content may include audio chips, text, streaming video or whatever other form of data represents the concept description. The concept view 70 is an instance of the concept class that is further illustrated to have an HTML reference (for example, a detailed view for a beginner versus a more limited view for an advanced user), and a type that is a label associated with the particular kind of view (detailed versus limited).

Figure 9:
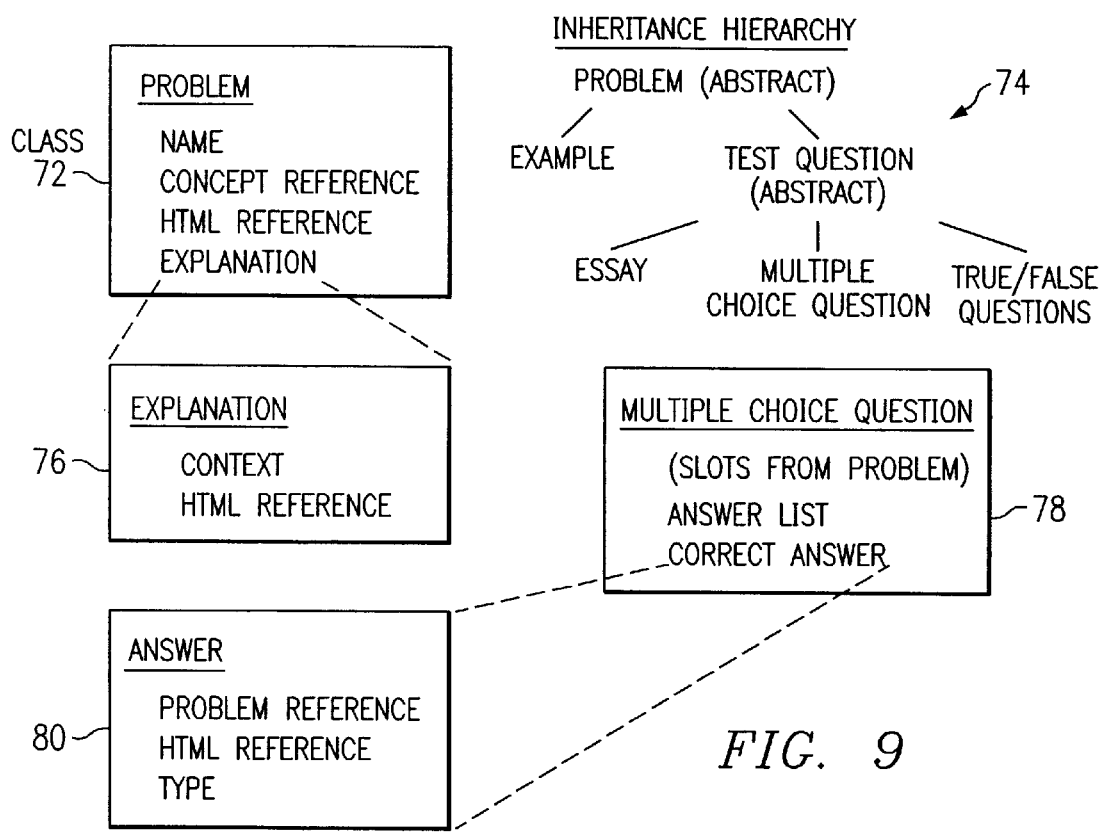

FIG. 9 shows a problem knowledge base data structure 72, which is a problem class. Again, the problem knowledge base is a set of problems that can be stored as a hash table, list, etc. FIG. 9 also includes the inheritance hierarchy of the problem class to illustrate that other objects are derived from the abstract problem class 72. As problem inheritance hierarchy 74 illustrates, an abstract problem type is either an example or a test question, where the test question is again an abstract class that is either an essay, a multiple choice question, or a true/false question. Thus, the derived classes of problem, essay, multiple choice question and true/false question are derived from the general problem class and "inherit" all of the attributes of problem class 72, including a name, concept reference, HTML reference, and explanation. Thus, each problem has some kind of name associated with it, a pointer to the concept with which it's associated, HTML that describes it, and an explanation of the problem. The explanation data structure 76 is an instance of the problem class 72 that provides context for the explanation and an HTML reference. The multiple choice question data structure 78 is an instance of the problem class 72 that includes an answer list and the correct answer, where the correct answer data structure 80 includes a problem reference (what problem is this the correct answer for), an HTML reference (the answer) and a type (what type of answer).

Figure 10:
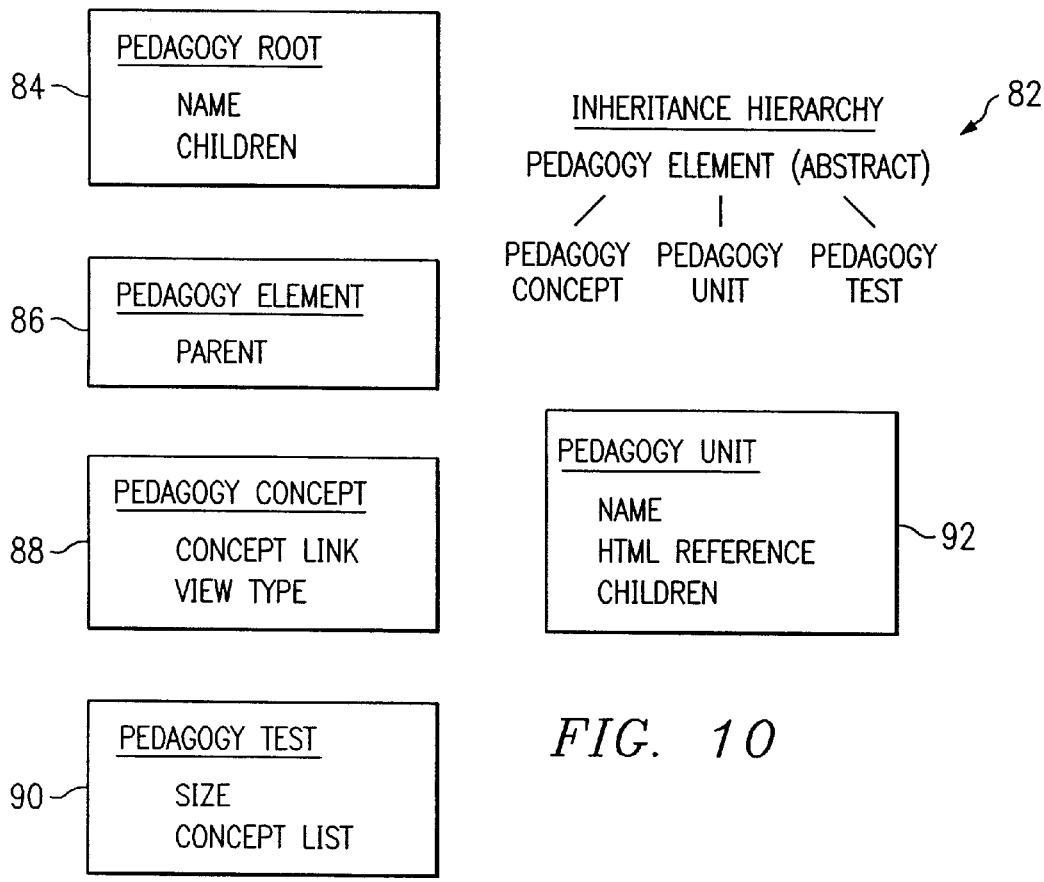

FIG. 10 illustrates the abstract data structures and inheritance hierarchy for the pedagogy knowledge base. The pedagogy knowledge base inheritance hierarchy 82 shows the abstract pedagogy element class from which the pedagogy concept, pedagogy unit and pedagogy test are derived. Thus, the pedagogy element actually is a concept, a unit (i.e., a group of concepts) or a test. The pedagogy element at the start of the pedagogy is called the pedagogy root data structure 84 that has a name and it's children. Note that every pedagogy element has a reference to its parent, which would be empty if the pedagogy element was the root. For example, Concept 1 could have a parent of Chapter 1, whereas Chapter 1 may have no parent. The pedagogy element 86 is the abstract class from which the pedagogy concept instance 88, pedagogy unit instance 92 and the pedagogy test instance 90 are derived. Therefore, pedagogy concept class 88, pedagogy unit instance 92 and the pedagogy test instance 90 inherits everything from the pedagogy element class 86, i.e., the parent, plus the concept link and the view type. The concept link indicates the location of the concept within the pedagogy and the view type indicates the type of descriptive content to be retrieved from the concept to be presented to the user. Similarly, the pedagogy unit instance 92 would include the name for the unit, a reference to the children concepts contained in the unit (e.g., sections contained in a chapter), and any descriptive content (HTML) associated with the unit as a whole (e.g., an introduction to a chapter). The pedagogy test instance 90 includes the size (e.g., number of questions) and the list of concepts that are covered by the test.

Figure 11:
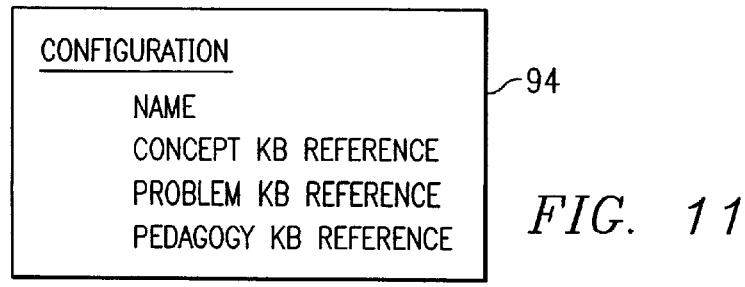
Figure 12:
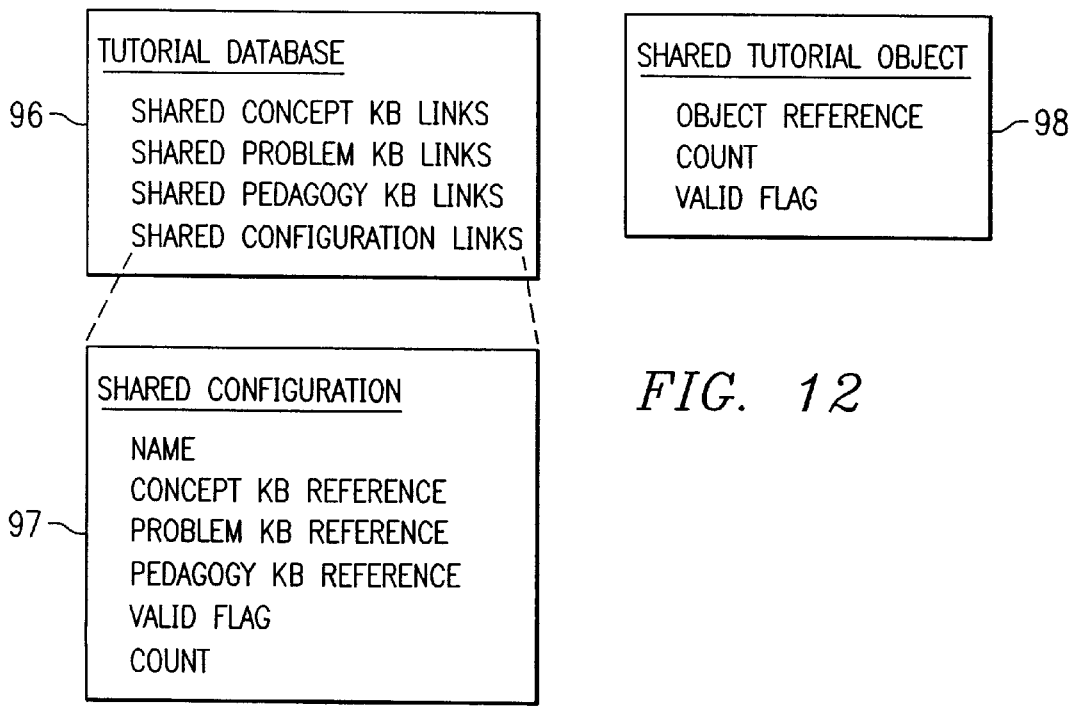

Similarly, FIG. 11 shows a configuration data structure 94 that can include a name and references to the concept knowledge base, the problem knowledge base and the pedagogy knowledge base. Note that the references to the problem knowledge base and pedagogy knowledge base can be optional. FIG. 12 shows exemplary tutorial database data structure 96, shared configuration data structure 97 and shared tutorial object data structure 98. Because the tutorial database tracks the concept knowledge bases, problem knowledge bases and pedagogy knowledge bases, the tutorial data base structure 96 can therefore have a shared concept knowledge base link, shared problem knowledge base link, a shared pedagogy knowledge base link, and a shared configuration link. The shared tutorial object 98 is an abstract class that can work for any shared knowledge base. Thus, the shared concept, problem, and pedagogy knowledge bases can all include an object reference, valid flag and a count. If the count goes to zero (i.e., no instances of a shared object are open), the object can be closed. The next time a user wishes to access that object, it must be loaded into the tutorial database 46. Similarly, the shared configuration can include all of the properties of the shared configuration abstract class 97, including a name, the triplet comprising the configuration, a valid flag, and a count.

Figure 13:
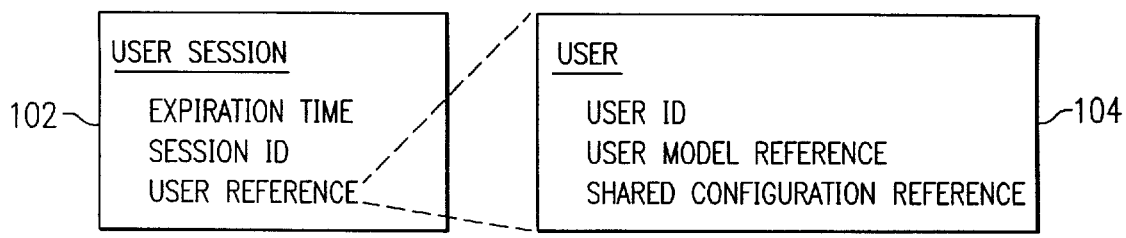
Figure 14:
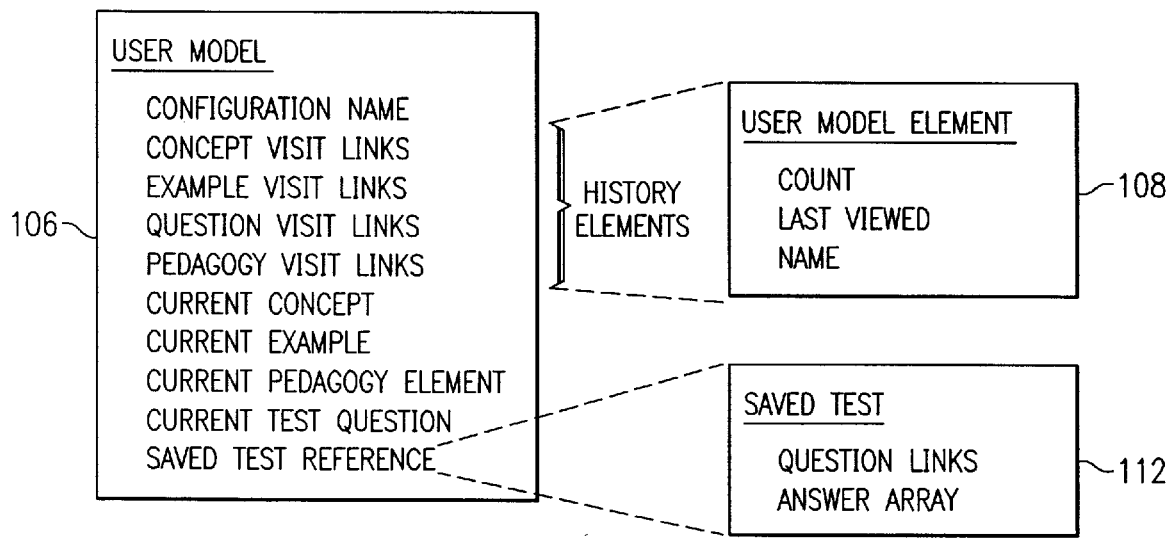

FIG. 13 shows exemplary user session data structure 102 and the user data structure 104 associated with it. As shown, the user session 104 includes an expiration time, a session ID, and a reference to the associated user data structure 104 which has a user ID, a user model reference and a shared configuration reference. The session ID is the unique ID assigned to that particular session. This unique ID enables the program 100 to determine that a request from a user is associated with a particular session. The user reference includes the information about the user, including in this example the user's ID, any user model that has been built for this user, and any shared configuration the user is viewing. FIG. 14 shows a user model data structure 106 which contains lists of user model element data structures 108 (that includes a count, the last time viewed, and a name). As elements of the configuration are displayed to the user, user model element data structures are created and stored in the user model 106 The user model data structure 106 further includes any historical information about the user that is recorded by the dynamic knowledge delivery program 100 (exemplary data shown in FIG. 14). The saved test instance 112 of the user model class 106 can be used to save previous test scores of a user, and as shown includes the question links and the answer array.

Figure 22:
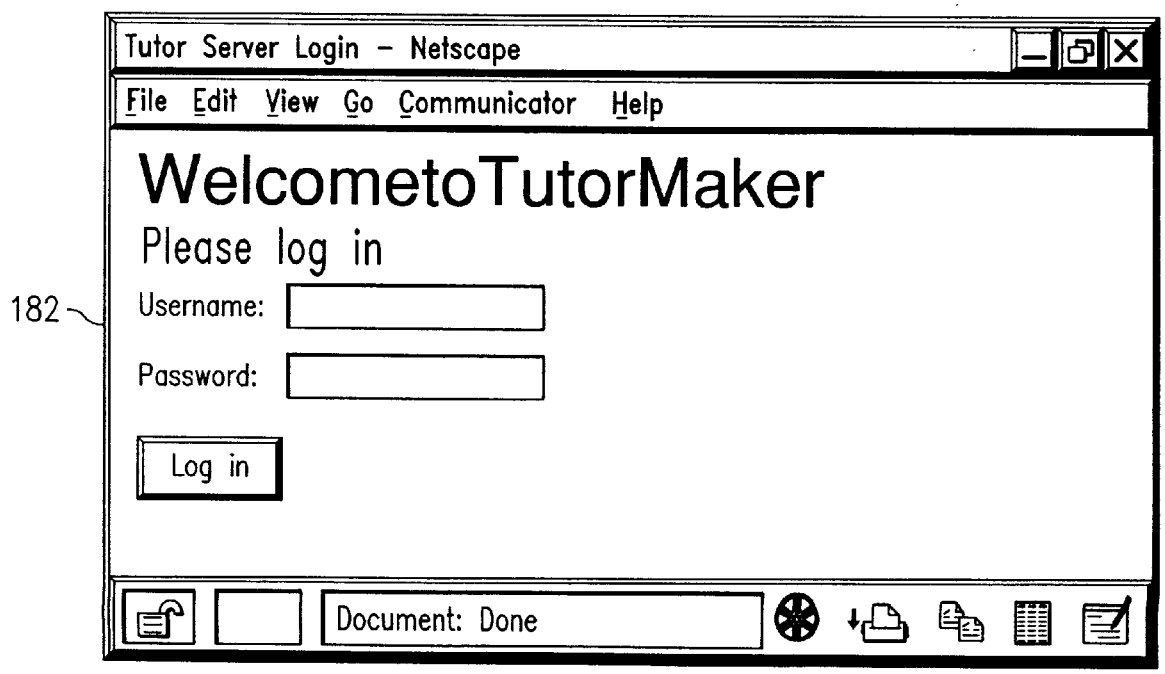
Figure 23:
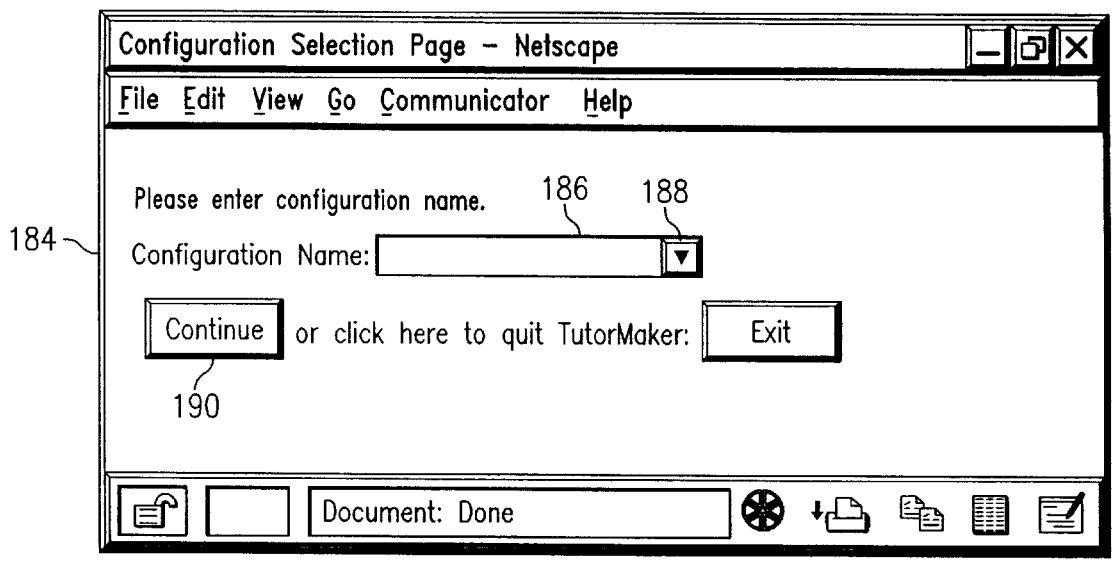
Figure 24:
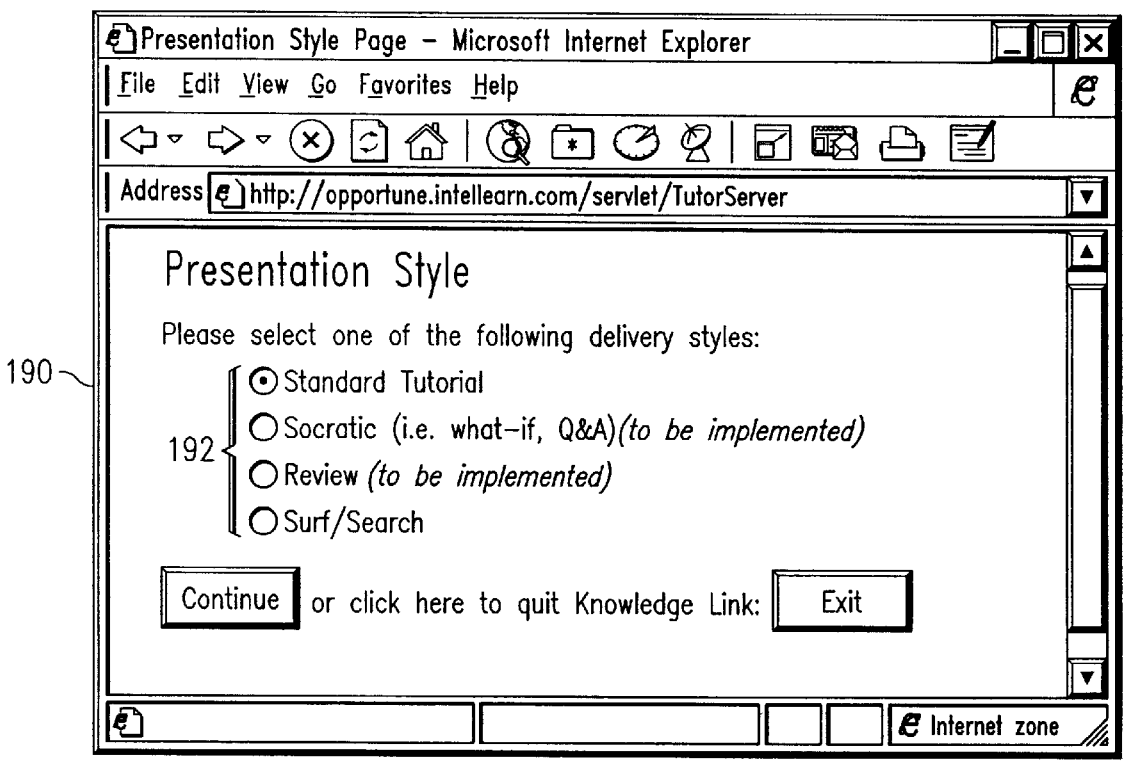

FIGS. 15–27 show exemplary windows of the dynamic knowledge delivery program 100 of the present invention. The windows are taken are exemplary and can be created using any visual editor software program, including, for example, Visual Cafe. FIGS. 15–21 show exemplary windows for what the author sees on the authoring side (i.e., configuration editor 110 side), while FIGS. 22–27 show exemplary windows for what the user sees on the delivery side (i.e., the user interface 130 and tutor maker 120 side). As indicated in FIGS. 22–24, the windows can be generated on either a Netscape or Microsoft browser, or alternatively, without a browser for a non-internet application of the present invention.

Figure 15:
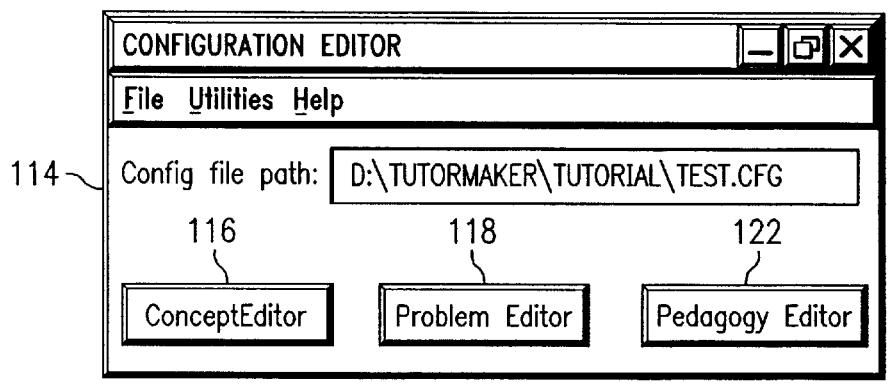
Figure 16:
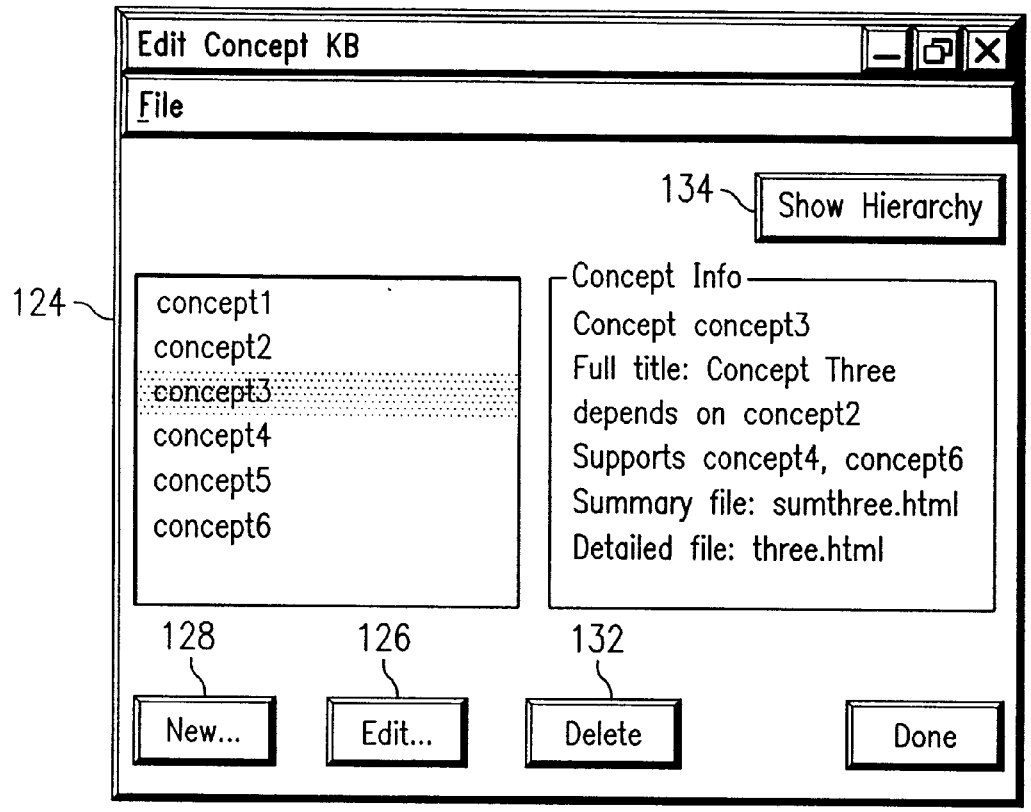

FIG. 15 shows a configuration editor window 114 that could be used to initiate configuration editor 110 of FIG. 3. The configuration editor window 114 allows an author 32 enter a configuration file location ("D:\TutorMaker\tutorials\test.cfg") into the config. file path field. The configuration editor window 114 also allows the user to access the concept editor 16, the problem editor 16 and the pedagogy editor 20 using the concept editor button 116, the problem editor button 118 and the pedagogy button 122, respectively, in order to create and/or edit the concept, problem, and pedagogy knowledge bases. FIG. 16 shows the concept editor window 124 that can come up on the author's network computer 240 upon clicking the concept editor button 116 of FIG. 15. Concept editor window 124 can list all of the concepts (i.e., concept 1 through concept 6) contained in the configuration 10 chosen in FIG. 15. As shown, concept 3 is highlighted using the cursor and the right hand portion of the window lists a summary of the concept information for concept 3. Concept 3 has a name (concept3), a title (Concept Three), a taxonomy (concept 3 depends on concept 2 and supports concepts 4 and 6), a summary file summarizing concept 3 (sumthree.html) and a detailed file (three.html) providing all of the information the author input about concept 3. The content of concept 3 can be modified by clicking on the "Edit" button 126 or deleted entirely by clicking on the "Delete" button 132.

Figure 18:
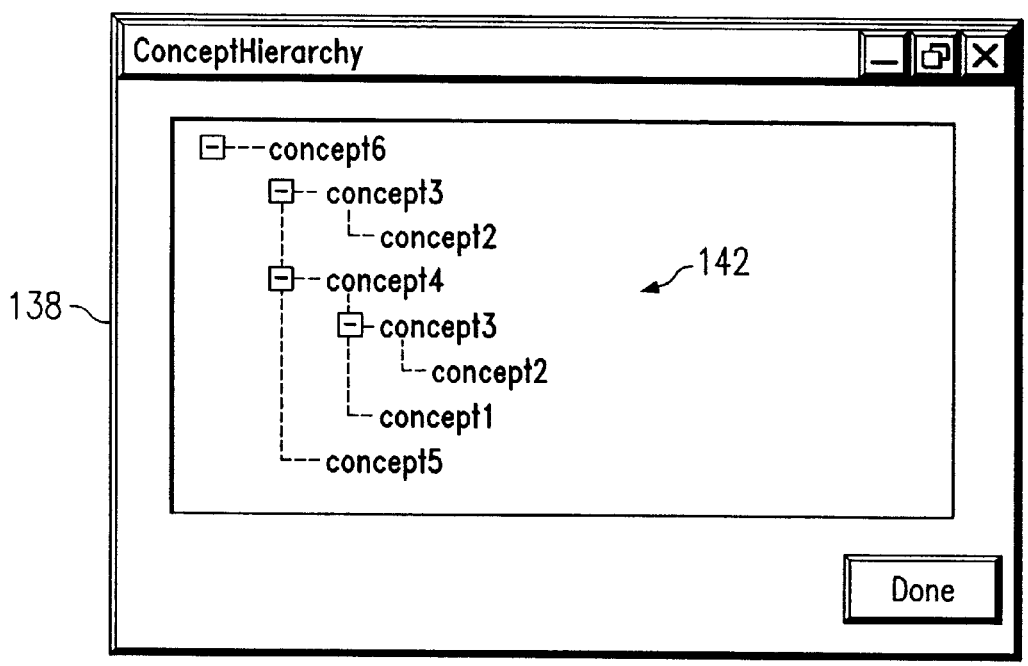
Figure 17:
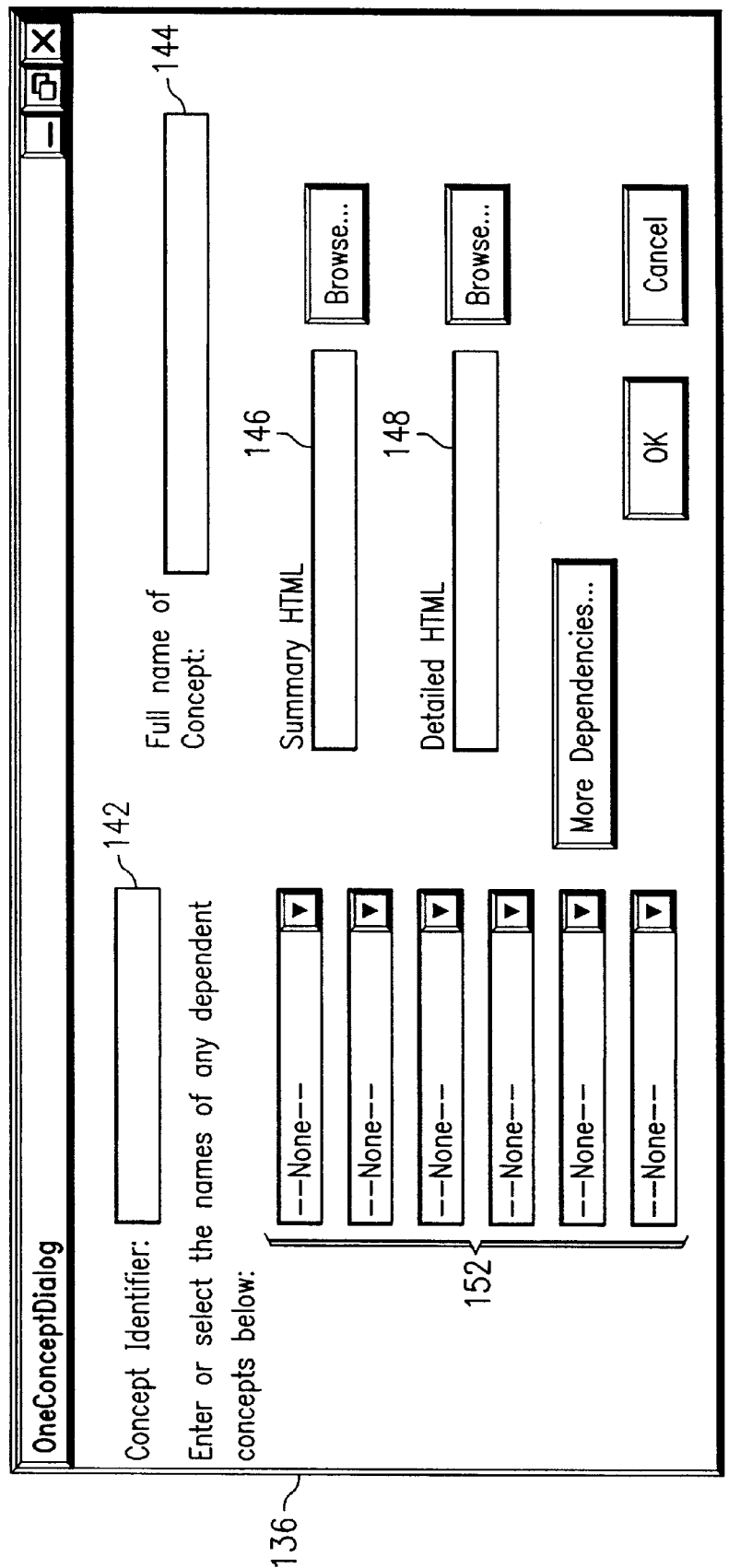

A new concept can be added to the configuration 10 by clicking on the New button 128 and creating the concept using the OneConceptDialog window 136 of FIG. 17. Similarly, clicking on the show hierarchy button 134 will result in bringing up the ConceptHierarchy window 138 of FIG. 18. If the author is creating a new concept, the OneConceptDialog window 136 will look as it does in FIG. 17 (i.e., without any information in the fields). If the author is editing an existing concept, the existing information for this concept would show up in the fields. As shown in FIG. 17, the author can give the new concept an identifier in the name field 142 and full name in the title field 144. The OneConceptDialog window 136 then allows the author to input the location of a summary HTML file in field 146 and/or the location of a detailed HTML file in field 148. Taxonomy fields 152 provide the important function of allowing the author to indicate the relationship between the new concept being added and existing concepts in the configuration 10. For example, if new concept 7 depends on concept 6, that can be entered into taxonomy field 152. The ConceptHierarchy window 138 of FIG. 18 shows a hierarchy tree 142 of the relationship (or taxonomy) between the concepts in configuration 10. For example, the hierarchy tree 142 shows that concept 3 depends on concept 2 and supports concept 6. As shown, concept 3 supports both concept 6 and concept 4.

Figure 19:
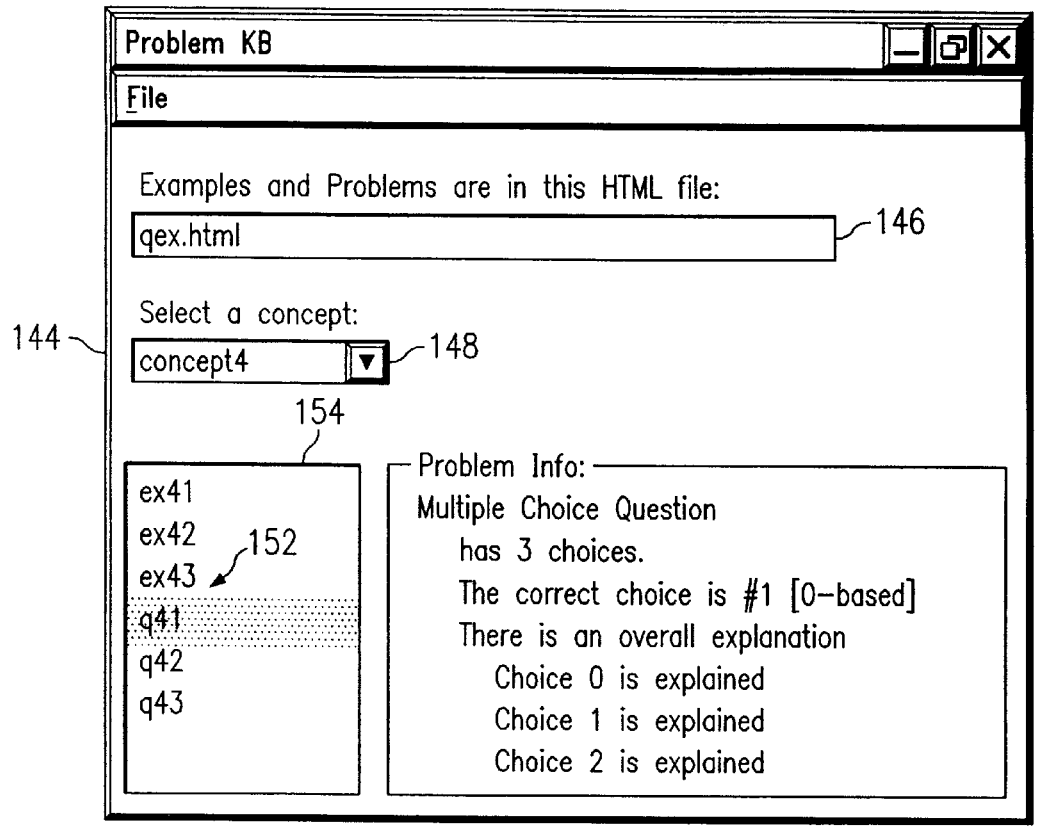

FIG. 19 shows an exemplary problem knowledge base window 144 that is brought up by the dynamic knowledge delivery program 100 when the author clicks on the problem editor button 118 of FIG. 15. An author can use problem knowledge base window 144 to create and/or edit problems for the selected configuration 10 of FIG. 15. As shown in FIG. 15, HTML file field 146 shows the HTML file that contains all of the problems, examples and questions related to the chosen configuration 10. Field 148 allows an author to select any concept within configuration 10 from a pull-down list of all the concepts in the associated concept knowledge base. The program 100 can then list all of the problems, examples and questions that the author entered into problem knowledge base for that concept in field 154. Highlighting a particular problem, for example question 41 as indicated in FIG. 19, causes the program 100 to display the information related to that problem on the lower, right side of the problem knowledge base window 144.

Figure 20:
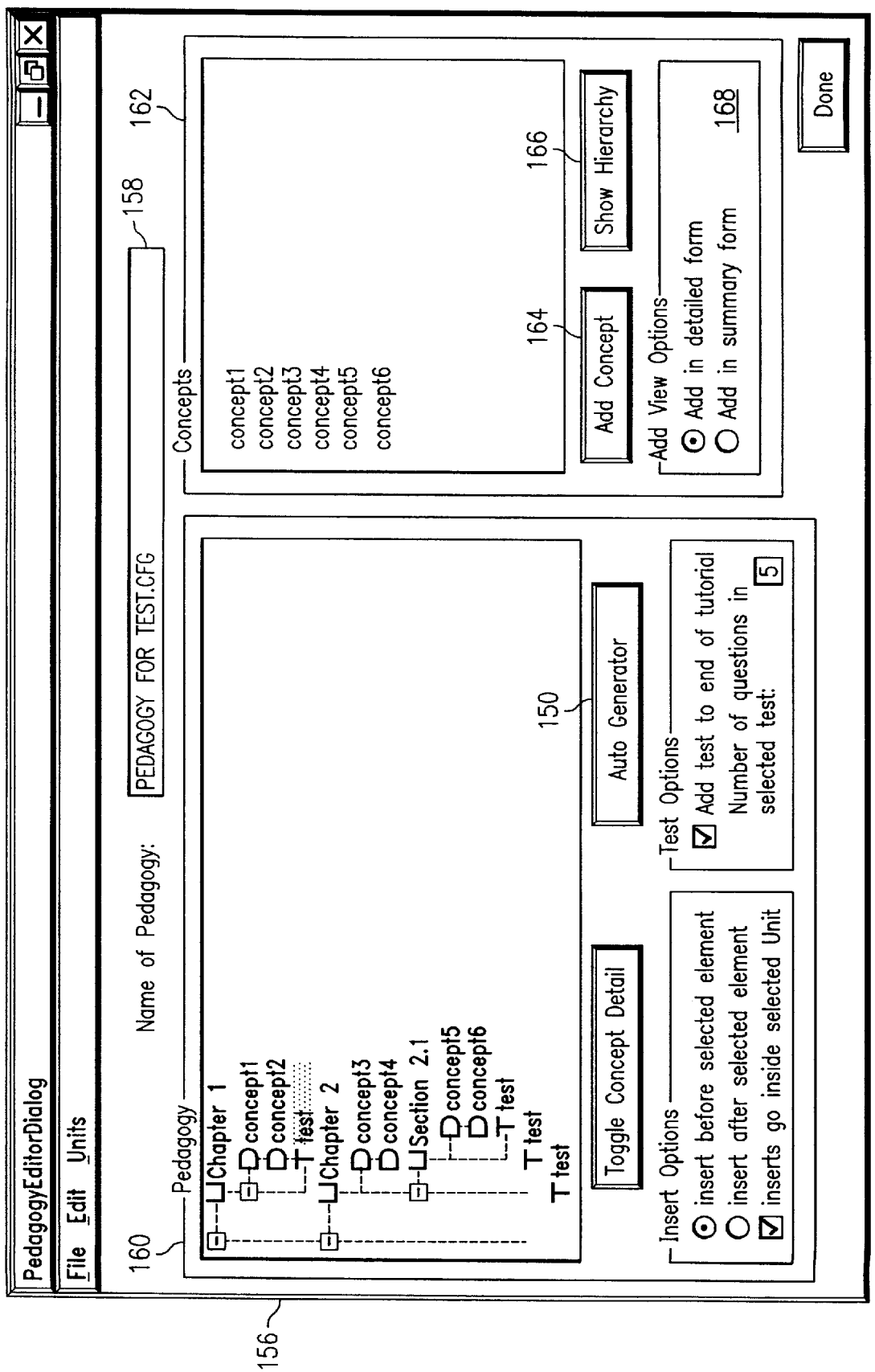

FIG. 20 shows the PedagogyEditorDialog window 156 that is generated when an author clicks on the Pedagogy Editor button 122 of FIG. 15. The pedagogy name field 158, indicates the name of the pedagogy for the configuration 10. The concepts field 162 lists all of the concepts contained within the concept knowledge base for the configuration 10 of FIG. 15. FIG. 20 illustrates a way to manually add concepts to a pedagogy and to show the hierarchy using buttons 164 and 166, respectively. When adding a concept using button 164, the add view options box 168 allows the author to add the concept in either detailed or summary form. By adding or deleting concepts, the author can manually generate or edit the pedagogy of pedagogy box 160.

Figure 21:
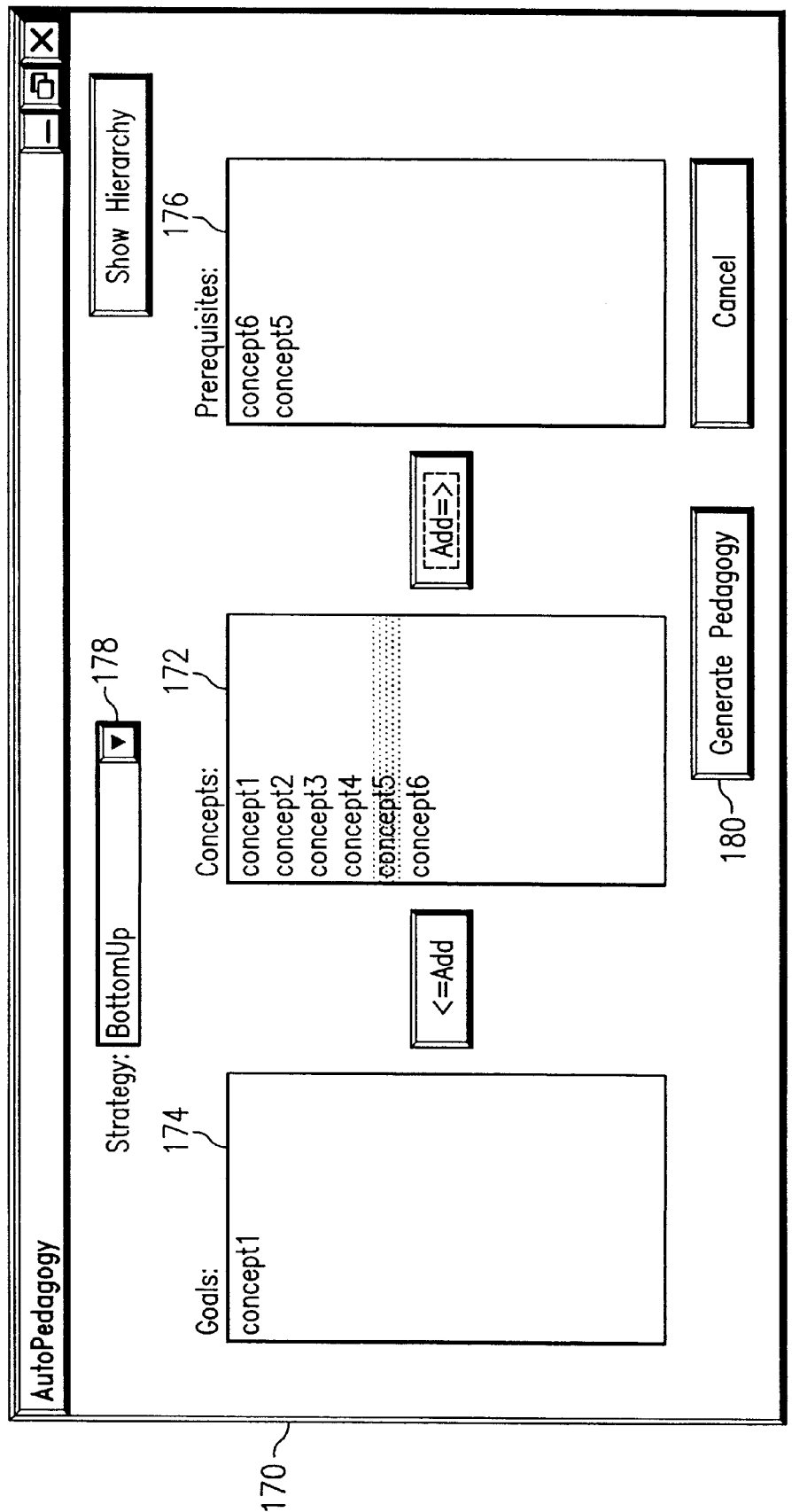

The author can also automatically generate a pedagogy (that will be displayed in pedagogy box 160) by clicking on the auto generation button 150, which can pull up the Auto Pedagogy window 170 of FIG. 21. In an alternative embodiment, the pedagogy can be automatically generated as the author inputs concepts into the configuration. The Auto Pedagogy window 170 will show a list of all the concepts in configuration 10 of FIG. 15 in field 172. The author can then choose the goal concept (i.e., the concept to be taught or conveyed) and which concepts are prerequisites (meaning once that concept has been explained, no further concepts that support a prerequisite concept need be explained). As shown in FIG. 21, the author has chosen concept 1 as the goal concept and concepts 5 and 6 as prerequisite concepts, and the program 100 has placed them in goal field 174 and prerequisite field 176, respectively. In computer science, a "graph" is a general term for any collection of linked objects. The concept knowledge base 11 is a graph built based on the taxonomy of the concepts. The strategy field 178 allows the author to designate the manner in which the graph is traveled between the chosen goal and prerequisites (shown as a "bottom-up" strategy). When the author clicks on the generate pedagogy button 180, the pedagogy generator 50 will automatically generate a pedagogy based on the strategy indicated. In FIG. 21, the strategy, goal and prerequisite indicators tell the pedagogy generator program 50 to start with the goal, end with the prerequisites or an end concept (no supporting concepts), and pick up every concept in between the two.

FIG. 22 shows an exemplary Tutor Maker Login window 182 that includes a username field and a password field to allow the user to log in to the tutor maker program 120. After a successful log in, the tutor maker 120 will generate a Configuration Selection window 184 (shown in FIG. 23) that allows the user to select a configuration 10 by typing the configuration name in field 188 (alternatively, a pulldown menu of all configuration names can be accessed through pulldown button 188). After user 34 has selected a configuration 12 by clicking on the continue button 190, the Presentation Style window 192 of FIG. 24 is generated for the user. The presentation style window 190 includes a list of option circles 192 that allow the user to select the presentation format for the configuration 10. As shown in FIG. 24, the user 34 has selected a standard tutorial format for presentation of the configuration 10. The present invention allows the generation of different presentation formats by its novel concept of completely separating the pedagogy from the content.

Figure 25:
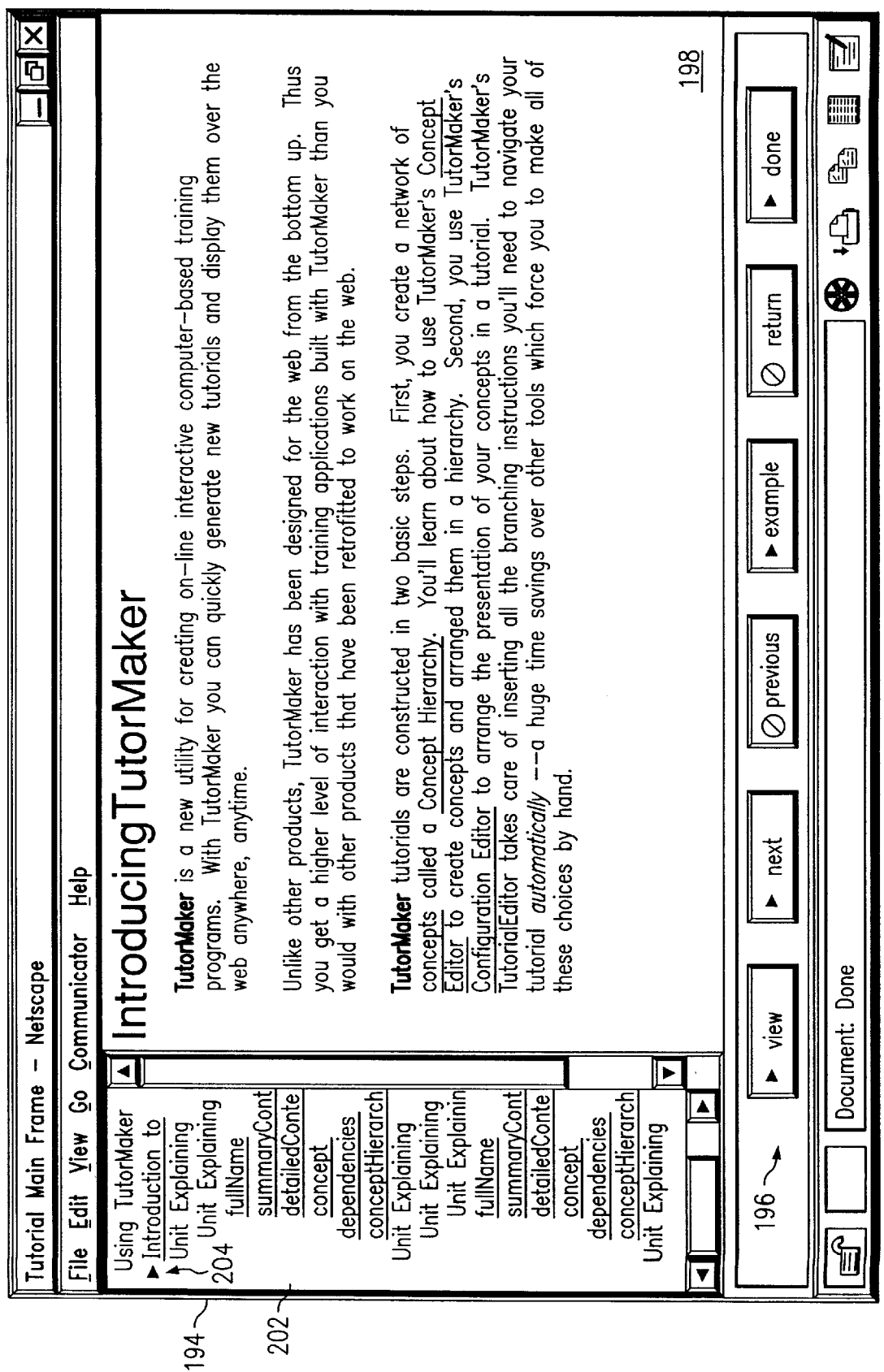
Figure 26:
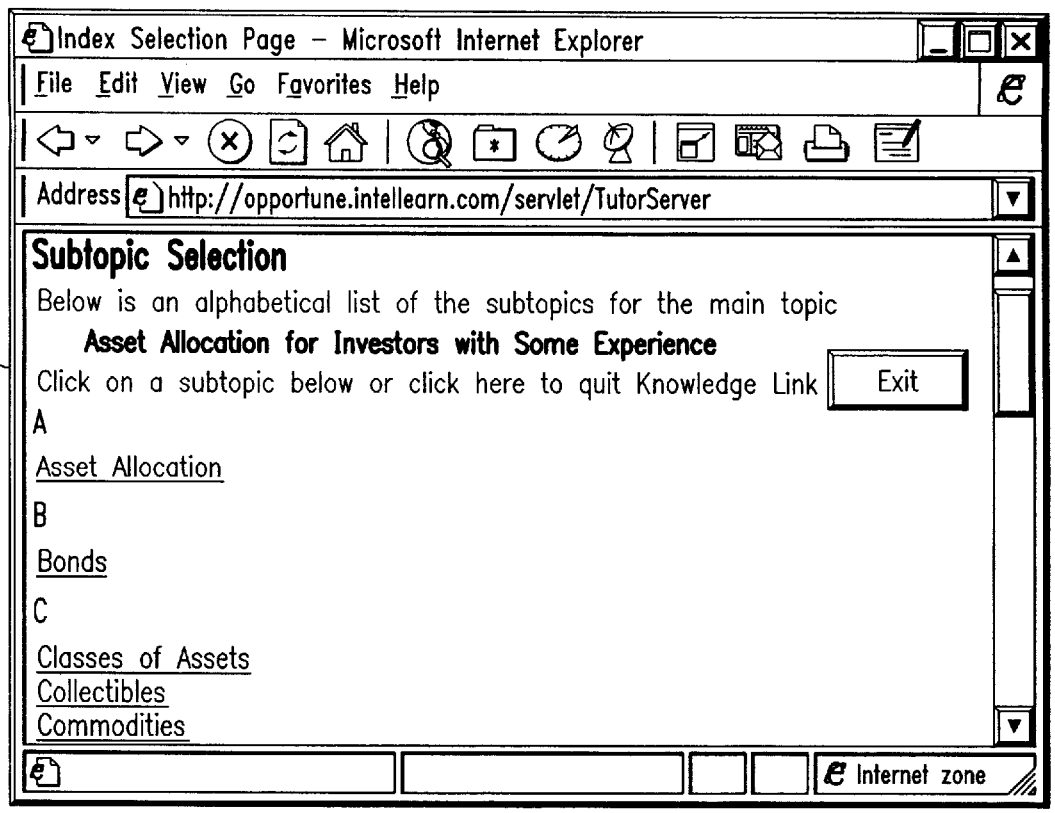

Upon clicking the continue button of FIG. 24, the tutor maker 120 will generate a Tutorial Main Frame window 194 as shown in FIG. 25 if a "Standard Tutorial" is selected or an Index Selection Page window 206 as shown in FIG. 26 if a "Surf/Search" selection is made. FIG. 25 is an example of a configuration 10 presented in standard tutorial format with a series of user control buttons on a user control button bar 196 that allow the user to further control the manner of presentation. The content box 198 is where the actual content created by the author is delivered to the user. The table of contents box 202 shows a listing of the concepts which corresponds to the pedagogy. The underlined concepts within the table of contents box 202 indicate hypertext links to the content associated with the underlined concept. The indicator triangle 204 shows the user where within the pedagogy the displayed content of window 198 is located. The control buttons on the user control button bar 196 allow the user to navigate the pedagogy and bring up different content pages. The control buttons can be automatically enabled and disabled as the user navigates the pedagogy. For example, sometimes the "example" button is turned off because no example exists for the concept being displayed in concept box 198. In alternative embodiments, the user control button bar 196 will contain different control buttons for presentation styles.

FIG. 26 is an example of a configuration 10 presented in a surf/search format which can be derived either by selecting "Surf/Search" while at the Presentation Style window 190 of FIG. 24 or by clicking on the "view" button of the Tutorial Main Frame window 194 of FIG. 25. FIG. 26 shows an index of all of the concepts for the configuration 10 available to the user in alphabetical order. The underlining indicates the concepts have hypertext links to the content associated with the concept. FIG. 27 shows a Surf Page window 208 that is produced when the user selects "Asset Allocation" from a surf/search index contained on an Index Selection window 206 as shown in FIG. 26. The user can now see the content associated with the concept asset allocation in the content box 198 and can link to concepts that are supported by the concept asset allocation in supported concept box 212 and/or concepts that support the concept asset allocation in sub concept box 214. Upon clicking on any of these supported or supporting concepts, the content associated with that topic will pop up in a similar Surf Page window 208.

Figure 28:
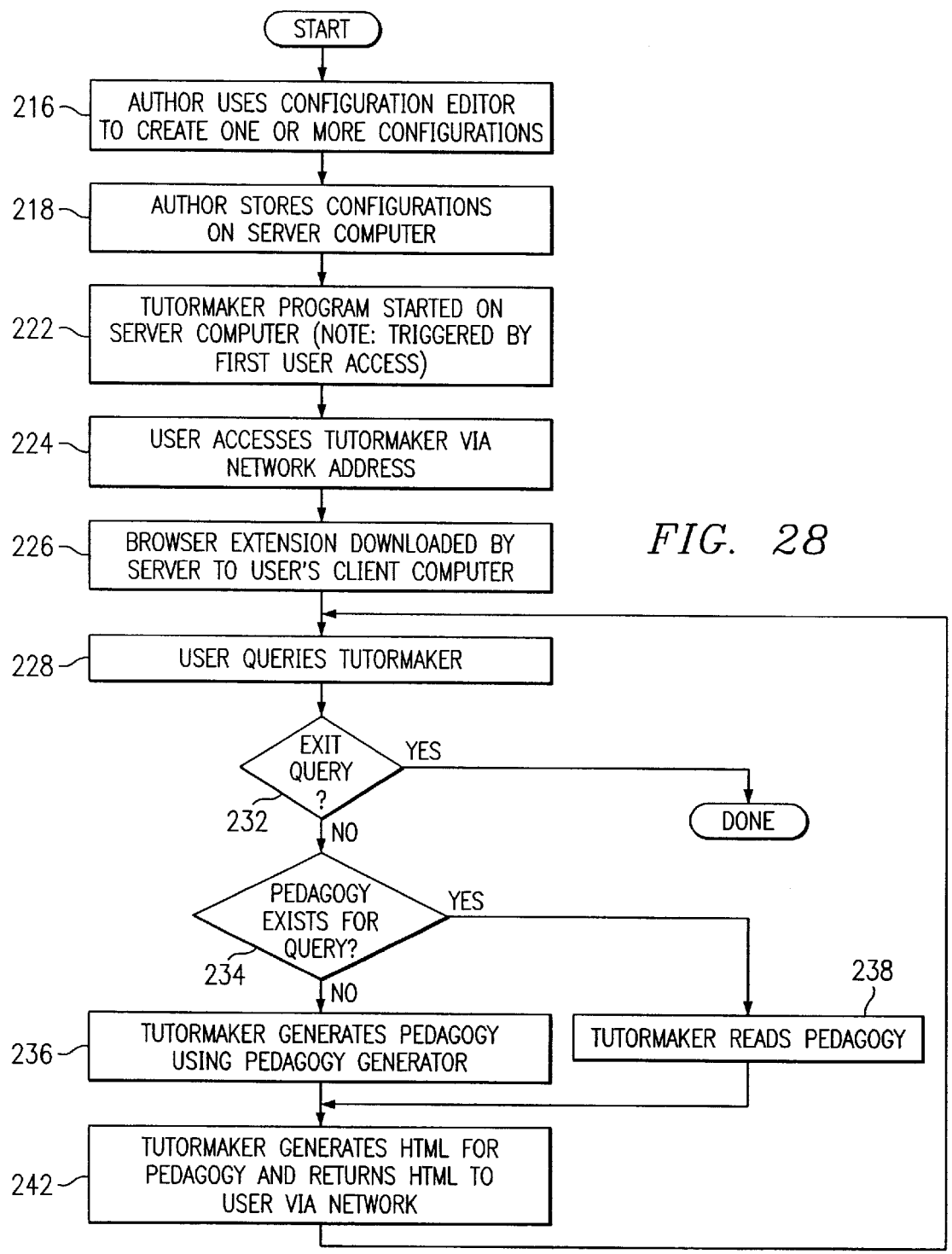
FIG. 28 is a flow diagram illustrating the operation of one embodiment of the present invention.

FIGS. 28–52 are flowcharts illustrating the operation of the dynamic knowledge delivery program 100 of the present invention. FIG. 28 is an overview flowchart of the dynamic knowledge delivery program 100. At step 216, the operation is begun with the author accessing the configuration editor 110 to create one or more configurations 10. The author stores the configurations 10 on the server computer 230 at step 218. The user initiates the tutor maker program 120 on server computer 230 using browser 28 on client computer 220 and accesses tutor maker 120 through network 210. At step 226, tutor maker 120 is executed by server computer 230 to download browser extension 30 to user's client computer 220. The user now has access to the tutor maker 120 and can now query tutor maker 120 as shown by the loop of steps 228 to 242. After making a query, the tutor maker 120 determines whether a pedagogy exists for the query. If not, the tutor maker 120 creates a pedagogy using pedagogy generator program 50 at step 236. The tutor maker 120 then reads the pedagogy and generates HTML for the pedagogy based on the user query and returns the generated HTML to the user over the network at step 242. This loop repeats itself until the user query is an exit query at step 232, whereupon the process is complete.

Figure 29:
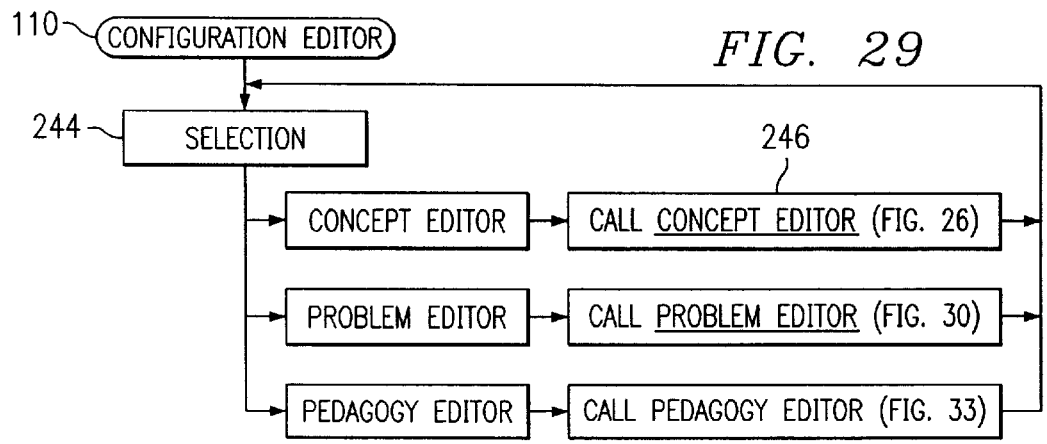
FIG. 29 is a flow diagram illustrating the operation of the configuration editor.
Figure 30:
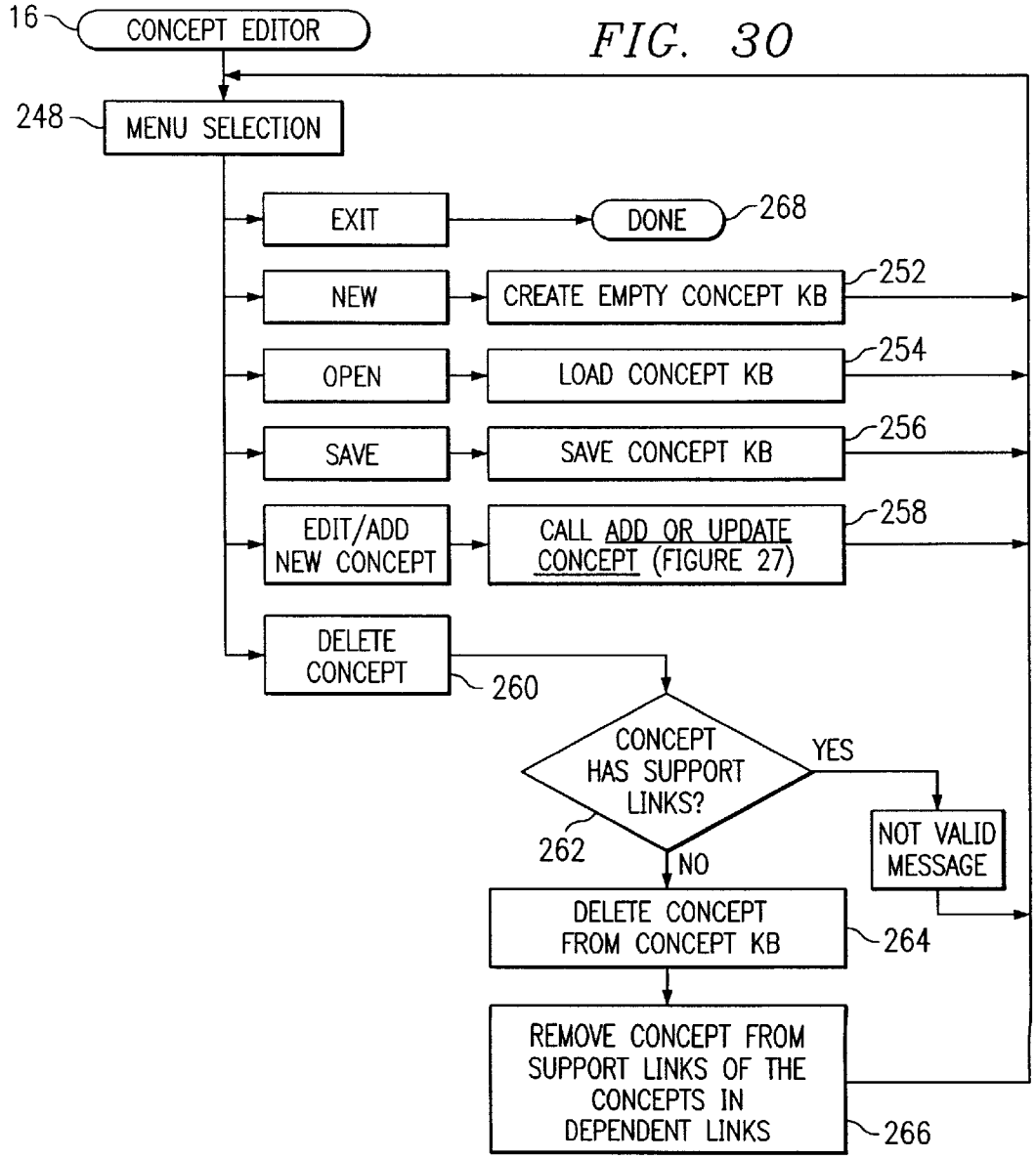
FIG. 30 is a flow diagram illustrating the operation of the concept editor.

FIG. 29 is a flowchart of the operation of the configuration editor program 110 of FIG. 4. The configuration editor program 110 allows the author to select one of the concept editor 16, the problem editor 18 or the pedagogy editor 20 at step 244. Depending on which editor is selected, the configuration editor 110 calls the appropriate editor as shown in step 246. FIG. 30 shows the operation of the concept editor 16. Initially at step 248, a menu selection is made by the author. The menu selections of FIG. 30 are delete concept, edit/add concept, save, open, new, and exit. The concept editor includes the new, open, and save functions to allow an author to create, load and save a concept knowledge base, respectively. Once a concept knowledge base has been opened or created (or saved) at steps 252, 254 or 256, the concept editor sends the author back to the menu selection where that author can command the concept editor 16 to add/edit a concept at step 258 (more fully described in FIG. 31) or delete a concept at step 260. To delete a concept, the concept editor 16 will check to see if the concept has supported links at step 262 and if it does, will return a "not valid" message to the author to prevent the deletion of supported concepts. For example, looking at the hierarchy of FIG. 18, the concept editor 16 would send a "not valid" message in response to a request to delete concept 4 because concept 4 is supported by concepts 3, 2 and 1. To delete concept 4, concepts 3, 2 and 1 must first be deleted, or the dependencies upon those concepts must be removed. In the alternative embodiment, the concept editor 16 could simply ask the author whether the author desires to delete concept 3 and all supporting concepts to which the author could answer "yes" and concepts 4, 3, 2 and 1 would be deleted or concept 4 would be deleted and the dependencies removed. If the concept to be deleted does not have supported links, the concept editor 16 will delete the concept from the concept knowledge base (step 264) and will remove all links to this deleted concept (step 266). The concept editor will continue to perform the delete, add/edit, save, open or new functions until the author selects the exit function at step 268.

It should be noted that the interface to the configuration editor 110 described in FIG. 30 may be implemented in any of a variety of ways which support a menu selection mechanism. This includes using the same browser extension techniques described for the tutor maker 120 whereby any standard browser may be extended to implement the interface. More specifically, the techniques outlined herein for the browser extension program 30 may be readily applied on the network computer 240 of FIG. 1 to implement the interface for the configuration editor 110.

In addition, the interface to the configuration editor 110 may be extended to allow for the operation of multiple authors simultaneously developing the same configuration 10. This may be achieved by a simple modification to FIG. 30 wherein every element of the configuration 10 (i.e., all structures described in FIG. 8, FIG. 9 and FIG. 10) are given an additional boolean "in-use" flag which is set to "true" any time that element of the configuration is being modified. With this additional boolean value, step 248 may be modified to first check the indicated element of the configuration 10 that is to be modified to see if its "in-use" flag is set. If so, the menu selection is disallowed. If not, the menu selection is allowed and the in-use flag is immediately set to "true." Once the author completes the operation and returns back to step 248, the in-use flag of the configuration element which was modified in the previous cycle is set to "false" allowing other authors the opportunity to modify that element of the configuration 10.

Figure 31:
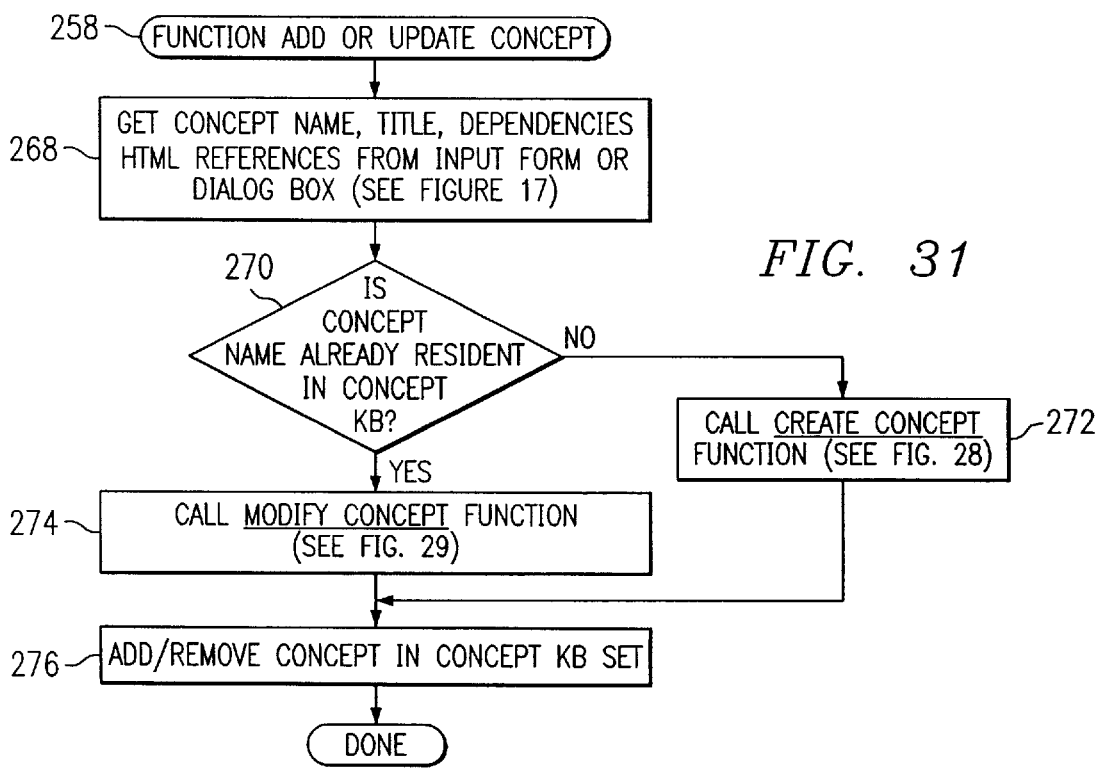
FIG. 31 is a flow diagram illustrating the operation of the add/update concept function of the present invention.
Figures 32, 33:
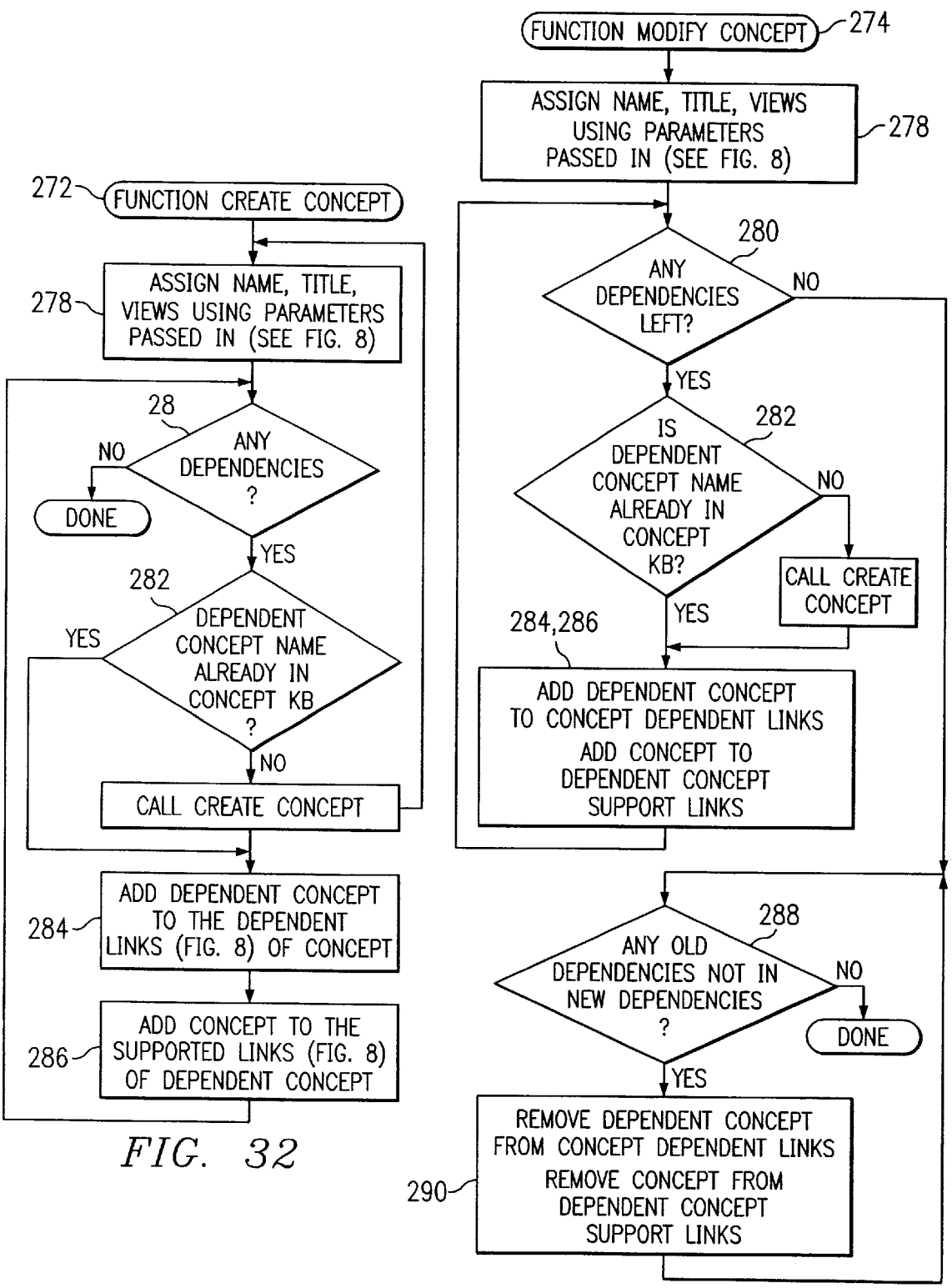
FIG. 32 is a flow diagram illustrating the operation of the create concept function of the present invention.
FIG. 33 is a flow diagram illustrating the operation of the modify concept function of the present invention.

FIG. 31 illustrates the operation of the concept editor 16 when adding or editing a concept. At step 268, the concept editor retrieves the concept name, the concept title, the dependencies to the concept and HTML references for the concept from the dialog box 136 of FIG. 17. At step 270, the concept editor 16 determines if the concept name exists in the concept knowledge base. If so, the concept editor 16 calls the modify concept function of FIG. 33; if not, the concept editor 16 calls the create concept function shown in FIG. 32. Both of these operations update the concept instances and then store them back in the concept knowledge base at step 276. FIG. 32 shows the operation of creating a concept, including assigning the concept a name, title, and an HTML location using data from the dialog box of FIG. 17. The concept editor 16 then determines if there are any dependent concepts at step 280 (from the information in the dialog box 136) and, if not, goes to step 276 of FIG. 31 and adds the concept to the concept knowledge base. If there are dependencies for the new concept, the concept editor 16 first determines if the dependent concept already exists within the concept knowledge base at step 282. If not, the concept editor calls the create concept function at step 272. If the dependent concept exists in the concept knowledge base, concept editor 16 adds the dependent concept to the dependent links of the concept being created and adds the concept being created to any supported links of the dependent concept at steps 284 and 286. After step 286, the concept editor 16 returns to step 280 to determine if any more dependencies exist until all dependent concepts are in the concept knowledge base and all dependencies are linked.

FIG. 33 shows the operation of editing an existing concept where the initial steps 278 through 286 are the same as creating a concept shown in FIG. 32. At step 288, the concept editor 16 takes the additional action of determining if the modification of the concept resulted in the deletion of some dependencies. If so, at step 290, the concept editor removes any dependent concepts from the concept dependent links and removes concepts from any dependent concept supported links. For example, if ten dependencies existed before the modification of the concept and all ten were deleted during the modification of the concept, then the set of old pointers which linked the modified concept to the ten dependent concepts would be removed, and each of the ten dependent concepts would have its supporting link back to the modified concept removed.

Figure 34:
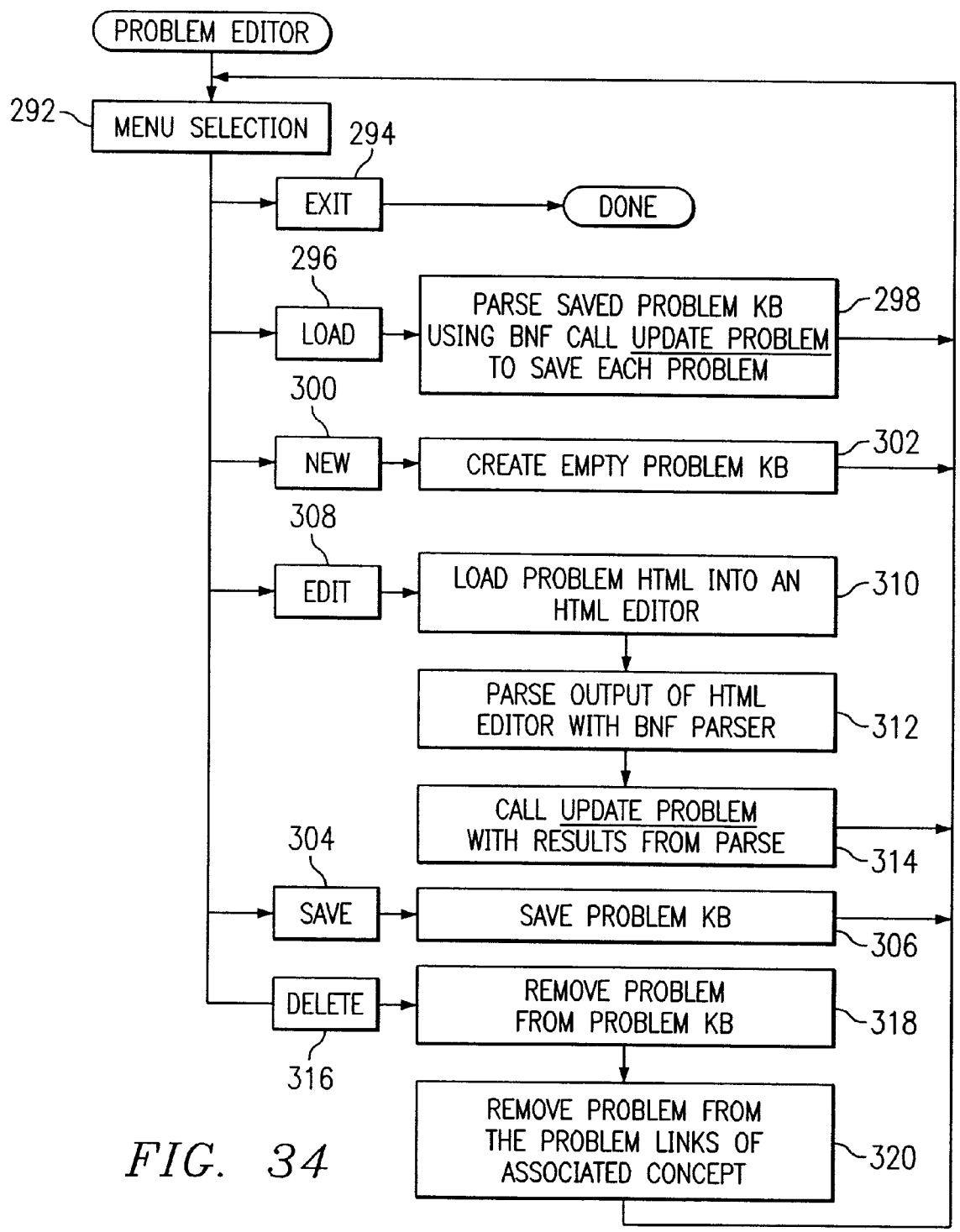
FIG. 34 is a flow diagram illustrating the operation of the problem editor function of the present invention.

FIG. 34 shows the operation of the problem editor 18 that the user initiates by clicking on the problem editor button 118 of FIG. 15. Again, at step 292, the user makes a menu selection that causes the problem editor 18 to perform a function on the menu, shown as delete, edit, save, create or load a problem knowledge base, until the selection is "exit" at step 294, upon which the problem editor 18 closes. At step 296, the problem editor 18 can load problem knowledge base by parsing the problem knowledge base using Backus-Naur Format (BNF) and calling the update problem function (FIG. 35) to save each parsed problem. In the preferred embodiment, a problem knowledge base is a single HTML file (rather than separate HTML files for every single example, problem and question). In order to be able to later separate the individual problems, questions and examples from one another, the ones related to a particular concept must be parsed out from the problem knowledge base HTML file. In one embodiment, the BNF definition (i.e., syntax, grammar and semantics) for parsing the problem knowledge bases is as follows:

BNF for the Syntax for Problem Delimiters

"( )" indicates a grouping of items. If '|' is present, then exactly one of the items is to be selected.
"{ }" indicates a list. Repeat pattern with { } 0 or more times if "*" is used; repeat 1 or more times if "+" is used.
"[ ]" indicates an optional item
"--" indicates a comment uppercase is for non terminals lowercase is for terminals (also, items enclosed in single quotes are terminals).
  EXTRA-SYNTACTIC RULES:
   1. TUTORFILE commands can appear within any general HTML file.
   2. Attributes of an HTML element (including DIV) can appear in any order. This applies to QUES-HEAD, EXAM-HEAD, EXPL-HEAD and CHOICE-HEAD.
   3. White space must SEPARATE attribute/value pairs in an HTML element (see note 2 above). There can also be optional white space before the final '>' of an HTML element.
   4. White space is optional between elements in HTML. This applies to productions QUESTION, EXAMPLE, EXPLANATION and CHOICE below.
   5. All attribute/value pairs, e.g. id="t1", can have WS around the "=", and can enclose the value in either " " or ' ' or use no quotes at all (if no quotes are used, then no WS may occur around the "=" ). Below, we show all attribute values enclosed in " ". This applies to the ID, CONCEPT, TYPE and CONTEXT productions below.
TUTORFILE ::={ COMMAND }* -- optional white space between commands
COMMAND ::=( QUESTION | EXAMPLE )
QUESTION ::=QUES-HEAD HTML::=[EXPLANATION] {CHOICE}+ DIV-END
EXAMPLE ::=EXAM-HEAD HTML [EXPLANATION] DIV-END
EXPLANATION ::=EXPL-HEAD HTML DIV-END
CHOICE ::=CHOICE-HEAD HTML DIV-END [EXPLANATION]

QUES-HEAD ::='<DIV' 'class="question"' ID TYPE CONCEPT '>'
EXAM-HEAD ::='<DIV' 'class="example"' ID CONCEPT '>'
EXPL-HEAD ::='<DIV' 'class="explanation"' [CONTEXT] ['override'] '>'
CHOICE-HEAD ::='<DIV' 'class=choice"' ['correct']'>' -- note that only CHOICE-HEAD for a group of CHOICEs -- for a given QUESTION may be marked 'correct'.
ID ::='ID="' IDENTIFIER '"'
CONCEPT ::='concept="' IDENTIFIER '"'
TYPE ::='type="mc"' -- eventually, more types
CONTEXT ::='context="' IDENTIFIER {WS IDENTIFIER}* '"' -- note there MUST be white space between identifiers -- here (i.e., they are white space separated).
DIV-END ::='</DIV>'
IDENTIFIER -- alpha numeric, also may have '-' and '_' -- but NO white space
HTML -- any HTML text, including no text (empty)

Figure 35:
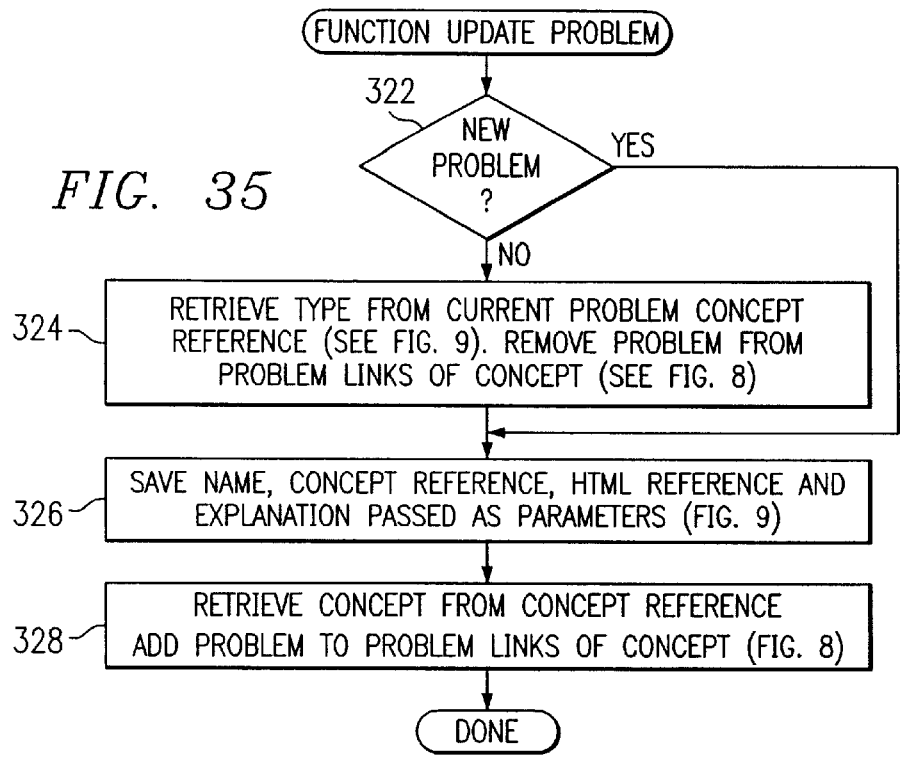
FIG. 35 is a flow diagram illustrating the operation of the update problem function of the present invention.

As the problem knowledge base is parsed, each problem is translated into a corresponding problem data structure 72 (see FIG. 9). The update problem function of FIG. 35 shows that the problem editor 18 reads a problem to determine if it is a new problem at step 322, and if so retrieves the type of problem (i.e., multiple choice question, etc.) and builds the type class for the problem at step 326 with the name, concept reference, HTML reference and explanation passed to it as parameters. If the problem is not new, then the problem editor 18 retrieves the existing problem, removes it and replaces it with the new updated problem at step 324. At the last step 328, the problem editor 18 ensures every problem is associated with a particular concept by searching the concept knowledge base to fill in any links to concepts that are missing. This provides the links between the problems and the concepts to which they relate.

With reference to FIG. 34 again, the new selection 300 and save selection 304 cause the problem editor 18 to create an empty problem knowledge base (step 302) or to save a problem knowledge base (step 306), respectively. If the user selects edit at step 308, the problem editor 18 allows the user to load a problem HTML file into an HTML editor at step 310 to edit the problem. The problem knowledge base is then updated by parsing the output of the HTML editor to place the problem in the proper format and by calling the update problem function as previously described.

Figure 36:
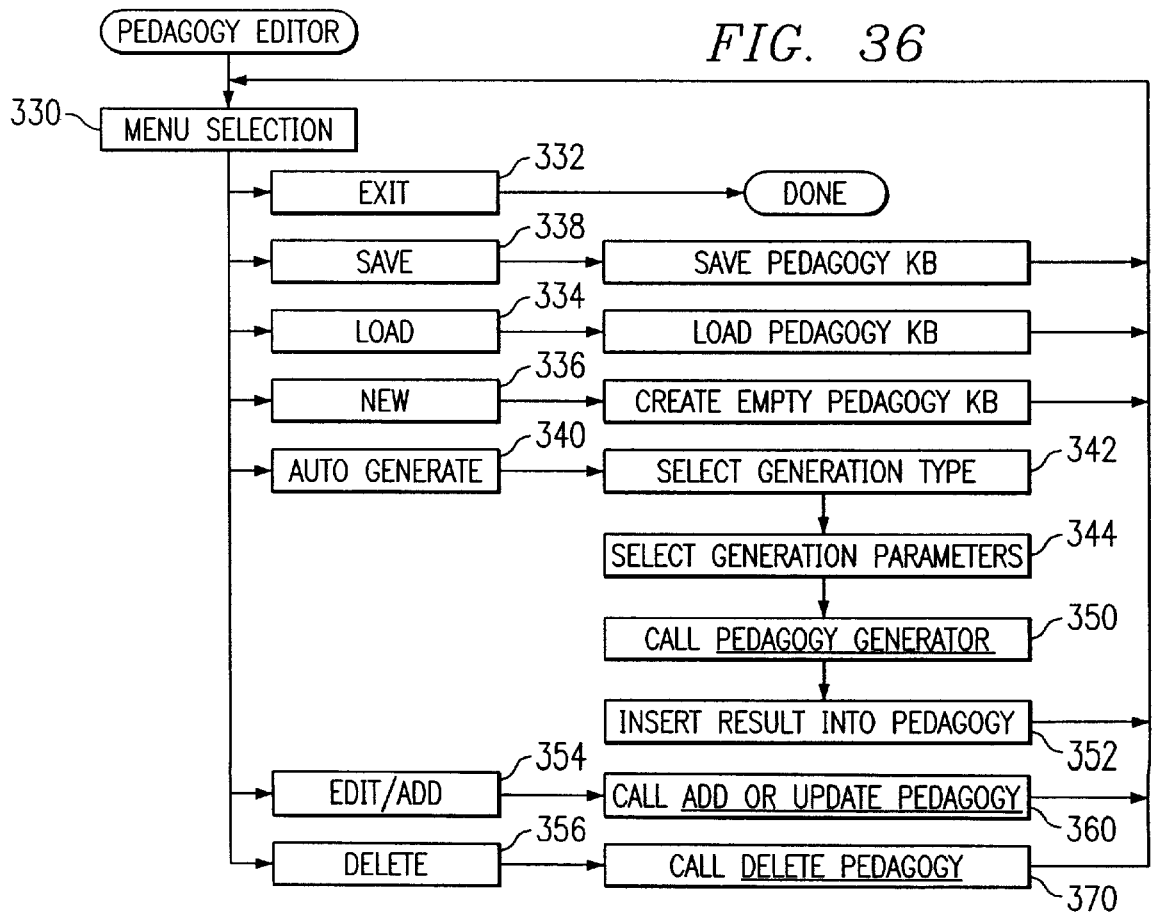
FIG. 36 is a flow diagram illustrating the operation of the pedagogy editor function of the present invention.

FIG. 36 shows the operation of the pedagogy editor 20 that a user can initiate by clicking on the pedagogy editor button 122 in the configuration editor 114 of FIG. 15. That operation can bring up the pedagogy Editor Dialog window 156 of FIG. 20 to allow an author to create or modify a pedagogy (manually or automatically). The Pedagogy Editor Dialog window 156 can include a pull-down menu or individual buttons that allow a user to activate the functions of FIG. 36. In the embodiment shown in FIG. 36, the menu selection includes save, load, new, auto generate, edit/add and delete functions. As shown, the performance of any of the steps returns the author to the menu selection 330 to perform any of the other functions and, after any combination of these, the author can exit at step 332. Steps 334, 336, and 338 allow an author to load an existing pedagogy from a storage location, create a new pedagogy by linking concepts in any chosen manner, and to save a pedagogy for a particular configuration, respectively. At step 340 the dynamic knowledge delivery software 10 can automatically generate a pedagogy. The initial step 342 can include the option of allowing the user to select a generation type. The generation type is the method of presenting the concepts based on the taxonomy. For example, the generation type might be a bottom-up or top down or some other relational pattern. The user can also optionally select the generation parameters at step 344 which will set the goal and the prerequisites. The dynamic knowledge delivery program 100 will then call the autogeneration routine that will arrange the concepts based on the generation type and the goal (start) and prerequisites (end) at step 350, as shown in FIG. 37. Finally, the resulting pedagogy is added at step 352. The edit/add step 354 calls the edit/add function 360 of FIG. 39, while the delete function at step 356 calls the delete function 370 of FIG. 38.

Figure 37A:
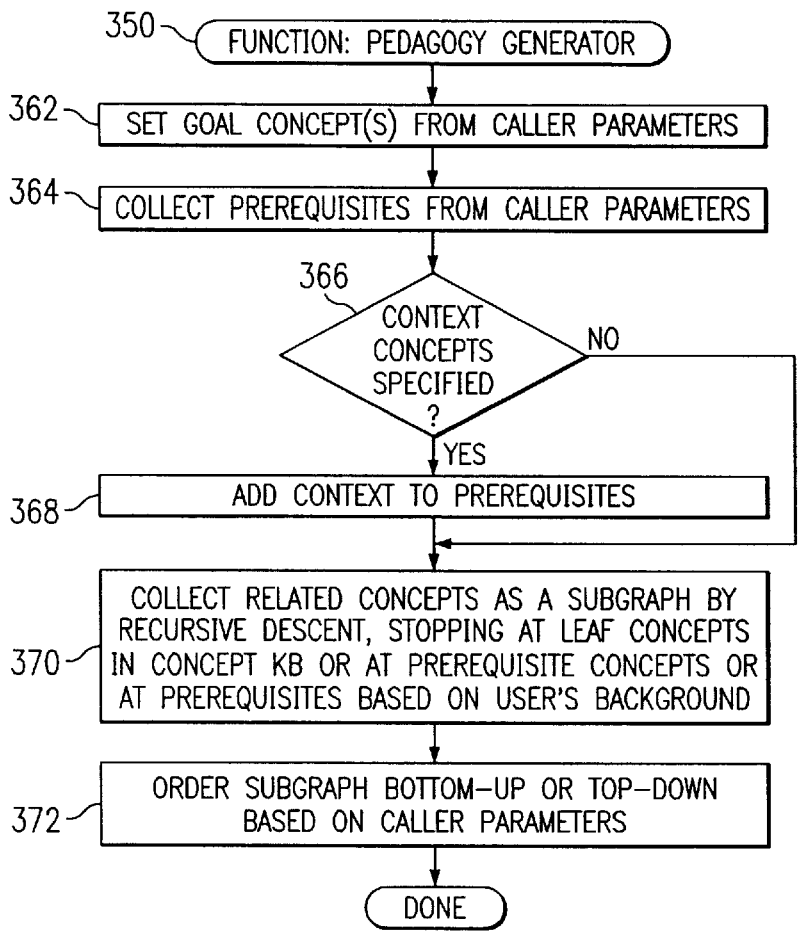
FIG. 37A is a flow diagram illustrating the operation of the pedagogy generator function of the present invention.

FIG. 37A shows the operation of the Pedagogy Generator function that occurs upon the author's selection of the auto generator button 150 of FIG. 20. As shown in FIG. 37A, at steps 362 and 364 pedagogy generator 50 sets the goal concepts and prerequisites that were selected or passed in (e.g., as described in FIG. 36). The goal concepts and prerequisite concepts must be chosen (either manually by the author or automatically by the dynamic knowledge delivery software) to allow the generation of the pedagogy. At step 366 the pedagogy generator 50 determines whether the context concepts were specified and, if so, adds the context to the prerequisites concepts at step 368. This is an optional step where, if the user or author has specified particular concepts types only to be delivered, the pedagogy generator 50 will only search on those particular concepts types within the concept graph and only those particular concept types will be included in the resulting subgraph of concepts to be delivered to the user. If the author is creating the pedagogy, then the author chooses the type. If the TutorMaker is generating a pedagogy for a response to the user, then it can be based on the user's type (i.e., if user technical vs. salesman etc.) This essentially operates as another type of prerequisite. The concepts have been labeled with these "type" labels in the concept knowledge base. At step 370 the pedagogy generator 50 then collects the subgraph of concepts according to a searching algorithm incorporated into the pedagogy generator 50. The collection of the related concepts as a subgraph can be done by recursive descent (e.g., depth first, breadth first, stopping at concepts that have no children, stopping at prerequisite concepts or prerequisites based on user's background, etc.). At step 372, the concepts within the collected subgraph are ordered based on the generation type selected by the user or programmed into the pedagogy generator 50. Optionally, the searching and traversing of the graph can also be guided by parameters included from a user model that is accessed prior to searching the graph.

As noted, the pedagogy generator 50 includes a graph searching algorithm that navigates, according to the type of algorithm, the graph of concepts that is based on the taxonomy. Any graph searching algorithm can be used in the present invention. A "graph" is a standard computing term for a series of linked nodes, that are typically acyclic for the present invention (i.e., the graph does not wrap back around on itself), where each node represents a concept. The links are connected to one another according to the relationship of each concept to every other concept (i.e., the taxonomy).

Graphs are typically represented so that upper nodes are parents, lower linked nodes are children of the parent nodes, and nodes on the same level are sibling nodes. The pedagogy generator 50 sets the goal concept node as a starting node and the prerequisite concept nodes as ending points and uses the graph searching algorithm to search the graph using its designated method. For example, one method is a depth first search that requires the search to go from parent to its child (if multiple children, to a particular child based on its location in the graph), to its child, until no more children are reached, and then back to the upper-most node that has other children not searched, and repeats until all nodes have been searched. Another searching method is a breadth first search which requires the search to start at a parent node, search all siblings of that parent node first, and then go to the first parent node and search all of its children. Basically, the pedagogy generator uses a starting point (the goal concept), ending points (the prerequisite concepts), and a generation type to define what search method to use to create a pedagogy by traversing through the graph of concepts and ordering the presentation of concepts based on the order each node (or concept) is encountered during the search. The graph was built in the concept editor based on the relationships defined between the concepts as the concepts were entered.

Essentially, the pedagogy generator 50 traverses the graph of concepts for a particular configuration and collects a subgraph of the concepts based on the goal, prerequisite and generation type parameters. This subgraph is the pedagogy that defines what concepts will be presented and in what order the defined concepts will be presented to the user. Thus, the pedagogy generator 50 will automatically select both the relevant concepts to display and the appropriate order in which to display them based on the dependencies and relationships of the associated graph.

Figure 37B:
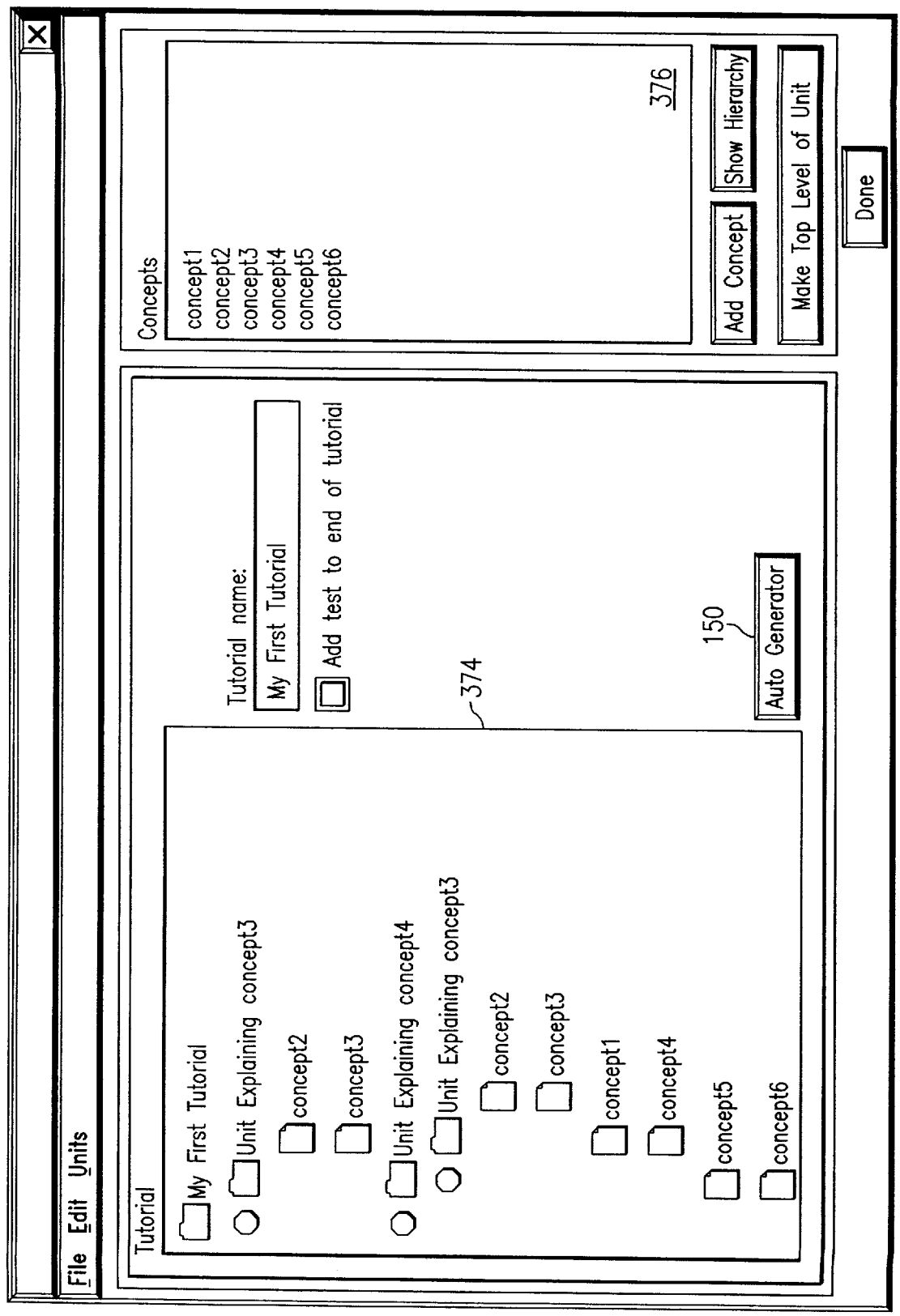
FIG. 37B shows a window illustrating an automatically generated pedagogy for a sample configuration.
Figures 37C, 39:
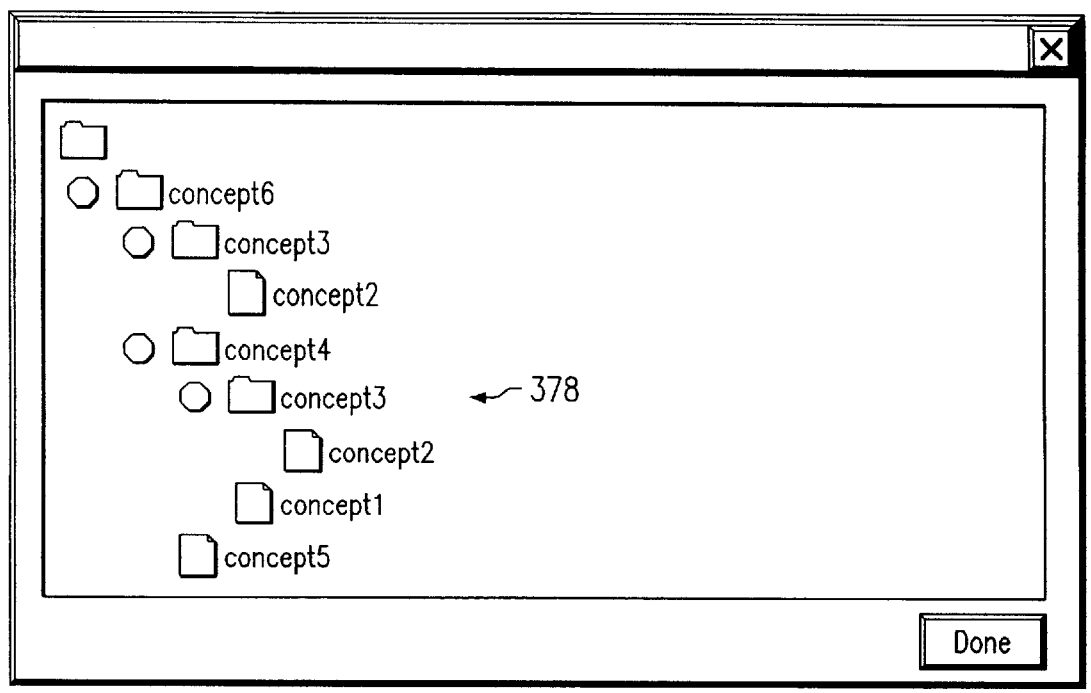
FIG. 37C shows a window containing another pedagogy automatically generated accoding to FIG. 37A.
FIG. 39 is a flow diagram illustrating the operation of the add/update pedagogy function of the present invention.

To further illustrate the sorting performed during automatic pedagogy generation function described in FIG. 37A, FIG. 37B shows an exemplary configuration delivery 374 having a pedagogy that was automatically generated based on the taxonomy of FIG. 37C (for the six concepts in the example configuration 376). FIG. 37C shows that the author assigned the hierarchy or taxonomy 378 among the six concepts in the configuration 376 (using the configuration editor) as follows: concept 6 depends on concepts 3 and 4; concept 3 depends on concept 2; concept 4 depends on concepts 3 and 1; and concept 6 depends on concepts 3, 4 and 5. FIG. 37B shows the pedagogy automatically created based on the FIG. 37C taxonomy based on a goal concept of concept 6 and no prerequisite concepts (i.e., include every concept in the configuration). The steps of FIG. 37A, the pedagogy generator 50 will generate the pedagogy that is presented in FIG. 37B. The pedagogy of FIG. 37B shows that in order to explain/understand concept 6, concepts 3, 4 and 5 must be explained in that order. In order to explain concept 3, concept 2 must be explained. In order to explain concept 4, concept one must be explained, and then concept 5 is explained. At this point, all of the prerequisites to concept 6 have been explained and concept 6 can be delivered. As shown in FIG. 37B, concept 4 can include again concept 3 with its supporting concept 2 in summary form. FIG. 37B illustrates a "bottom up" generation type of delivery format (e.g., prior to the explanation of a higher level concept such as a computer, the user must first have delivered an explanation of a set of lower level concepts such as transistors and software programs).

Figure 38:
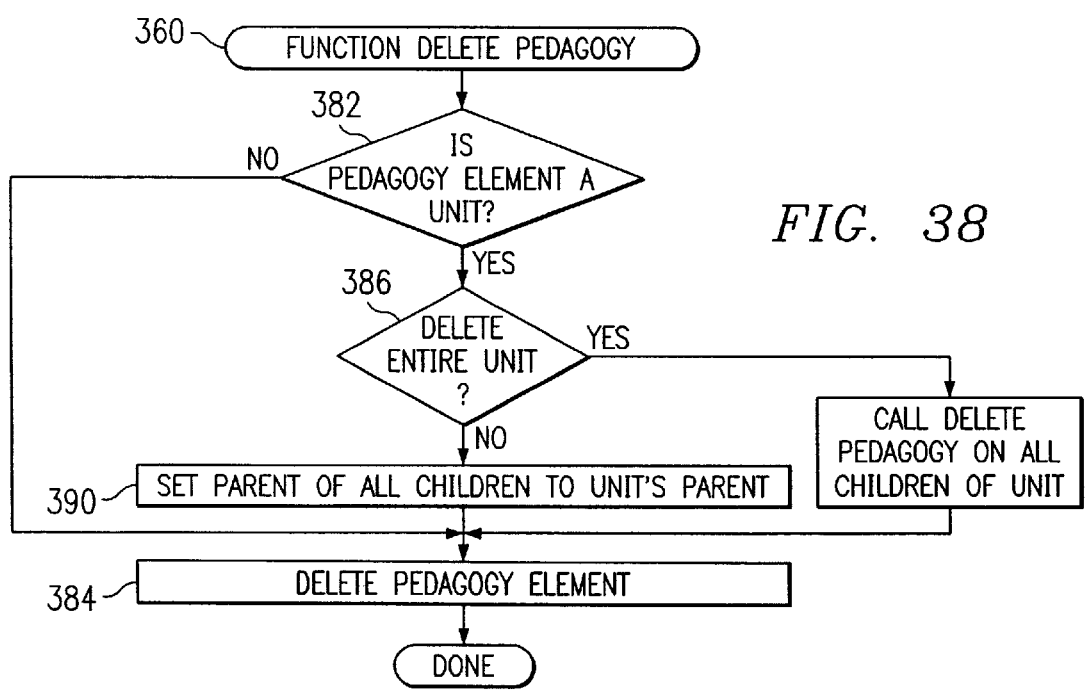
FIG. 38 is a flow diagram illustrating the operation of the delete pedagogy function of the present invention.

FIG. 38 shows the operation of the delete element in the pedagogy function that allows an author to delete a subsection within a tutorial delivery. For example, if the author wants to delete concept 2 from the Unit Explaining concept 3, the author can delete concept 3 from that unit, or even delete the unit entirely. In step 382, the configuration editor 110 can first query whether the pedagogy element to be modified is a "unit" (i.e., a set of concepts versus a single concept). If not, the program allows the author to delete the pedagogical element (i.e., concept) at step 384. If so, at step 386, the configuration editor 110 can query whether the entire unit should be deleted or just some subset of concepts within the unit. If the entire unit is to be deleted, the configuration editor 110 can further query whether the children concepts of the concepts to be deleted are also to be deleted and can delete them again at step 384. This involves searching the pedagogy and grabbing all of the supported concepts (or children). If the entire unit is not to be deleted, then the parent concept of all the children concepts are set to the unit's parent concept at step 390 prior to deletion at step 384. This effectively adds the children concept to the unit which enclosed the deleted unit.

FIG. 39 shows the add/update pedagogy function 380 that allows concepts to be added to a pedagogy by the author. The configuration editor 110 first queries whether the pedagogical element is a new element (i.e., to be added) at step 392 to determine whether the element already exists in the pedagogy. If so, then the parent of the pedagogy element is set as shown in FIG. 10 at step 394. The configuration editor 110 then queries whether the new element is a concept at step 396. This is included because if a concept is added, it should be linked to its parent concepts if applicable. If the element is a concept, then a link and view type is set for that concept at step 400 and the function is complete. The configuration editor 110 then queries whether the new element is a problem concept at step 400, and if so, sets the problem size and view type at step 404. If the new element is not a concept or problem, then it is a unit and the unit name and optionally the HTML reference are set at step 406.

FIGS. 40 through 50 relate to the tutor maker 120 and the user interface 130. FIG. 40 shows an exemplary flow diagram of the operation of the tutor maker. Upon start-up, the tutor maker 120 first runs an initialization phase to initialize various parameters that can include the configuration default directory, session timeout, an empty session database and an empty tutorial database at step 410. In one embodiment, the tutor maker 120 can track where all the configurations 10 using a default directory that will contain all of the accessed configurations 10. The timeout feature simply defines how long user's can access a configuration without initiating an action before the session will be automatically terminated by the tutor maker 120. Further, each time a user logs into the tutor maker 120, the user gets a user session. The tutor maker 120 then initiates a low priority thread at step 412. The thread is an independent program that will automatically remove stale user sessions. The low priority option means that the thread will only operate when all users have been currently served with all their current outstanding requests. Finally, at step 414, the tutor maker 120 calls the action handler 42. which then waits for an action to come in from the user over the internet or network.

Figure 41A:
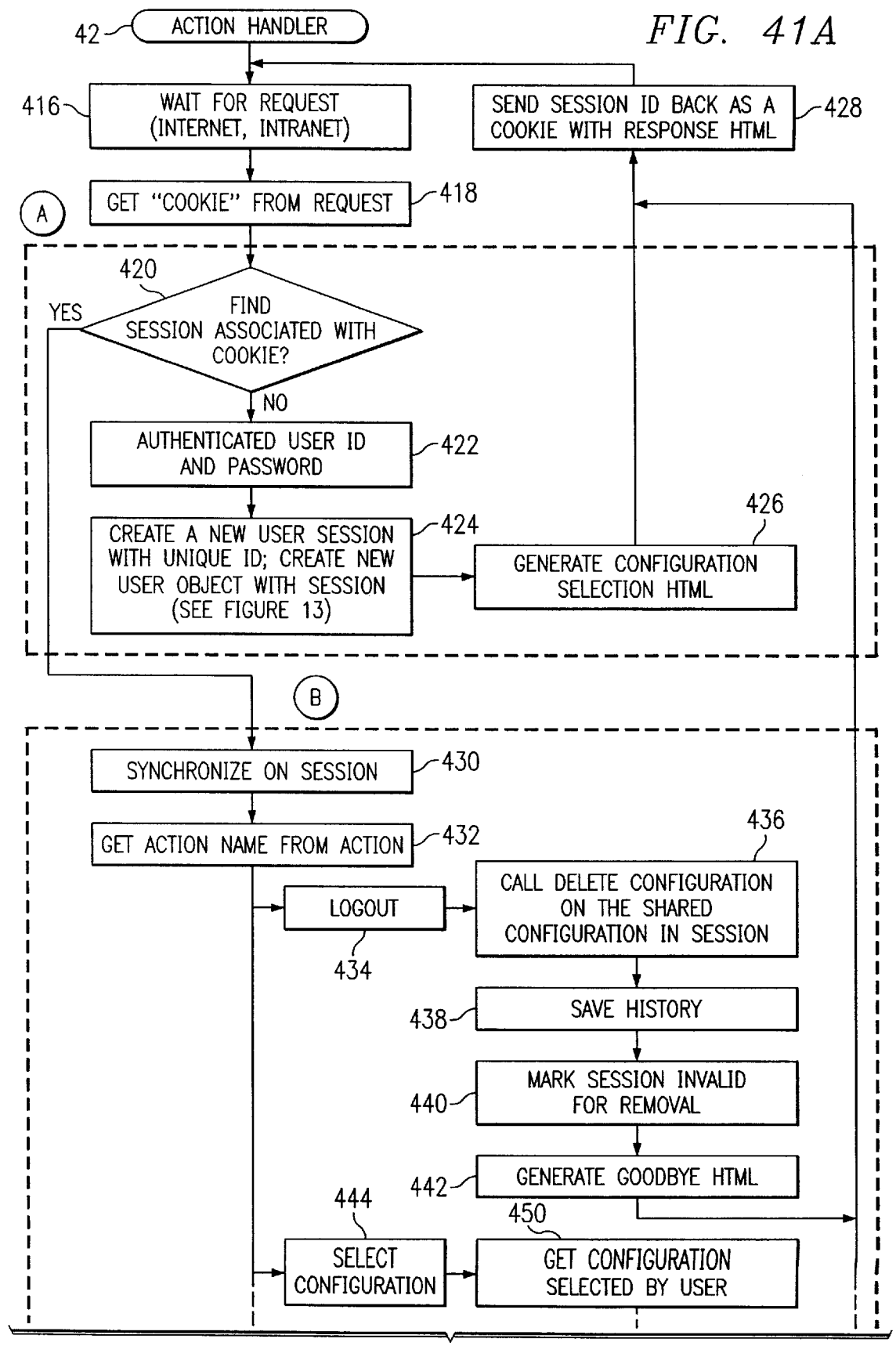
FIG. 41 is a flow diagram illustrating the operation of the tutor maker action handler function of the present invention.
Figure 41B:
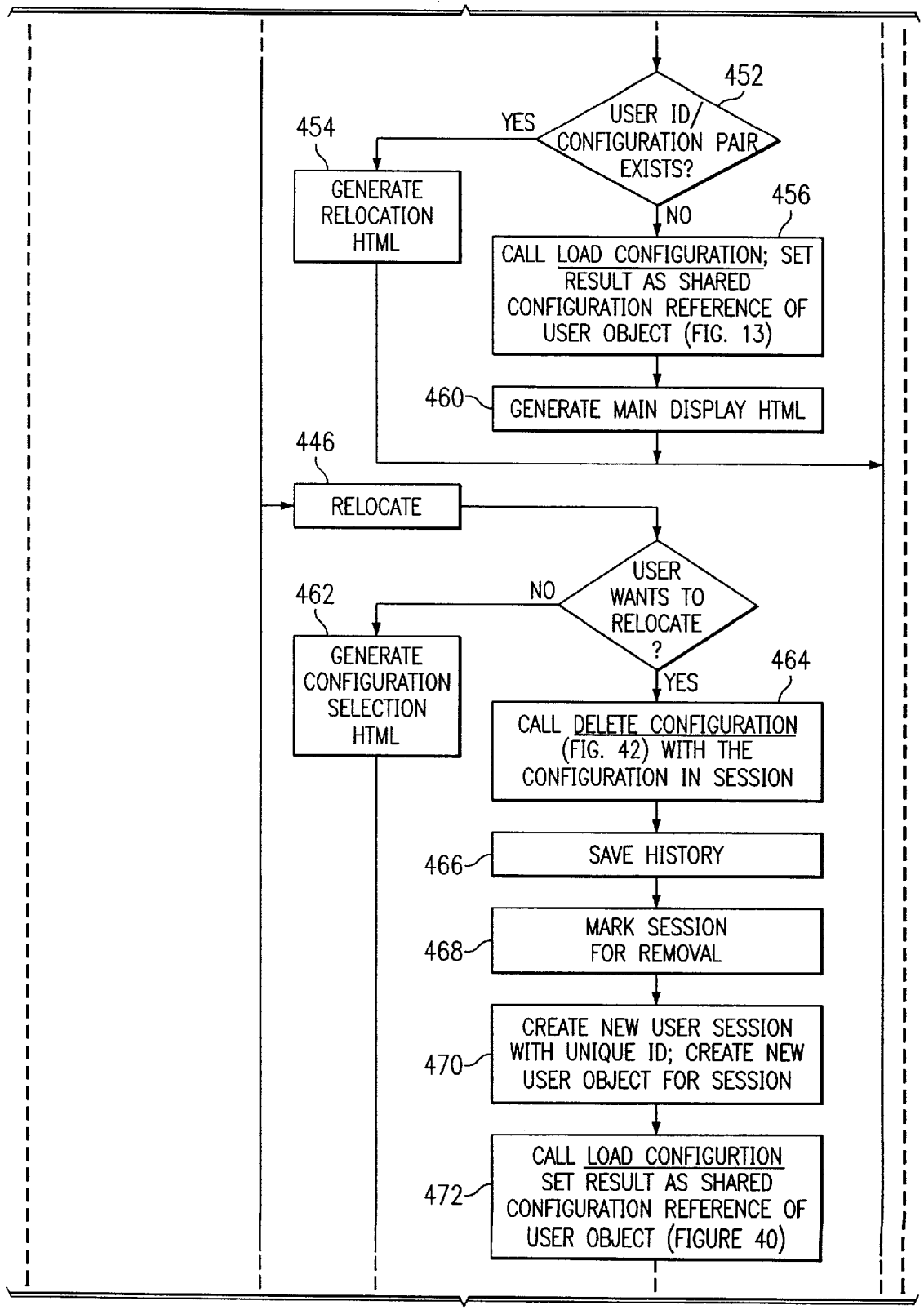
Figure 41C:
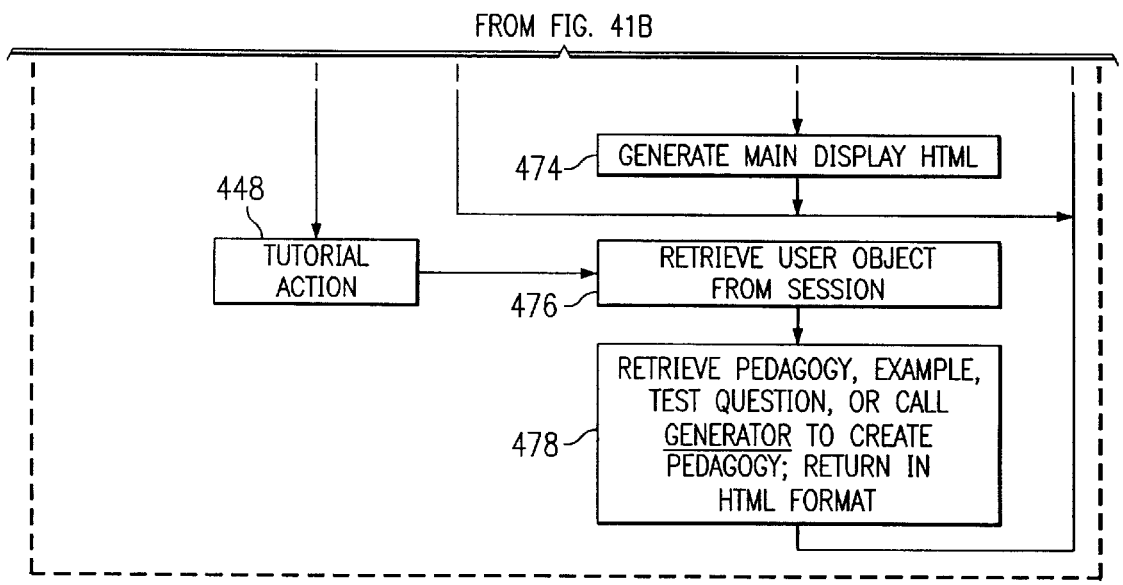

FIG. 41 shows a flow diagram outlining the action handler 42 functionality for one embodiment. At step 416, action handler 42 waits for an action to come in from the user over the internet or network and gets the information from the request at step 418. Each request is paired with a unique identifier (called a "cookie" for the internet). Part A of FIG. 41 indicates the action handler 42 synchronizing on a user session database. If the action handler 42 is able to locate a user session database associated with the received cookie at step 420, the action handler moves to part B (which describes the synchronization on a particular user session). The synchronization is a standard computer science techniques used in concurrent programming to prevent deadlock problems that arises when two or more users attempt to simultaneously access the same data. In part A, the tutor maker 120 provides for synchronizing on the user session database to lock that user session database prior to determining if the cookie is associated with a particular user session. Thus, if the user session database is associated with a session in the cookie at step 420, then go to part B and synchronize with the session at step 430. If not, then the tutor maker 120 will check to see that the user is a valid user and authenticates the user at step 422. If the user is authentic, then the action handler 42 creates a new user session with a unique ID, a new user object with the session (as shown in FIG. 13) at step 424. This creates the user session and inserts it into the user session database. The configuration is then selected at step 426 and the action handler 42 sends the session ID back to the user over the network at step 428 (e.g., as a cookie for an internet application). The action handler 42 is now once again in a ready state to receive a request.

For requests that are for an existing user session, prior to performing the action, the action handler must synchronize on the existing user session at step 430. The action handler 42 will return actions at step 428 until the user requests a logout and at step 434 the action handler 42 logs off by deleting the shared configuration 10 at step 436, optionally saving the history of actions for the user session at step 438, marking the session as invalid for removal at step 440 (this simply marks it to be cleaned up by the low priority task that was previously initiated), and generating a message HTML indicating the session has been terminated at step 442.

For an established session, a user either selects a configuration at step 444, relocates from one configuration to another at step 446, or takes a tutorial action in a configuration at step 448. If the user selects a configuration (i.e., the user is logged in but has not yet selected a configuration), the action handler 42 retrieves the configuration 10 (step 450), determines whether a user ID and configuration pair exists (step 452), and if so, generates a relocation HTML because the user was already viewing the configuration from another location. This HTML asks the user if they want to relocate the user session. In this manner the configuration in use by the user at the different location can be terminated and restored at the new location. The dynamic knowledge delivery program 100 can also include the capability to lock out a user on the tutor maker side at server computer 230 from accessing a particular configuration 10 if that configuration 10 is in use by an author on the configuration editor side at network computer 240. The dynamic knowledge delivery program 100 can recognize automatically that an update is being performed by the author to the configuration on the configuration editor side changed and, therefore, locks out the internet or network side so that a user cannot access a configuration being updated. This locking is achieved by creating a temporary file called a lock file in the directory where the configuration resides. Before allowing access to a configuration, the directory is checked to see if a lock file is present. If not, access is granted and a lock file is created. Once the configuration file is no longer needed the lock file is deleted.

If the user ID/configuration pair does not exist, the load configuration function 480 is called at step 456 and the configuration is loaded as described more fully in FIG. 42. The action handler 42 then generates the main display HTML associated with the configuration chosen at step 460.

If the user is simultaneously logged on, the user answers the relocation prompt (see step 460) at step 446. If the user does not want to relocate the user session, the action handler 42 responds to the user with the configuration selection HTML at step 462. If the user does want to relocate, the action handler 42 calls the delete configuration function 500 at step 464 to delete the configuration that is active at the other location (more fully described in FIG. 44). The action handler 42 then performs very similar functions as when the user logs-out of saving the history at step 466, mark the session for removal at step 468, optionally save the user's history at that session, and creates a new user session with a unique ID and user object session (step 470). In other words, the action handler 42 deletes the old session, makes a new one, and loads it by calling the load configuration function 480 (shown in FIG. 42). The action handler then generates the main display HTML for the loaded configuration. The loaded configuration will include all of the user history from the old session so that the user is looking at the configuration at the same state the user left it at the other location.

For any other tutorial action (e.g., moving through a configuration) at step 448, the action handler 42 receives the requested action, retrieves the user's session at step 476 and then retrieves the pedagogy example, or test question, or calls the generate pedagogy function, etc. and then generates the HTML and returns it as a response at step 478.

FIG. 42 illustrates the load configuration function 480 that first queries whether the configuration has previously been loaded by an user at step 482. If it has, then the tutor maker 120 retrieves the shared configuration object from the tutorial database 46 at step 484 and increases the shared configuration (SC) increment count by one at step 486. If the configuration is not in use, the tutor maker 120 creates a new shared configuration object at step 486 and adds it to the shared configuration database at step 488. At this point the user session is synchronized on the tutorial database. The user session is then synchronized on the shared tutorial object by setting the SC count to one at step 490 and then calling the load concept knowledge base (step 492), the load problem knowledge base (step 494) or load pedagogy knowledge base (step 496) as more fully described in FIG. 43.

Figure 43:
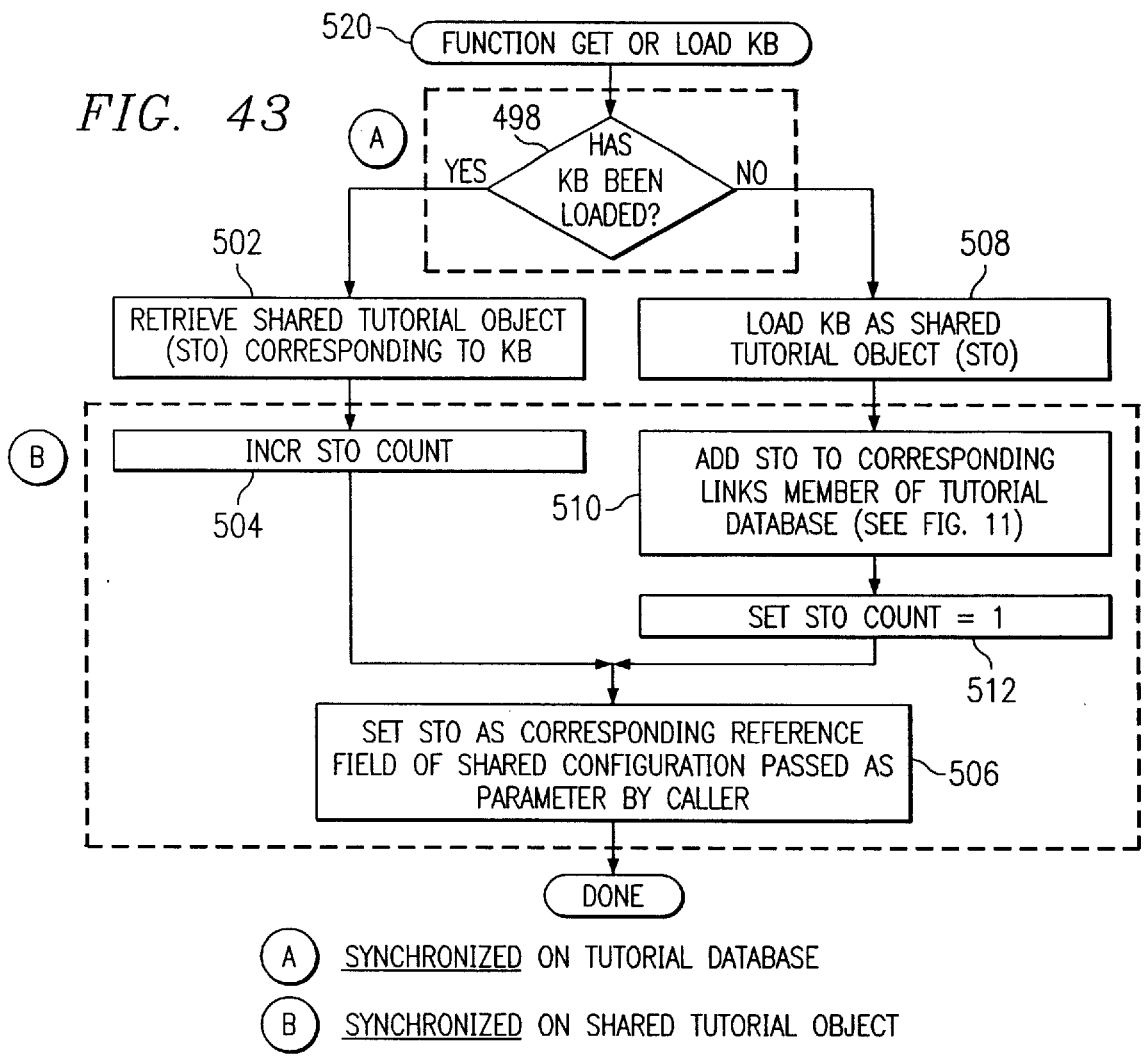
FIG. 43 is a flow diagram illustrating the operation of the load knowledge base function of the present invention.

FIG. 43 shows the load knowledge base function 520 performed by the tutor maker 120 that initially queries whether the particular knowledge base (i.e., concept knowledge base, problem knowledge base, pedagogy knowledge base) has been previously loaded at step 498 to synchronize on the tutorial database. FIG. 43 represents the method used to load all three knowledge bases associated with a configuration. If so, the tutor maker 120 retries the shared tutorial object corresponding to the requested knowledge base at step 502, increments the count for that knowledge base at step 504, and the shared tutorial object is set in the appropriate slot of the shared configuration 97 at step 506. More specifically, if the concept knowledge base is being loaded, then the shared configuration object 97 will have its concept knowledge base reference set to point to the shared tutorial object created for the concept knowledge base. In this way, each user session refers to a shared configuration structure, which in turn refers to shared tutorial objects, each of which keeps a count of the current number of users currently using each component of a configuration. Thus, when the count of a shared tutorial object (decremented as each user logs off) reaches zero, that object may be deleted. If the knowledge base has not been previously loaded, it is then loaded as a shared tutorial object at step 508, which is then added to the corresponding links within the tutorial database at step 510. For each added shared tutorial object, the increment count is set to one at step 512 and then set in the appropriate slot of the shared configuration 97 at step 506. As shown in FIG. 43, part A involves synchronizing on the tutorial database, while part B involves synchronizing on the shared tutorial object.

Figure 44:
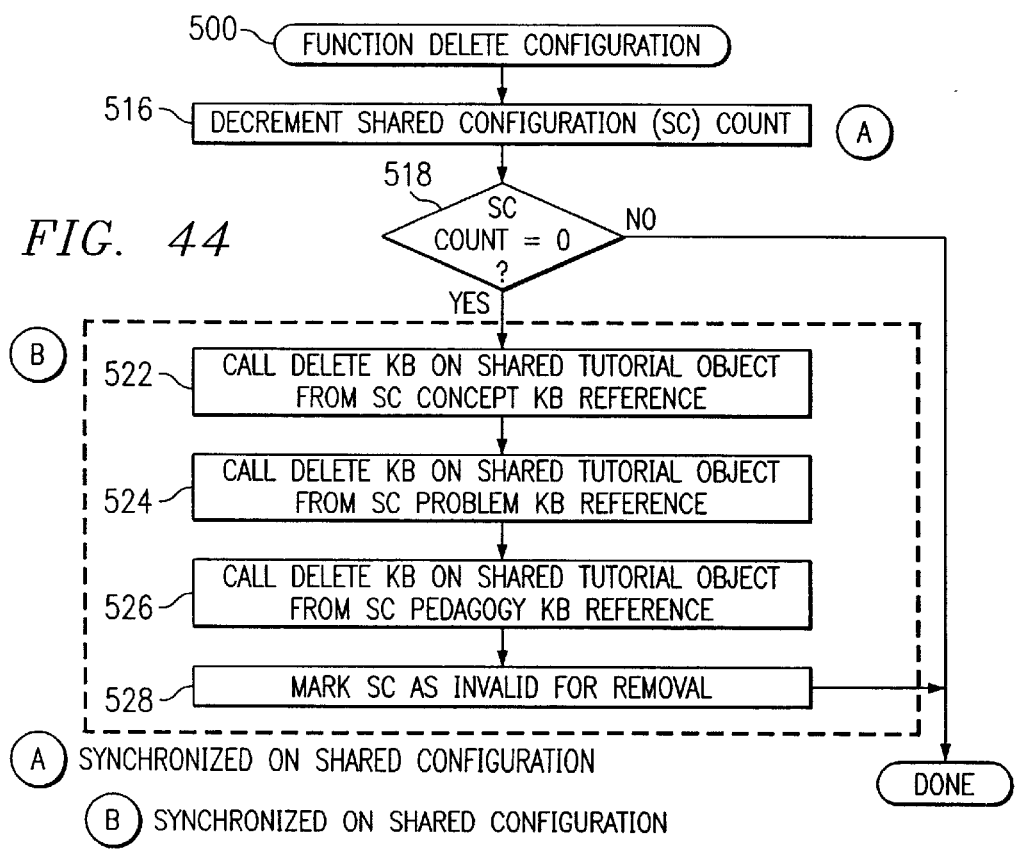
FIG. 44 is a flow diagram illustrating the operation of the delete configuration function of the present invention.

FIG. 44 describes the delete configuration function 500 used when the last user for a particular configuration logs off in order to delete the configuration from the tutorial database. At step 516, the tutor maker 120 determines the shared decrement count for the configuration in question and checks whether the count for the configuration is equal to zero at step 518. If not, the count is decremented by one. If the SC count is zero after the removal of this instance of the configuration, then the parallel processing for each of the concept knowledge base, problem knowledge base and pedagogy knowledge base occurs. For example, a concept knowledge base might be used on other loaded configurations so that while the configuration (i.e., the particular set of concept, problem and pedagogy knowledge bases) count may now be zero, the particular concept knowledge base used for the configuration might not have a count that goes to zero (e.g., if it is shared between at least one other configuration). Thus, for each of the concept knowledge base, the problem knowledge base, and the pedagogy knowledge base, the delete knowledge base function 530 (shown in FIG. 45) performs the similar decrement analysis as done for the overall configuration prior to deleting them (steps 522, 524, and 526). Finally, because the shared configuration count is zero, the shared configuration is marked as invalid at step 528 and cleaned up.

Figure 45:
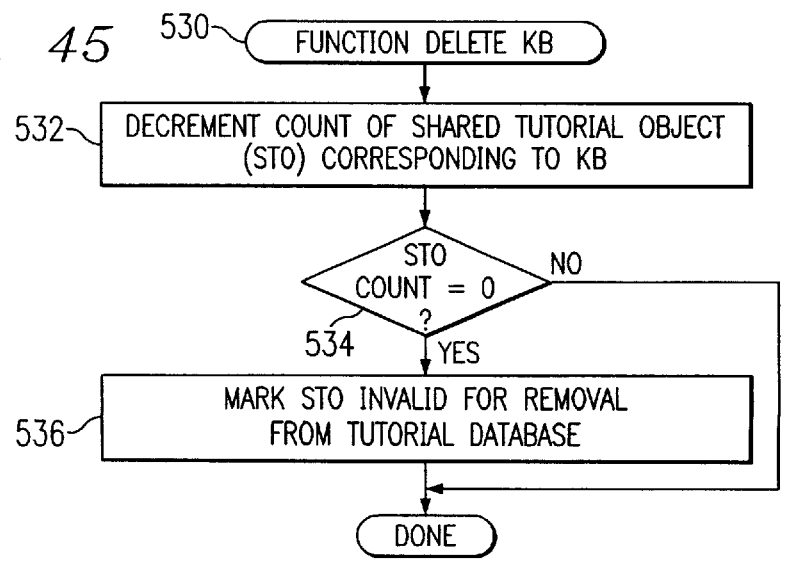
FIG. 45 is a flow diagram illustrating the operation of the delete knowledge base function of the present invention.

FIG. 45 shows the delete knowledge base function 530 that is applicable for each of the three knowledge bases. Similarly to the steps in FIG. 44, for the knowledge base being deleted the decrement count of the shared tutorial object corresponding to the knowledge base is determined at step 532, and if it is not zero, the count is decremented by one and if it is zero, the knowledge base is marked as invalid at step 536.

Figure 46A:
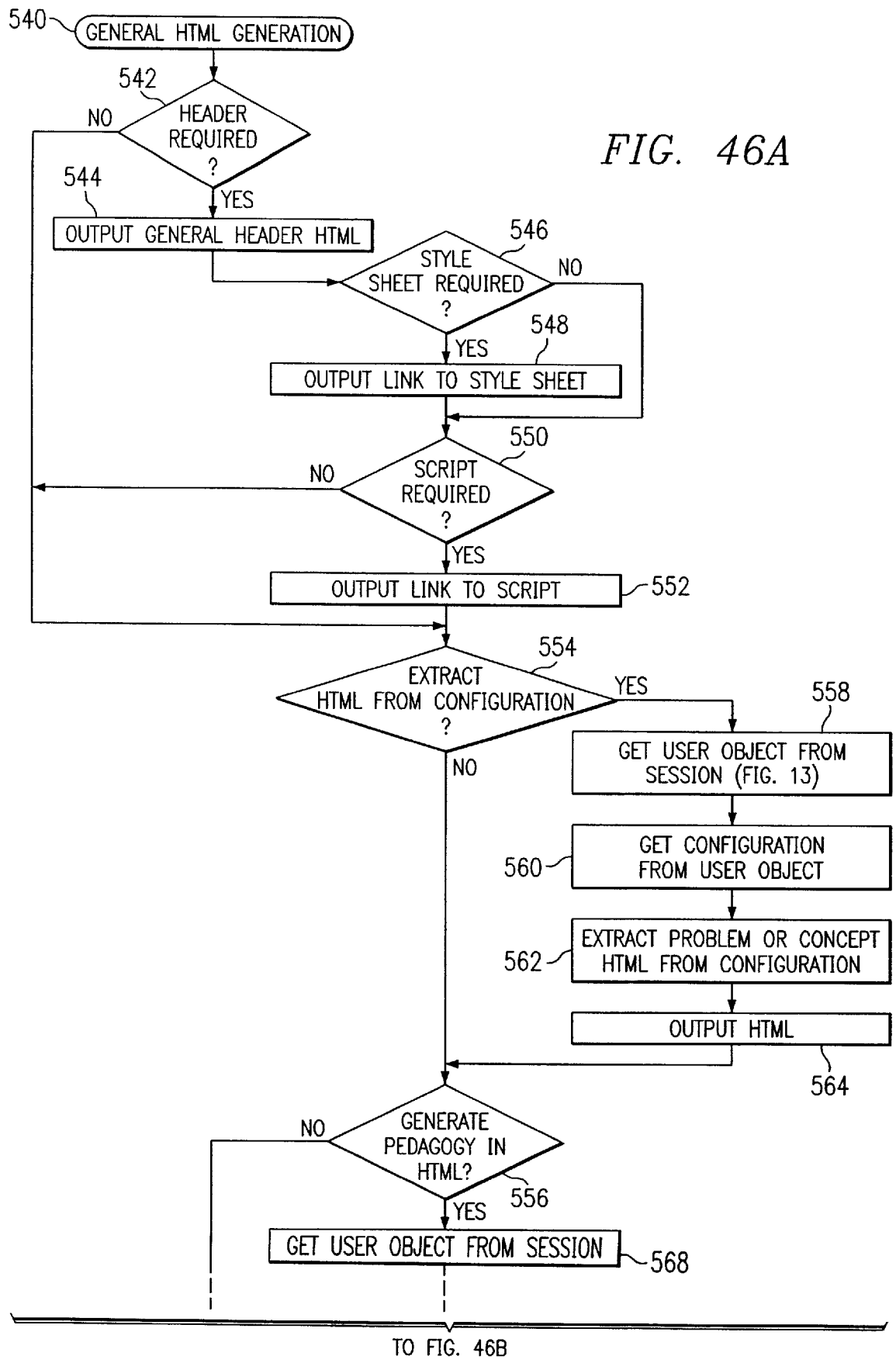
FIG. 46 is a flow diagram illustrating the operation of the generate HTML function of the present invention.
Figure 46B:
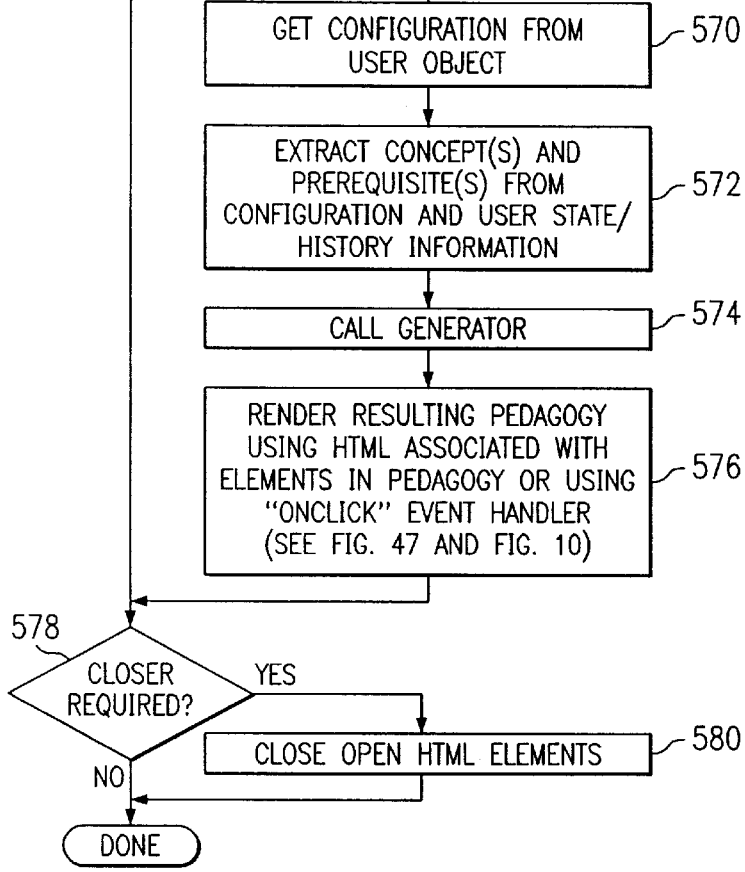

FIG. 46 shows the generation of HTML function 540 to describe the generation or building of HTML generally on the tutor maker 120 side of the operation of the present invention. This can include extracting HTML to generate a page for the user, generating HTML for particular formats, generating features on an HTML page such as toolbars, etc. At step 542, the tutor maker 120 can either output a header or not, and if so, outputs a general header HTML at step 544 that can include a style sheet. A style sheet is mechanism by which any HTML web page that has been generated has certain styles automatically overlaid onto it. By automatically associating a style sheet will all generated HTML, the present invention can control the look and feel of the pages that are presented to the user. After the style sheet is loaded or not at steps 548 and 548, a script call can be made at set 550. A script, for example javascript, is loaded from a link at step 552. The tutor maker 120 can then go get the HTML from either a configuration file (step 554) or generated based on a pedagogy generation (step 556). If the HTML will be extracted from a configuration file, the tutor maker 120 accesses the user object from the user session at step 558, accesses the configuration from the user object at step 560, accesses the problem or concept from the configuration 10 and extracts the HTML from the concept at step 562, and outputs the HTML at step 564. If HTML is not to be extracted from a configuration, then the tutor maker may have to generate a pedagogy (step 556). If generating a pedagogy, then the tutor maker 120 can first access a user object from the user session at step 568, access the configuration from the user object at step 570, extract the concept(s) and prerequisite(s) from the configuration (and optionally the user history information) at step 572, and call the pedagogy generator (see FIG. 37A). The resulting pedagogy is rendered using either the HTML associated with elements in the pedagogy or an "on-click" event handler. An on-click event handler can be created as follows:

```
General HTML Header Command Elements:
    <!DOCTYPE>
    <HEAD>
    <TITLE>
    <BASE>
    <META>
Event Handler Format:
    Click:    <  HTML-ELEMENT-NAME   on Click="event-Function (parameter)"  >
    Mouse:    <           "          on MouseOver=                "         >
              <           "          on MouseOut=                 "         >
    etc.
    links HTML ELEMENT TO event-Function in script, and passes
    arguments to that function
Shared Data Objects:
    Current HTML (3.2): use <FORM> element with "hidden" <INPUT>
    elements. Future HTML versions may use <OBJECT> element.
```

In one embodiment, the present invention uses the above-referenced general HTML commands (shown in angled brackets) are used in the header. The event handler format is contained within an angle bracket having some HTML element name (e.g., highlight), followed by "on-click" and the text for the function call in the browser extension 30. This allows the overriding of the typical response when a user clicks on this particular HTML element. Thus, the tutor maker 120 overrides by providing the specific on-click command. Similarly, specific events can occur for mouse-overs, and other standard HTML events. Thus, some HTML elements allow the overriding of typical responses on certain events (such as, on-click, on mouse-over, and on mouse-out) that are pre-defined for HTML. The shared data objects (e.g., a toolbar) are global variables that can be hidden input elements. One of ordinary skill in the art will appreciate how to create an on-click type event handler. Thus, the results (i.e., the graph) generated can be printed out, for example as hyperlinks. In one embodiment, the hyperlinks are separated into two frames and the normal browser hyperlink is overridden using the above described on-click mechanism. Finally, at step 578, the tutor maker 120 can create a closer and close the open HTML elements at step 580. A closer is a commonly used mechanism to end an HTML generation event. As shown in FIG. 46, tutor maker 120 uses style sheets and scripts to extend the browser in an internet application of the present invention.

Figure 47:
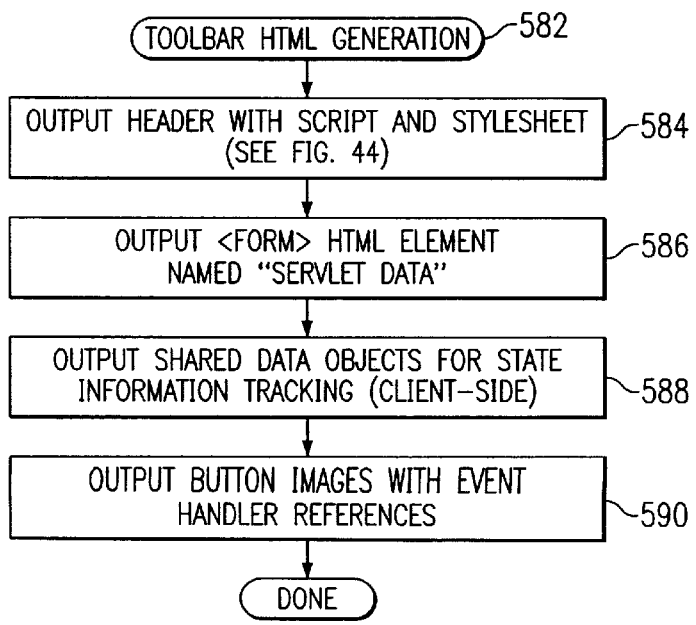
FIG. 47 is a flow diagram illustrating the operation of the toolbar HTML generation function of the present invention.

FIG. 47 describes the operation of the toolbar HTML generation function 582. In one embodiment, the present invention can include a toolbar in each HTML page generated for a user to simplify use of the present invention. The toolbar can be generated by outputting a header with a script and style sheet at step 584. At step 586, the tutor maker 120 can include a global form onto each HTML page so that the form is shared among all generated frames. In another embodiment, the global data of a toolbar can be accomplished using the <object>element of HTML (proposed for version 4.0 of HTML). At step 588, the tutor maker 120 outputs the shared data objects for the state information on the client computer 220 side (i.e., the browser side for an internet application) and finally, outputs the button image that is linked to an event handler at step 590.

Figure 48:
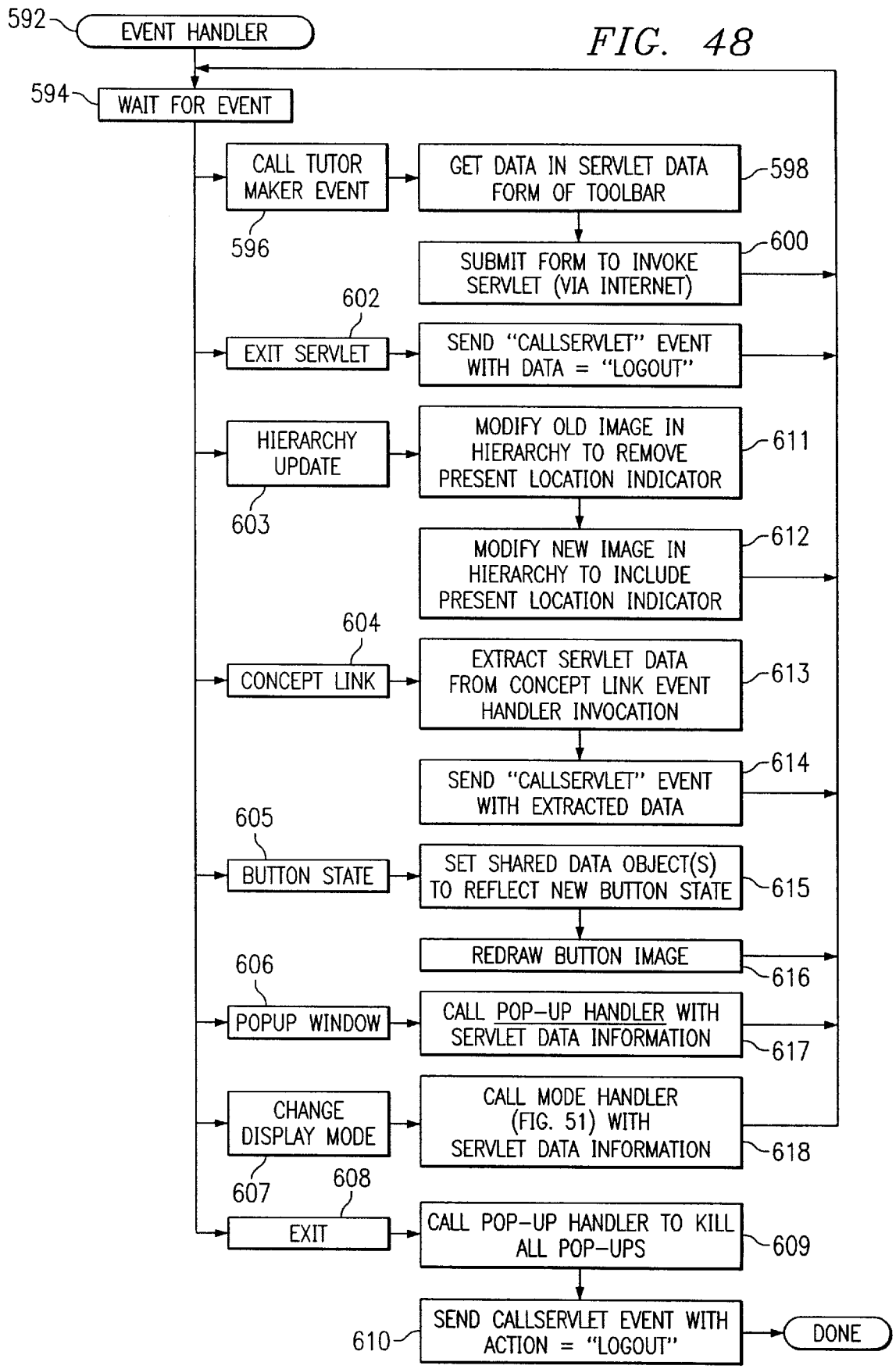
FIG. 48 is a flow diagram illustrating the operation of the event handler function of the present invention.
Figure 49:
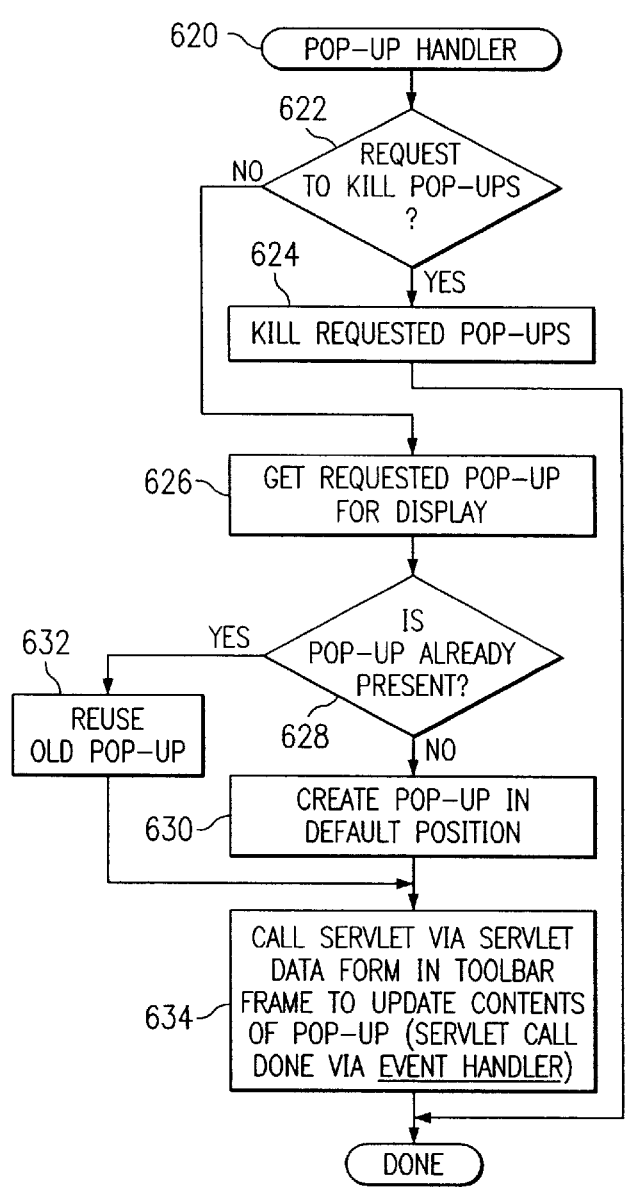
FIG. 49 is a flow diagram illustrating the operation of the pop-up handler function of the present invention.

FIG. 48 shows the operation of the event handler that is part of the user interface 130. The event handler waits for an event at step 594 and upon receipt of the event calls that type of event. FIG. 49 shows eight exemplary events that can be incorporated into the present invention. Step 596 shows a call tutor maker event that can be accomplished using servlet technology from Sun Microsystems. The event handler accesses the required shared data in servlet form at step 598 and submits the form to invoke the servlet over the internet at step 600. It should be understood that a variety of methods exist to submit data over a network, and the servlet form method described here is simply one method for use with the internet. The method described here will not cache and therefore it is important to use a form-submit or similar methodology for a browser-specific implementation of the present invention over the internet. Other actions include an exit function shown include an exit servlet at step 602, an update hierarchy at step 603, a concept link at step 604, a button state at step 605, a pop-up window at step 606, a change display mode at step 607 and an exit at step 608 to exit the event handler by calling a pop-up handler to kill all pop-up windows at step 60-9 and sending a call servlet event with a 'logout' action at step 610. The update hierarchy event is accomplished by modifying the old image to remove the present location indicator at step 611 and modifying the new image to include the present location indicator at step 612. The concept link involves extracting the servlet data from a concept link event handler at step 613 and sending a call servlet event containing that extracted data at step 614. The button state event is initiated by setting the shared data objects to reflect the current button state at step 615 and replacing the button image at step 616. The pop-up window event simply calls a pop-up handler with the servlet data at step 617 (as shown more fully in FIG. 50), while the change display mode similarly calls a mode handler with the servlet data at step 618 (as shown more fully in FIG. 50).

FIG. 49 describes the pop-up handler function 620 including an initial request from the user interface 130 to either terminate the pop-up window (step 624) or to access a pop-up window (step 626). If the pop-up window is requested, the user interface 130 can first check to determine if the pop-up window is already present at step 628, and if so, can re-use the existing pop-up window at step 632. If not, the pop-up window is generated in its default state at step 630. Finally, the pop-up window contents can be updated by calling a servlet via the servlet data form in the toolbar frame at step 634.

Figure 50:
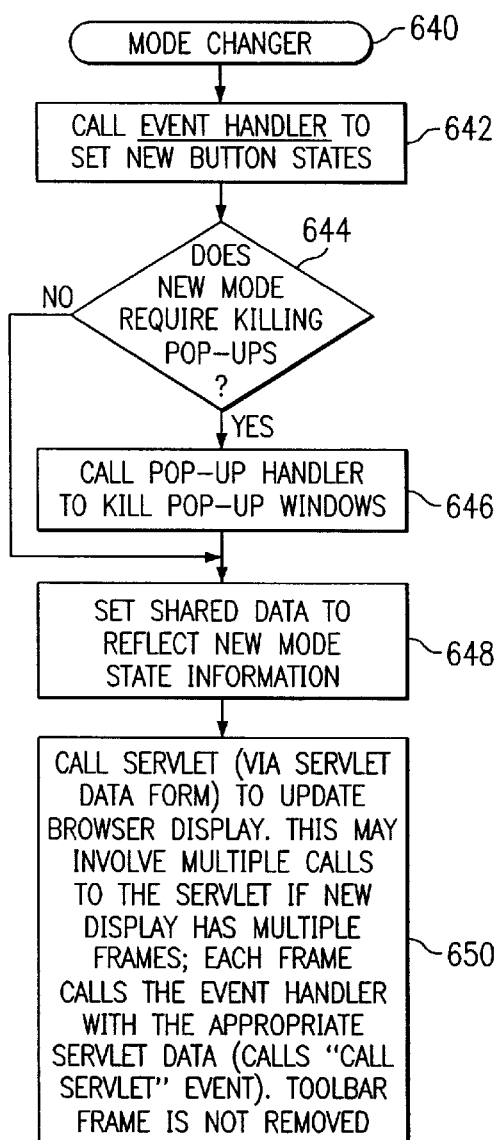
FIG. 50 is a flow diagram illustrating the operation of the mode handler function of the present invention.

FIG. 50 describes the mode changer function 640 that changes the mode of the browser display. At step 642, an event handler can be called to set the new button states for the new mode. The user interface can determine whether the new mode requires terminating any/all pop-up windows at step 644, and if so, can call the pop-up handler of FIG. 49 to do so as shown at step 646. At step 648, the user interface 130 sets the shared data to reflect the new mode information. The call servlet function is then performed at step 650 to update the browser display. Multiple call servlets can be made if the new display has multiple frames. For example, each of the frames can call the event handler with the appropriate servlet data.

Although the present invention has been described in detail, it should be understood that various changes, substitutions and alterations can be made hereto without departing from the spirit and scope of the invention as described by the appended claims.

What is claimed is:

1. A system for delivering information to a user of a computer having a processor and a memory, comprising:
    a configuration database stored on the memory and comprising a plurality of concepts and including a hierarchy that defines the relationships among the plurality of concepts;
    a knowledge delivery program executable by the processor to:
        create a presentation format for the configuration; and
        deliver at least a portion of the plurality of concepts in the configuration to the user according to the presentation format.

2. The system of claim 1, wherein the knowledge delivery program automatically creates the presentation format for the configuration based on the hierarchy.

3. The system of claim 1, wherein the presentation format is created in response to a user request and based on a set of inputs from the user.

4. The system of claim 3, wherein the knowledge delivery program further comprises:
    a configuration editor software program executable to:
        allow an author to create the concept knowledge base and the problem knowledge base;
        allow the author to build the hierarchy as the author inputs the concepts into the concept knowledge base; and
        store the configuration in the memory; and
    a tutor maker software program executable to:
        allow the user to access the configuration;
        retrieve concepts and problems within the configuration based on the presentation format; and
        send the concepts and problems within the presentation format to the user according to the presentation format;
    and wherein each configuration further comprises:
        a concept knowledge base containing the plurality of concepts;
        a problem knowledge base containing a plurality of problems relating to the concepts in the concept knowledge base; and
        a presentation format knowledge base containing at least one presentation format for the concepts in the concept knowledge base.

5. The system of claim 4, wherein the set of inputs comprises the user's familiarity with the plurality of concepts, a level of detail the user wants, or a format in which the user wants the at least a portion of the plurality of concepts presented.

6. The system of claim 5, wherein the concepts input by the author include content, wherein the content can comprise descriptive content, referential content, or both, and wherein the hierarchy represents a portion of the referential content of the configuration.

7. The system of claim 4, wherein the knowledge delivery program further comprises a user interface software program that the user can use to access the tutor maker program.

8. The system of claim 7, wherein the user interface further comprises:
- a browser that enables browsing of the network; and
- a browser extension, comprising an event handler executable to allow the user to generate an event to be acted upon by the tutor maker program.

9. The system of claim 4, wherein the configuration editor program further comprises:
- a concept editor executable to allow the author to add, delete or modify concepts within the concept knowledge base and to create a hierarchy for the concepts in the concept knowledge base, further comprising a concept reader executable to retrieve existing concepts within the concept knowledge base;
- a problem editor executable to allow the author to add, delete, or modify problems within the problem knowledge base, further comprising a problem reader to retrieve existing problems within the problem knowledge base;
- a presentation format generator executable to automatically generate a presentation format for the configuration; and
- a presentation format editor executable to allow the author to manually create a presentation format or to modify an automatically created presentation format within the presentation format knowledge base, further comprising a presentation format reader executable to retrieve an existing presentation format.

10. The system of claim 9, wherein the concepts within the concept knowledge base are compatible with or convertible to a format compatible with delivery of information from a global computer network to a general purpose browser, and wherein the concept reader is further executable to create a pointer for each concept that will point to all content associated with each concept.

11. The system of claim 4, wherein the tutor maker program further comprises:
- an action handler program executable to receive a request relating to a requested configuration from the user and process the request;
- a tutorial manager program executable to:
  - determine whether the content of the requested configuration has previously been loaded, and if not, load the requested configuration; and
  - determine whether a user session has been established, and if not, establish a user session;
- a tutorial database containing each loaded configuration;
- a user session, executable to:
  - establish a thread for each user to facilitate synchronization among multiple users;
  - process the request by accessing the loaded requested configuration;
  - generate a response; and
- an a format compatible with delivery of information from a global computer network to a general purpose browser generator executable to:
  - receive the response from the user session;
  - place the response in a format compatible with delivery of information from a global computer network to a general purpose browser format; and
  - transmit the a format compatible with delivery of information from a global computer network to a general purpose browser response back to the user.

12. The system of claim 11, wherein the action handler processes the request by forwarding the request to the user session.

13. The system of claim 11, wherein the tutorial manager is further executable to track a set of referential content associated with each concept in the concept knowledge base, each problem in the problem knowledge base and each presentation format in the presentation format knowledge base to ensure that only one instance of each knowledge base is loaded at any one time.

14. The system of claim 11, wherein the tutorial manager program further comprises:
- a concept reader executable to retrieve existing concepts within the concept knowledge base;
- a problem reader to retrieve existing problems within the problem knowledge base; and
- a presentation format reader executable to retrieve an existing presentation format.

15. The system of claim 11, wherein the tutorial database is a collection of pointers that point to a collection of a format compatible with delivery of information from a global computer network to a general purpose browser pages that make up the loaded configuration.

16. The system of claim 11, wherein the user session is further executable to build a user model for each user that contains at least a historical data base of the user's interactions with the tutor maker program.

17. The system of claim 11, wherein the action handler processes the request by either forwarding the request to the tutorial manager if a user session has not previously been established, or forwarding the request to the user session if a user session has previously been established.

18. The system of claim 11, wherein the tutor maker further comprises a presentation format generator executable to generate a user-defined presentation format for the loaded configuration.

19. The system of claim 8, wherein the network is the internet and the browser is an internet browser, and further wherein the event handler further comprises:
- a pop-up handler executable to receive an input from the event handler and, if a pop-up up window is associated with the input, creates the pop-up window for viewing by the user;
- a mode changer executable to receive an input from the event handler and, if a mode change is associated with the input, creates the mode change for viewing by the user; and
- an action sender executable to send a request based on the input from the event handler to the tutor maker program.

20. The system of claim 1, wherein the concepts are delivered to the user in a tutorial format.

21. The system of claim 1, further comprising a plurality of configurations, wherein any number of the plurality of configurations can be accessed by any number of users simultaneously.

22. The system of claim 1, wherein the knowledge delivery program creates the presentation format automatically by:
- creating a graph representing the concept knowledge base based on the hierarchy input by the author; and
- searching the graph using a graph searching algorithm to place concepts within the presentation format based on the order found by the graph searching algorithm.

23. The system of claim 22, wherein the knowledge delivery program is further executable to allow the author to select a goal concept and at least one prerequisite concept, and wherein the graph searching algorithm uses the goal concept as a starting point and the prerequisite concepts as an ending point and collects a subgraph of the concept knowledge base graph, the subgraph defining the presentation format so that both a set of relevant concepts and an order to display the relevant concepts is generated automatically.

24. A system for delivering information to a user of a computer over a network, comprising:
- a server computer, comprising:
  - a server processor; and
  - a server memory;
- a client computer connected to the server computer via the network, comprising:
  - a client processor; and
  - a client memory;
- a network computer connected to the server computer via a server computer-network computer network, comprising:
  - a network processor; and
  - a network memory;
- a configuration editor program stored on the network computer memory and executable by the network computer processor to allow an author to:
  - create a configuration database comprising a plurality of concepts; and
  - build a configuration hierarchy defining the relationships among the plurality of concepts;
- a presentation format generator program stored on either the server computer memory or the network computer memory and executable to:
  - automatically create a presentation format for the configuration based on the configuration hierarchy; and
- a tutor maker program stored on the server computer memory and executable by the server processor based on requests from the user to:
  - deliver at least a portion of the plurality of concepts in the configuration to the user according to the configuration presentation format.

25. The system of claim 24, further comprising a user interface program stored on the client computer memory and executable by the client processor to allow a user to send requests to and receive responses from the server computer via the network, and wherein a user can sent an input that initiates the automatic generation of the presentation format.

26. The system of claim 25, wherein the network is the internet and the user interface program further comprises:
- an internet browser that enables browsing of the internet; and
- a browser extension, comprising an event handler executable to allow the user to generate an event to be acted upon by the tutor maker program.

27. The system of claim 26, wherein the event handler further comprises:
- a pop-up handler executable to receive an input from the event handler and, if a pop-up up window is associated with the input, create the pop-up window for viewing by the user;
- a mode changer executable to receive an input from the event handler and, if a mode change is associated with the input, create the mode change for viewing by the user; and
- an action sender executable to send a request based on the input from the event handler to the tutor maker program.

28. The system of claim 24, wherein each configuration database further comprises:
- a concept knowledge base containing the plurality of concepts;
- a problem knowledge base containing a plurality of problems relating to the concepts in the concept knowledge base; and
- a presentation format knowledge base containing at least one presentation format for the concepts in the concept knowledge base.

29. The system of claim 24, wherein the configuration editor software program is further executable to:
- allow an author to create the configuration by inputting the concepts into the concept knowledge base and inputting the problems into the problem knowledge base;
- allow the author to build the hierarchy as the author inputs the concepts into the concept knowledge base; and
- store the configuration in the server memory.

30. The system of claim 24, wherein the concepts input by the author include content, wherein the content can comprise descriptive content, referential content, or both.

31. The system of claim 24, wherein the configuration editor program further comprises:
- a concept editor executable to allow the author to add, delete or modify concepts within the concept knowledge base and to create a hierarchy for the concepts in the concept knowledge base, further comprising a concept reader executable to retrieve existing concepts within the concept knowledge base for deletion or modification;
- a problem editor executable to allow the author to add, delete, or modify problems within the problem knowledge base, further comprising a problem reader to retrieve existing problems within the problem knowledge base for deletion or modification; and
- a presentation format editor executable to allow the author to manually create a presentation format or to modify an automatically created presentation format within the presentation format knowledge base, further comprising a presentation format reader executable to retrieve an existing presentation format for modification.

32. The system of claim 31, wherein the concepts within the concept knowledge base are compatible with or convertible to a format compatible with delivery of information from a global computer network to a general purpose browser, and wherein the concept reader is further executable to create a pointer for each concept that will point to all content associated with each concept.

33. The system of claim 25, wherein the tutor maker program is further executable to:
- receive requests from the user over the internet from the user interface;
- retrieve concepts within the configuration based on the presentation format; and
- send the concepts to the user according to the presentation format.

34. The system of claim 25, wherein the tutor maker program further comprises:
- an action handler program executable to receive a request relating to a requested configuration from the user and process the request;
- a tutorial manager program executable to:
  - determine whether the content of the requested configuration has previously been loaded, and if not, load the requested configuration; and
  - determine whether a user session has been established, and if not, establish a user session;

a tutorial database containing each loaded configuration;
a user session, executable to:
   establish a thread for each user to facilitate synchronization among multiple users; and
   process the request by accessing the loaded requested configuration and generate a response; and
an a format compatible with delivery of information from a global computer network to a general purpose browser generator executable to:
   receive the response from the user session;
   place the response in a format compatible with delivery of information from a global computer network to a general purpose browser format; and
   transmit the response back to the user.

35. The system of claim 34, wherein the tutorial manager is further executable to track a set of referential content for each particular concept knowledge base, problem knowledge base and presentation format knowledge base to ensure that only one instance of each knowledge base is loaded at any one time.

36. The system of claim 34, wherein the tutorial manager program further comprises:
   a concept reader executable to retrieve existing concepts within the concept knowledge base;
   a problem reader to retrieve existing problems within the problem knowledge base; and
   a presentation format reader executable to retrieve an existing presentation format.

37. The system of claim 34, wherein the tutorial database is a collection of pointers that point to a collection of a format compatible with delivery of information from a global computer network to a general purpose browser pages that make up the loaded configuration.

38. The system of claim 34, wherein the action handler processes the request by either forwarding the request to the tutorial manager if a user session has not previously been established, or forwarding the request to the user session if a user session has previously been established.

39. The system of claim 34, wherein the tutor maker program further comprises a presentation format generator executable to generate a user-defined presentation format for the loaded configuration.

40. The system of claim 24, wherein the presentation format generator program is further executable to search a graph representing the concept knowledge base that is based on the hierarchy input by the author using a graph searching algorithm to place concepts within the presentation format based on the order found by the graph searching algorithm.

41. The system of claim 40, wherein the configuration editor program is further executable to allow the author to select a goal concept at least one prerequisite concept, and wherein the presentation format generator program is further executable to initiate the graph searching algorithm using the goal concept as a starting point and the prerequisite concepts as an ending point to collect a subgraph of the concept knowledge base that defines the presentation format.

42. The system of claim 24, wherein the server memory further comprises file memory and random access memory, and wherein the tutor maker program is stored in file memory and the configuration is stored in random access memory.

43. The system of claim 26, wherein the browser extension is further executable to:
   send a request to the tutor maker over the internet; and
   retrieve a response from the tutor maker over the internet, wherein all interactions between the browser extension and the tutor maker are sent through a single URL.

44. The system of claim 43, wherein the tutor maker program can determine if the user has sent a request from a different URL than the user had originally set up for the user session and will respond to the user with a query as to whether the user wishes to log off at the original URL location, and if so, logs the user off at the original location.

45. A system comprising a knowledge delivery computer program stored in computer-readable form on a tangible storage medium for delivering concepts from a configuration data base, the knowledge delivery computer program executable by a processor to:
   build the configuration data base to include a plurality of concepts;
   create a configuration hierarchy to define a relationship between each of the plurality of concepts;
   automatically generate a presentation format for the configuration based on the configuration hierarchy; and
   deliver at least a portion of the plurality of concepts to a user according to the presentation format.

46. The system of claim 45, wherein the knowledge delivery program further comprises:
   a configuration editor software program executable to:
      allow an author to create the configuration by inputting the concepts into the concept knowledge base; and
      allow the author to build the hierarchy as the author inputs the concepts into the concept knowledge base;
      store the configuration in the memory; and
   a tutor maker software program executable to:
      allow the user to access the configuration;
      retrieve concepts within the configuration based on the presentation format; and
      send the concepts within the presentation format to the user according to the presentation format.

47. The system of claim 45, wherein the concepts input by the author include content, wherein the content can comprise descriptive content, referential content, or both.

48. The system of claim 45, wherein the knowledge delivery program further comprises a user interface software program that the user can use to access the tutor maker program, wherein the user may initiate automatic generation of the presentation format by sending an input to the tutor maker program.

49. The system of claim 48, wherein the user interface further comprises:
   a browser that enables browsing of the network; and
   a browser extension, comprising an event handler executable to allow the user to generate an event to be acted upon by the tutor maker program, wherein the event handler further comprises:
      a pop-up handler executable to receive an input from the event handler and, if a pop-up up window is associated with the input, create the pop-up window for viewing by the user;
      a mode changer executable to receive an input from the event handler and, if a mode change is associated with the input, create the mode change for viewing by the user; and
      an action sender executable to send a request based on the input from the event handler to the tutor maker.

50. The system of claim 46, wherein the configuration editor program further comprises:
   a concept editor executable to allow the author to add, delete or modify concepts within the concept knowledge base and to create a hierarchy for the concepts in the concept knowledge base, further comprising a concept reader executable to retrieve existing concepts within the concept knowledge base for deletion or modification;

a presentation format generator executable to automatically generate a presentation format for the configuration; and a presentation format editor executable to allow the author to manually create a presentation format or to modify an automatically created presentation format within the presentation format knowledge base, further comprising a presentation format reader executable to retrieve an existing presentation format for modification.

51. The system of claim 46, wherein the tutor maker program further comprises:

an action handler program executable to receive a request relating to a requested configuration from the user and process the request;

a tutorial manager program executable to:
determine whether the content of the requested configuration has previously been loaded, and if not, load the requested configuration; and
determine whether a user session has been established, and if not, establish a user session and wherein the tutorial manager further comprises a concept reader executable to retrieve existing concepts within the concept knowledge base;

a tutorial database containing each loaded configuration;

a user session, executable to:
establish a thread for each user to facilitate synchronization among multiple users; and
process the request from the loaded requested configuration and generate a response; and an a format compatible with delivery of information from a global computer network to a general purpose browser generator executable to:
receive the response from the user session;
place the response in a format compatible with delivery of information from a global computer network to a general purpose browser format; and
transmit the response back to the user.

52. The system of claim 46, wherein the knowledge delivery program creates the presentation format automatically by:

creating a graph representing the concept knowledge base that is based on the hierarchy input by the author; and searching the graph using a graph searching algorithm to place concepts within the presentation format based on the order found by the graph searching algorithm.

53. The system of claim 52, wherein the knowledge delivery program allows the author to select a goal concept and at least one prerequisite concept, and wherein the graph searching algorithm uses the goal concept as a starting point and the prerequisite concepts as an ending point and collects a subgraph of the concept knowledge base graph that defines the presentation format.

54. A computer program product comprising:
a computer usable medium; and
a computer readable program embodied in said medium, said computer readable program operable to deliver concepts to the user, said computer readable program executable to:
build a configuration data base to include a plurality of concepts;
create a configuration hierarchy to define a relationship between each of the plurality of concepts;
automatically generate a presentation format for the configuration based on the configuration hierarchy; and deliver at least a portion of the plurality of concepts to a user according to the presentation format to inform the user.

55. The system of claim 54, wherein each configuration further comprises:

a concept knowledge base containing the plurality of concepts;

a problem knowledge base containing a plurality of problems relating to the concepts in the concept knowledge base; and a presentation format knowledge base containing at least one presentation format for the concepts in the concept knowledge base.

56. The system of claim 55, wherein the computer program product further comprises:

a configuration editor software program executable to:
allow an author to create the configuration by inputting the concepts into the concept knowledge base and inputting the problems into the problem knowledge base;
allow the author to define the relationships among the concepts to build the hierarchy as the author inputs the concepts into the concept knowledge base;
store the configuration in the memory;

a tutor maker software program executable to:
allow the user to access the configuration and to sent an input to the tutor maker program to initiate automatic generation of the presentation format;
retrieve concepts and problems within the configuration based on the presentation format; and
send the concepts and problems within the presentation format to the user according to the presentation format.

57. The system of claim 56, wherein the computer program product further comprises a user interface software program that the user can use to access the tutor maker program, wherein the user interface further comprises:

a browser that enables browsing of the network; and a browser extension, comprising an event handler executable to allow the user to generate an event to be acted upon by the tutor maker program.

58. The system of claim 57, wherein the network is the internet and the browser is an internet browser, and further wherein the event handler further comprises:

a pop-up handler executable to receive an input from the event handler and, if a pop-up up window is associated with the input, create the pop-up window for viewing by the user;

a mode changer executable to receive an input from the event handler and, if a mode change is associated with the input, create the mode change for viewing by the user; and an action sender executable to send a request based on the input from the event handler to the tutor maker.

59. The system of claim 56, wherein the configuration editor program further comprises:

a concept editor executable to allow the author to add, delete or modify concepts within the concept knowledge base and to create a hierarchy for the concepts in the concept knowledge base, further comprising a concept reader executable to retrieve existing concepts within the concept knowledge base;

a problem editor executable to allow the author to add, delete, or modify problems within the problem knowledge base, further comprising a problem reader to retrieve existing problems within the problem knowledge base;

a presentation format generator executable to automatically generate a presentation format for the configuration; and a presentation format editor executable to allow the author to manually create a presentation format or to modify an automatically created presentation format within the presentation format knowledge base, further comprising a presentation format reader executable to retrieve an existing presentation format for modification.

60. The system of claim 59, wherein the concepts within the concept knowledge base are compatible with or convertible to a format compatible with delivery of information from a global computer network to a general purpose browser, and wherein the concept reader is further executable to create a pointer for each concept that will point to all content associated with that concept.

61. The system of claim 56, wherein the tutor maker program further comprises:

an action handler program executable to receive a request relating to a requested configuration from the user and process the request;

a tutorial manager program executable to:
determine whether the content of the requested configuration has previously been loaded, and if not, load the requested configuration; and
determine whether a user session has been established, and if not, establish a user session;

a tutorial database containing each loaded configuration;

a user session, executable to:
establish a thread for each user to facilitate synchronization among multiple users; and
process the request from the loaded requested configuration and generate a response;

an a format compatible with delivery of information from a global computer network to a general purpose browser generator executable to:
receive the response from the user session;
place the response in a format compatible with delivery of information from a global computer network to a general purpose browser format; and
transmit the response back to the user.

62. The system of claim 61, wherein the tutorial manager program further comprises:

a concept reader executable to retrieve existing concepts within the concept knowledge base;

a problem reader to retrieve existing problems within the problem knowledge base; and a presentation format reader executable to retrieve an existing presentation format.

63. The system of claim 61, wherein the tutorial database is a collection of pointers that point to a collection of a format compatible with delivery of information from a global computer network to a general purpose browser pages that make up the loaded configuration.

64. The system of claim 61, wherein the action handler processes the request by either forwarding the request to the tutorial manager if a user session has not previously been established, or forwarding the request to the user session if a user session has previously been established.

65. The system of claim 61, wherein the tutor maker further comprises a presentation format generator executable to generate a user-defined presentation format for the loaded configuration.

66. The system of claim 54, wherein the computer program creates the presentation format automatically by:

creating a graph representing the concept knowledge base that is based on the hierarchy input by the author; and searching the graph using a graph searching algorithm to place concepts within the presentation format based on the order found by the graph searching algorithm.

67. A method for delivering data to a user over a network, comprising:

building a configuration data base to include a plurality of concepts;

creating a configuration hierarchy to define a relationship between each concept in the plurality of concepts;

automatically generating a presentation format for the configuration based on the configuration hierarchy; and delivering at least a portion of the plurality of concepts to the user according to the presentation format.

68. The method of claim 67, wherein creating a configuration further comprises:

creating a concept knowledge base containing the plurality of concepts;

creating a problem knowledge base containing a plurality of problems relating to the concepts in the concept knowledge base; and creating a presentation format knowledge base containing at least one presentation format for the concepts in the concept knowledge base.

69. The method of claim 68, further comprising:

creating the configuration by inputting the concepts into the concept knowledge base and inputting the problems into the problem knowledge base;

defining the relationships among the concepts to build the hierarchy as the author inputs the concepts into the concept knowledge base;

storing the configuration in the memory;

accessing the configuration;

retrieving concepts and problems within the configuration based on the presentation format; and sending the concepts and problems within the presentation format to the user according to the presentation format.

70. The method of claim 69, further comprising:

generating a request to receive content from the configuration;

receiving the request relating to a requested configuration;

determining whether the content of the requested configuration has previously been loaded, and if not, loading the requested configuration; and determining whether a user session has been established, and if not, establishing a user session;

processing the request from the loaded requested configuration;

generating a response; and transmitting the response.

71. The method of claim 70, further comprising tracking a set of referential content for each particular concept knowledge base, problem knowledge base and presentation format knowledge base to ensure that only one instance of each knowledge base is loaded at any one time.

72. The method of claim 71, further comprising:

receiving the response from the user session; and placing the response in a format compatible with delivery of information from a global computer network to a general purpose browser format.

73. The method of claim 67, wherein automatically generating the presentation format further comprises:

creating a graph representing the concept knowledge base based on the hierarchy input by the author;

searching the graph using a graph searching algorithm; and placing the concepts within the presentation format based on the order found by the graph searching algorithm.

74. The method claim 73, further comprising:

selecting a goal concept and at least one prerequisite concept;

starting the search of the graph at the goal concept;

ending the search of the graph at the at least one prerequisite concept; and generating a presentation format including a set of relevant concepts and an order of presentation for the relevant concepts based on the search.

75. A method for delivering data created by an author at a network computer connected to a server computer to a user at a user computer from the server computer over a network, the method performed by a computer program stored on a tangible medium, said computer program comprising a configuration editor program, a tutor maker program and a user interface program, the method comprising:

executing the configuration editor to:
allow an author to build a configuration data base that includes a plurality of concepts;
create a configuration hierarchy to define a relationship between each of the plurality of concepts; and
automatically generate a presentation format for the configuration based on the configuration hierarchy, wherein the presentation format comprises a framework for presenting at least a portion of the concepts and an order in which the at least a portion of the concepts will be presented;

executing the user interface to:
allow the user to access the tutor maker program and request delivery of concepts from the configuration; and
execute the tutor maker program to deliver at least a portion of the plurality of concepts to the user according to the presentation format.

76. A system for delivering information to a user of a computer having a processor and a memory, comprising:

a configuration database stored on the memory and comprising a plurality of concepts and including a taxonomy that defines the relationships between the plurality of concepts;

a knowledge delivery program executable by the processor to:
create a pedagogy for the configuration; and
deliver a least a portion of the plurality of concepts in the configuration to the user according to the pedagogy.

77. The system of claim 76, wherein the knowledge delivery program automatically creates the pedagogy for the configuration based on the taxonomy.

78. The system of claim 76, wherein the pedagogy is created in response to a user request and based on a set of inputs from the user.

79. The system of claim 78, wherein the knowledge delivery program further comprises:

a configuration editor software program executable to:
allow an author to create the concept knowledge base and the problem knowledge base;
allow the author to build the hierarchy as the author inputs the concepts into the concept knowledge base; and
store the configuration in the memory; and a tutor maker software program executable to:
allow the user to access the configuration;
retrieve concepts and problems within the configuration based on the pedagogy; and
send the concepts and problems within the pedagogy to the user according to the pedagogy;

and wherein each configuration further comprises:
a concept knowledge base containing the plurality of concepts;
a problem knowledge base containing a plurality of problems relating to the concepts in the concept knowledge base; and
a pedagogy knowledge base containing at least one pedagogy for the concepts in the concept knowledge base.

80. The system of claim 78, wherein the set of inputs comprises the user's familiarity with the plurality of concepts, a level of detail the user wants, or a format in which the user wants the at least a portion of the plurality of concepts presented.

* * * * *